United States Patent [19]

Kuroda et al.

[11] Patent Number: 4,929,525
[45] Date of Patent: May 29, 1990

[54] PHOTOCONDUCTOR FOR ELECTROPHOTOGRAPHY CONTAINING AZO OR DISAZO COMPOUND

[75] Inventors: Masami Kuroda; Yoshimasa Hattori; Noboru Furusho, all of Kawasaki, Japan

[73] Assignee: Fuji Electric Co., Ltd.

[21] Appl. No.: 283,060

[22] Filed: Dec. 6, 1988

[30] Foreign Application Priority Data

| Dec. 8, 1987 | [JP] | Japan | 62-310508 |
| Dec. 8, 1987 | [JP] | Japan | 62-310509 |
| Dec. 23, 1987 | [JP] | Japan | 62-325962 |
| Jan. 13, 1988 | [JP] | Japan | 63-5138 |
| Jan. 18, 1988 | [JP] | Japan | 63-7681 |

[51] Int. Cl.$^5$ ............................................. G03G 5/06
[52] U.S. Cl. ................................... 430/75; 430/76; 430/58
[58] Field of Search ........................................ 430/75, 76

[56] References Cited

U.S. PATENT DOCUMENTS

| 3,484,237 | 12/1969 | Shattuck et al. | 96/1.5 |
| 4,278,747 | 7/1981 | Murayama et al. | 430/82 |
| 4,367,273 | 1/1983 | Murayama et al. | 430/56 |
| 4,415,640 | 11/1983 | Goto et al. | 430/59 |
| 4,568,623 | 2/1986 | Makino et al. | 430/58 |
| 4,606,986 | 8/1986 | Yanus et al. | 430/59 |
| 4,624,904 | 11/1986 | Kazmaier et al. | 430/59 |
| 4,666,809 | 5/1987 | Matsumoto et al. | 430/76 |
| 4,677,045 | 6/1987 | Champ et al. | 430/76 |
| 4,702,983 | 10/1987 | Haino et al. | 430/75 |
| 4,731,131 | 3/1988 | Horie et al. | 430/77 |
| 4,783,387 | 11/1988 | Ueda | 430/76 |
| 4,808,503 | 2/1989 | Yamada et al. | 430/75 |

FOREIGN PATENT DOCUMENTS

| 0131140 | 1/1985 | European Pat. Off. |
| 131140 | 1/1985 | European Pat. Off. |
| 03019909 | 11/1980 | Fed. Rep. of Germany |
| 3141306 | 6/1982 | Fed. Rep. of Germany |
| 3139524 | 8/1982 | Fed. Rep. of Germany |
| 3203621 | 9/1982 | Fed. Rep. of Germany |
| 3303830 | 8/1983 | Fed. Rep. of Germany |
| 10785 | 5/1972 | Japan |
| 37543 | 12/1972 | Japan |
| 66444 | 9/1973 | Japan |
| 39952 | 4/1975 | Japan |
| 50445 | 3/1984 | Japan |
| 59-182456 | 5/1984 | Japan |
| 59-182457 | 8/1984 | Japan |
| 93443 | 5/1985 | Japan |
| 264055 | 11/1987 | Japan |

*Primary Examiner*—J. David Welsh
*Attorney, Agent, or Firm*—Spencer & Frank

[57] ABSTRACT

A photoconductor for electrophotography, including an electroconductive substrate; and a photosensitive layer formed on the electroconductive substrate and including a nobel azo compound or disazo compound as a charge generating substance. An azo compound is represented by the following general formula:

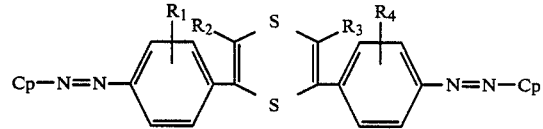

wherein each of $R_1$, $R_2$, $R_3$ and $R_4$ stands for a hydrogen atom, a halogen atom, a hydroxy group, an alkyl group, an alkoxy group, an allyl group, an aryl group, an aralkyl group, a carboxyl group or an ester group, and $C_p$ stands for a residual group of a coupler.

18 Claims, 1 Drawing Sheet

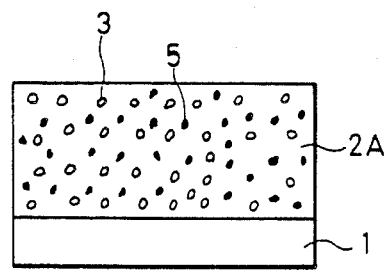
F I G. 1
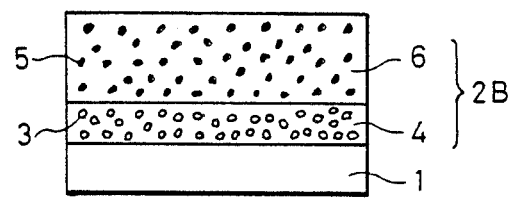
F I G. 2
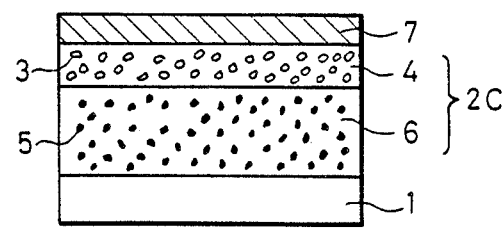
F I G. 3

PHOTOCONDUCTOR FOR ELECTROPHOTOGRAPHY CONTAINING AZO OR DISAZO

BACKGROUND OF THE INVENTION

1. Field of the Invention

The present invention relates to a photoconductor for electrophotography, and particularly to a photoconductor for electrophotography which contains a novel azo or disazo compound in the photosensitive layer thereof formed on an electroconductive substrate.

2. Description of the Prior Art

Photosensitive materials which have heretofore been used in photoconductors for electrophotography include inorganic photoconductive substances such as selenium and selenium alloys, dispersions of inorganic photoconductive substances such as zinc oxide and cadmium sulfide in resin binders, organic polymeric photocondutive substances such as poly-N-vinylcarbazole and polyvinylanthracene, organic photoconductive substances such as phthalocyanine compounds and bisazo compounds, and dispersions of such organic polymeric photoconductive substances in resin binders.

Photoconductors are required to have the characteristics of maintaining a surface electric charge in the dark, generating an electric charge upon receiving light, and transporting an electric charge upon receiving light. They are classified into two photoconductor types namely, so-called monolayer type photoconductors, and so-called laminate type photoconductors. The former comprises a single layer having all of the above-mentioned three characteristics, and the latter comprises functionally distinguishable laminated layers, one of which contributes mainly to the generation of electric charge, and another of which contributes to the retention of surface electric charge in the dark and electric charge transportation upon receiving light. An electrophotographic method using a photoconductor of the kind as mentioned above, is for example the Carlson's system and is applied to image formation. The image formation according to this system comprises the steps of subjecting a photoconductor in the dark to corona discharge to charge the photoconductor, illuminating the surface of the charged photoconductor with imagewise light based on a manuscript or copy bearing, e.g., letters and/or pictures to form a latent electrostatic image, developing the formed latent electrostatic image with a toner, and transferring the developed toner image to a support such as a paper sheet to fix the toner image on the support. After the toner image transfer, the photoconductor is subjected to the steps of removal of the electric charge, removal of the remaining toner (cleaning), neutralization of the residual charge with light (erasure), and so on to be ready for reuse.

Photosensitive members for electrophotography in which use is made of an organic material(s) have recently been put into practical use by virtue of the advantageous feature(s) of the organic material(s), such as flexibility, thermal stability, and/or a film forming capacity. They include a photoconductor comprising poly-N-vinylcarbazole and 2,4,7-trinitrofluoren-9-one (disclosed in U.S. Pat. No. 3,484,237), a photoconductor using an organic pigment as the main component (disclosed in Japanese Patent Laid-Open No. 37,543/1972), and a photoconductor using as the main component a eutectic complex composed of a dye and a resin (disclosed in Japanese Laid-Open Patent Application No. 10,785/1972). A number of novel hydrazone compounds have also been put into practical use for photosensitive members.

Although organic materials have a number of advantageous features mentioned above with which inorganic materials are not endowed, the fact is that there have been obtained no organic materials fully satisfying all the characteristics required of a material to be used in photoconductors for electrophotography at present. Particular problems involved in organic materials have been concerned with photosensitivity and characteristics in continuous repeated use.

SUMMARY OF THE INVENTION

An object of the present invention is to provide a photoconductor for electrophotography to be used in copying apparatus and printers, which member has a high photosensitivity and excellent characteristics in repeated use, through the use, in the photosensitive layer, of a novel organic materials not used to date as a charge generating substance.

In a first embodiment of the present invention, a photoconductor for electrophotography comprises:
an electroconductive substrate; and
a photosensitive layer formed on said electroconductive substrate and including at least one azo compound represented by the following general formula (I) as a charge generating substance:

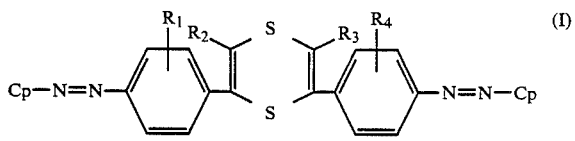

wherein each of $R_1$, $R_2$, $R_3$ and $R_4$ stands for a hydrogen atom, a halogen atom, a hydroxy group, an alkyl group, an alkoxy group, an allyl group, an aryl group, an aralkyl group, a carboxyl group, or an ester group and wherein $C_p$ stands for a residual group of a coupler.

Here, the photoconductor may comprise a layer including a dispersion of a charge generating substance selected from azo compounds represented by the general formulae (I) and a charge transporting substance in a binder resin.

The photoconductor may comprise a laminate of a charge transporting layer mainly composed of a charge transporting substance and a charge generating layer including a compound selected from azo compounds represented by the general formulae (I).

In the a second embodiment of the present invention, a photoconductor for electrophotography comprises:
an electrocondutive substrate; and
a photosensitive layer formed on said electroconductive substrate and including at least one azo compound represented by the following general formula (II) as a charge generating substance:

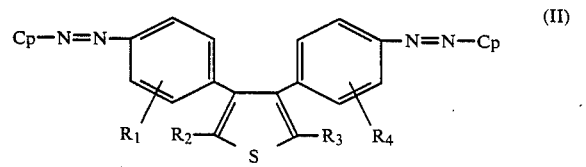

wherein each of $R_1$, $R_2$, $R_3$ and $R_4$ stands for a hydrogen atom, a halogen atom, a hydroxy group, an alkyl group, an alkoxy group, an allyl group, an aryl group, an aralkyl group, a carboxyl group, or an ester group, and wherein $C_p$ stands for a residual group of a coupler.

Here, the photoconductor may comprise a layer including a dispersion of a charge generating substance selected from azo compounds represented by the general formulae (II) and a charge transporting substance in a binder resin.

The photoconductor may comprise a laminate of a charge transporting layer mainly composed of a charge transporting substance and a charge generating layer including a compound selected from azo compounds representead by the general formulae (II).

In the a third embodiment of the present inveniton, a photoconductor for electrophotography comprises:
an electroconductive substrate; and
a photosensitive layer formed on said electroconductive substrate and including at least one disazo compound represented by the following general formula (III) as a charge generating substance:

$$C_P-N=N-D-N=N-C_P \quad \text{(III)}$$

wherein D stands for one of the structures represented by the following general formulae (IIIA) to (IIIC) and $C_p$ stands for a residual group of a coupler;

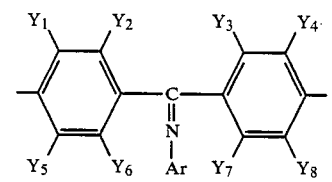

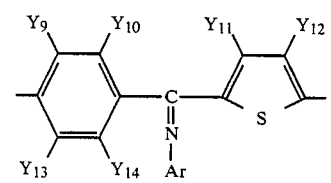

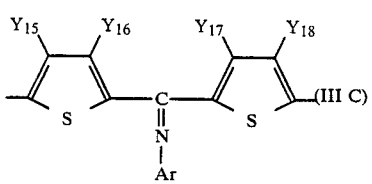

wherein each of $Y_1$ to $Y_{18}$ stands for a hydrogen atom, a cyano group, a carbamoyl group, a carboxyl group, an ester group, an acyl group, a halogen atom, a sulfonic group, an alkyl group, a cycloalkyl group, an alkenyl group, an aryl group and an aromatic heterocyclic group, each of the last five groups of which may have a substituent(s) and wherein $A_r$ stands for an aromatic hydrocarbon or an aromatic heterocyclic group, each of which may have a substituent(s).

Here, the residual group $C_p$ may have one of structures represented by the following general formulae (IIID) to (IIIG).

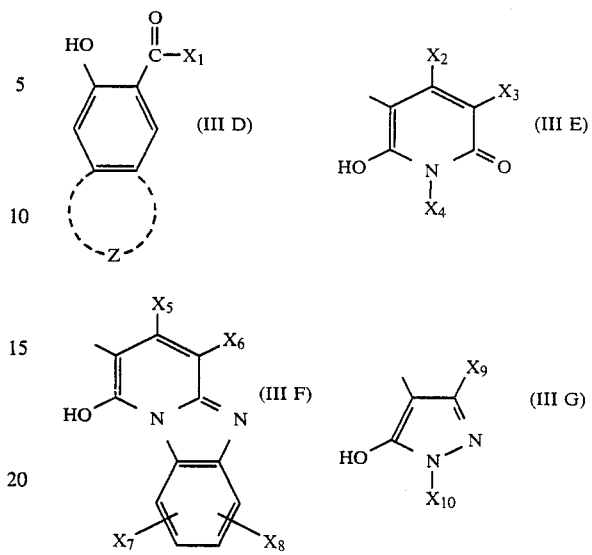

The photoconductor may comprise a layer including a dispersion of a charge generating substance selected from disazo compounds represented by the general formulae (III) and a charge transporting substance in a binder resin.

The photoconductor may comprise a laminate of a charge transporting layer mainly composed of a charge transporting substance and a charge generating layer including a compound selected from disazo compounds repesented by the general formulae (IV).

In a fourth embodiment of the present invention, a photoconductor for electrophotography comprises:
an electroconductive substrate; and
a photosensitive layer formed on said substrate and including at least one disazo compound represented by the following general formulae (IV) as a charge generating substance:

$$C_p-N=N-E-N=N-C_p \quad \text{(IV)}$$

wherein E stands for one of the structures represented by the following general formulae (IVA) to (IVC), and wherein $C_p$ stands for a residual group of a coupler;

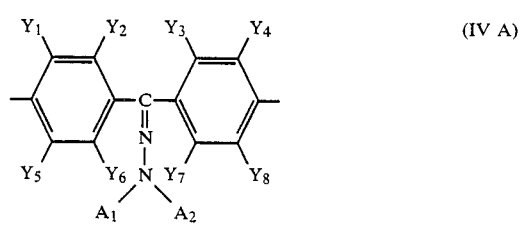

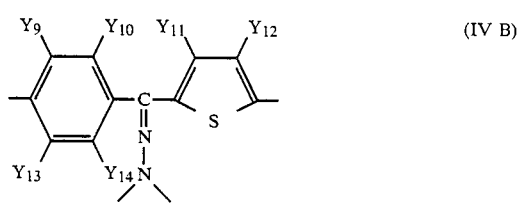

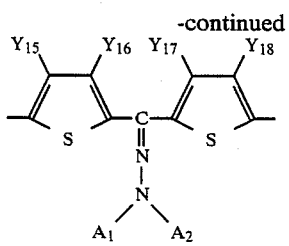
(IV C)

wherein each of $Y_1$ to $Y_{18}$ stands for a hydrogen atom, a cyano group, a carbamoyl group, a carboxyl group, an ester group, an acyl group, a halogen atom, a sulfonic group, an alkyl group, a cycloalkyl group, an alkenyl group, an aryl group or an aromatic heterocyclic group, each of the last five groups of which may have a substituent(s), and wherein $A_1$ and $A_2$ stand for an aryl group, an aralkyl group or an aromatic heterocyclic group, each of which may have a substituent(s).

Here, the residual group $C_p$ may have one of structures represented by the following general formulae (IVD) to (IVG):

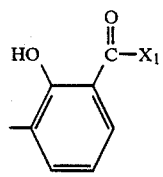
Z(IV D)

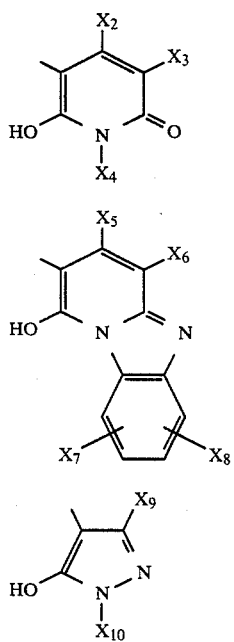
(IV E)

(IV F)

(IV G)

wherein Z stands for a residual group which forms a polycyclic aromatic ring or heterocyclic ring by condensation with a benzene ring, wherein $X_1$ stands for an $OR_5$ group or an $NR_6R_7$ group (each of $R_5$, $R_6$ and $R_7$ standing for a hydrogen atom, an alkyl group, or an aryl group or an aromatic heterocyclic group, each of the last three groups of which may have a substituent(s)), wherein $X_2$ and $X_5$ stand for an alkyl group, an aryl group or an aromatic heterocyclic group, each of which may have a substituent(s), wherein $X_3$ and $X_6$ stand for a hydrogen atom, a cyano group a carbamoyl group, a carboxyl group, an ester group, or an acyl group, wherein $X_4$ stands for a hydrogen atom, an alkyl group, a cycloalkyl group, an alkenyl group, each of the last three groups of which may have a substituent(s), an aryl group, or an aromatic hetrocyclic group, wherein $X_7$ and $X_8$ stand for a hydrogen atom, a halogen atom, a nitro group, an alkyl group, which alkyl group may have a substituent(s), or an alkoxy group, which alkoxy group may have a substituent(s), wherein $X_9$ stands for an alkyl group, an aryl group, or a carboxyl group, and wherein $X_{10}$ stands for an aryl group or an aromatic group, each of which may have a substituent(s).

The photoconductor may comprise a layer including a dispersion of a charge generating substance selected from disazo compounds represented by the general formulae (IV) and a charge transporting substance in a binder resin.

The photoconductor may comprise a laminate of a charge transporting layer mainly composed of a charge transporting substance and a charge generating layer including a compound selected from disazo compounds representead by the general formulae (IV).

In a fifth embodiment of the present invention, a photoconductor for electrophotography comprises:
an electroconductive substrate; and
a photosensitive layer formed on said electroconductive substrate and including at least one disazo compound represented by the following general formula (V) as a charge generating substance:

$$C_p-N=N-G-N=N-C_p \qquad (V)$$

wherein G stands for one of the structures represented by the following general formulae (VA) to (VC), and wherein $C_p$ stands for a residual group of a coupler;

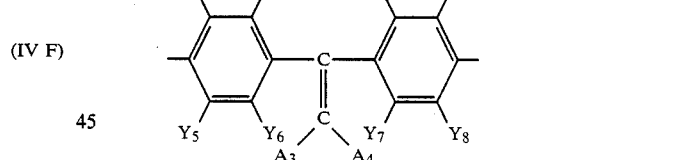
(VA)

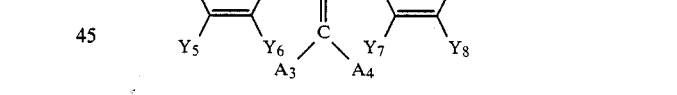
(VB)

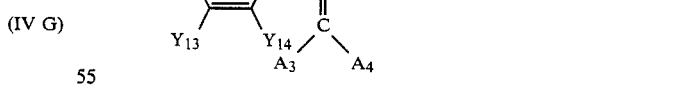

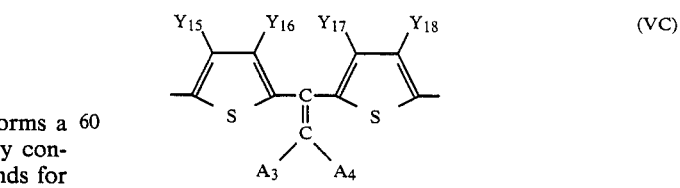
(VC)

wherein each of $Y_1$ to $Y_{18}$ stands for a hydrogen atom, a cyano group, a carbamoyl group, a carboxyl group, an ester group, an acyl group, a halogen atom, a sulfonic group, an alkyl group, a cycloalkyl group, an alkenyl group, an aryl group or an aromatic heterocyclic group, each of the last five groups of which may have a substituent(s), and $A_3$ and $A_4$ stands for a hydrogen atom, a cyano group, an aralkyl group, which aralkyl group may have a substituent(s), or an aromatic hydrocarbon group or aromatic heterocyclic group, each of which may have a substituent(s).

Here, the residual group $C_p$ may have one of structures represented by the following general formulae (VD) to (VG).

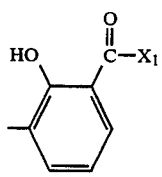
Z(VD)

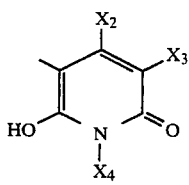
(VE)

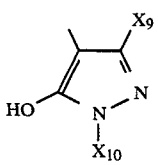
(VF)

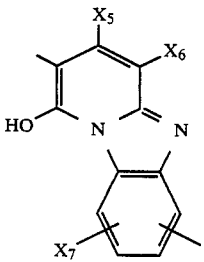
(VG)

The photoconductor may comprise a layer including a dispersion of a charge generating substance selected from disazo compounds repesented by the general formulae (V) and a charge transporting substance in a binder resin.

The photoconductor may comprise a laminate of a charge transporting layer mainly composed of a charge transporting substance and a charge generating layer including a compound selected from disazo compounds representead by the general formulae (V).

The above and other objects, effects, features and advantages of the present invention will become more apparent from the following description of embodiments thereof taken in conjunction with the accompanying drawings.

BRIEF DESCRIPTION OF THE DRAWINGS

FIGS. 1 to 3 are schematic cross-sectional views of photoconductors according to the present invention.

DETAILED DESCRIPTION OF PREFERRED EMBODIMENTS

FIGS. 1, 2 and 3 are schematic cross-sectional views of different embodiments of the photoconductor of the present invention, respectively.

FIG. 1 shows a monolayer type photoconductor. A photosensitive layer 2A is provided on an electroconductive substrate 1. The photosensitive layer 2A comprises an azo compound as a charge generating substance 3 and a charge transporting substance 5 both of which substances are dispersed in a resin binder matrix so that the photosensitive layer 2A functions as photoconductor.

FIG. 2 shows a laminate type photoconductor. A laminated photosensitive layer 2B is provided on an electroconductive substrate 1, a lower layer of the laminate is a charge generating layer 4 including an azo compound 3 as a charge generating substance and an upper one is a charge transporting layer 6 containing a charge transporting substance 5 as the main component, so that the photosensitive layer 2B functions as a photoconductor. This photoconductor is usually used according to the negative charge mode.

FIG. 3 shows another laminate type photoconductor having a layer structure in reverse to that of FIG. 2. A laminated photosensitive layer 2C is provided on an electroconductive substrate 1, a lower layer of the laminate is a charge transporting layer 6 and an upper one is a charge generating layer 4 including an azo compound as a charge generating substance 3. The photosensitive layer also functions as a photoconductor. This photoconductor is usually used according to the positive charge mode. In this case, a covering layer 7 may generally be further provided as shown in FIG. 3 to protect the charge generating layer 4.

Thus, in the case of laminate type photoconductors, the charge mode therefor differs from layer structure to layer structure. The reason for this is that, even if any photoconductor with the layer structure as shown in FIG. 2 is to be used in the positive charge mode, no charge transporting substances adaptable to the positive charge mode have been found yet. Accordingly, when any laminate type photoconductor is to be used in the positive charge mode, the photoconductor is required of a layer structure as shown in FIG. 3 at present.

A photoconductor as shown in FIG. 1 can be produced by dispersing a charge generating substance in a solution of a charge transporting substance and a resin binder and applying the resulting dispersion on an electroconductive substrate.

A photoconductor as shown in FIG. 2 can be prepared by depositing a charge generating substance on an electroconductive substrate by means of vacuum evaporation or applying and drying a dispersion of a particulate charge generating substance in a solvent and/or a resin binder on an electroconductive substrate, followed by applying a solution of a charge transporting substance and a resin binder on the resulting layer and drying.

A photoconductor as shown in FIG. 3 can be prepared by applying and drying a solution of a charge transporting substance and a resin binder on an electroconductive substrate, and depositing a charge generating substance on the resulting coating layer by means of vacuum evaporation or coating and drying a dispersion of a particulate charge generating substance in a solvent and/or a resin binder on the coating layer, followed by formation of a covering layer.

The electroconductive substrate 1 serves as an electrode of the photoconductor and as a support for a layer(s) formed thereon. The electroconductive substrate may be in the form of a cylinder, a plate or a film, and may be made of a metallic material such as aluminum, stainless steel or nickel, or other material having a surface treated to be electroconductive, such as glass so treated or a resin so treated.

The charge generating layer 4 is formed by application of a dispersion of an azo compound or a disazo compound as a charge generating substance 3 in a resin binder or by deposition of a charge generating substance by means of vacuum evaporation, or the like technique as described above, and this layer generates an electric charge upon receiving light. It is important that the charge generating layer 4 be high not only in charge generating efficiency but also in capability of injecting the generated electric charge into the charge transporting layer 6 and any covering layer 7, which capability is desirably as little dependent upon the electric field as possible and high even in low intensity electric fields. It also is possible to form a charge generating layer using a charge generating substance as a main component in admixture with a charge transporting substance and so on. Resin binders usable in the charge generating layer include polycarbonates, polyesters, polyamides, polyurethanes, epoxy resins, silicone resins, and methacrylate homopolymer and copolymers, which may be used either alone or in appropriate combination.

The charge transporting layer 6 is a coating film contaning a hydrazone compound, a pyrazoline compound, a styryl compound, a tri-phenyl-amine compound, an oxazole compound or an oxadiazole compound as an organic charge transporting substance in a resin binder. The charge transporting layer serves as an insulator layer in the dark so as to retain the electric charge of the photosensitive member, and fulfills the function of transporting an electric charge injected from the charge generating layer upon receiving light. Resin binders usable in the charge transporting layer include polycarbonates, polyesters, polyamides, polyurethanes, epoxy resins, silicone resins, and methacryate homopolymer and copolymers.

The covering layer 7 has the function of receiving and retaining an electric charge generated by corona discharge in the dark, and has the capability of transmitting light to which the charge generating layer should respond. It is necessary that the covering layer transmits a light upon exposure of the photoconductor and allows the light to reach the charge generating layer, and then undergoes the injection of an electric charge generated in the charge generating layer to nuetralize and erase a surface electric charge. Materials usable in the covering layer include organic insulating film-forming materials such as polyesters and polyamides. Such organic materials may also be used in mixture with an inorganic material such as a glass resin or $SiO_2$, or an electric resistance-lowering material such as a metal or a metallic oxide. Materials usable in the covering layer are not limited to organic insulating film-forming materials, and further include inorganic materials such as $SiO_2$, metals, and metallic oxides, which may be formed into a covering layer by an appropriate method such as vacuum evaporation and deposition, or sputtering. From the viewpoint of the aforementioned description, it is desirable that the material to be used in the covering layer be as transparent as possible in the wavelength range wherein the charge generating substance attains maximum light absorption.

Although the thickness of the covering layer depends on the material or composition thereof, it can be arbitrarily set in so far as it does not produce any adverse effects including an increase in a residual potential in continuous repeated use.

The azo compounds to be used in the present invention can be synthesized by a customary method. The first group of the azo compounds are represented by the following general formula (I).

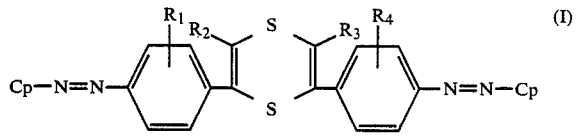
(I)

wherein, each of $R_1$, $R_2$, $R_3$ and $R_4$ stands for a hydrogen atom, a halogen atom, a hydroxy group, an alkyl grup, an alkoxy group, an allyl group, an aryl group, an aralkyl group, a carboxyl group or an ester group, and wherein $C_p$ stands for residual group of coupler.

These azo compounds represented by the general formula (I) can be synthesized according to the following process; that is, an amino compound represented by the general formula

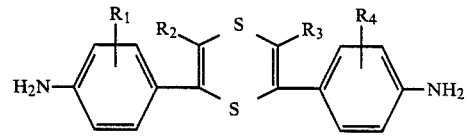

is diazotized by the usual method and the resultant diazo compound undergoes a coupling reaction with a corresponding coupler in a suitable solvent (for example, N,N-dimethylformamide dimethyl sulfoxide and the like) under the presence of an alkali.

Specific examples of azo compounds of the general formula (I) prepared in the above-mentioned manner include:

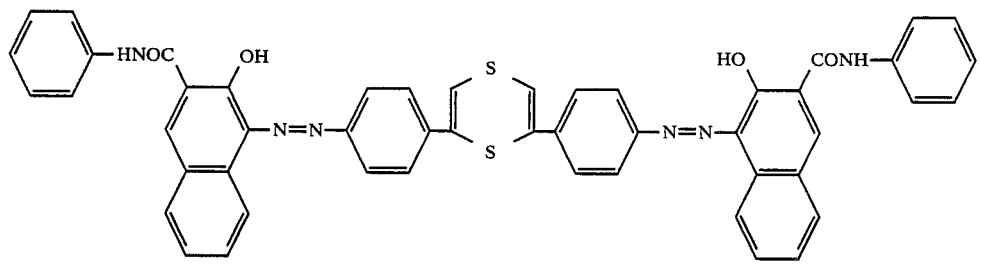
Compound No. I-1
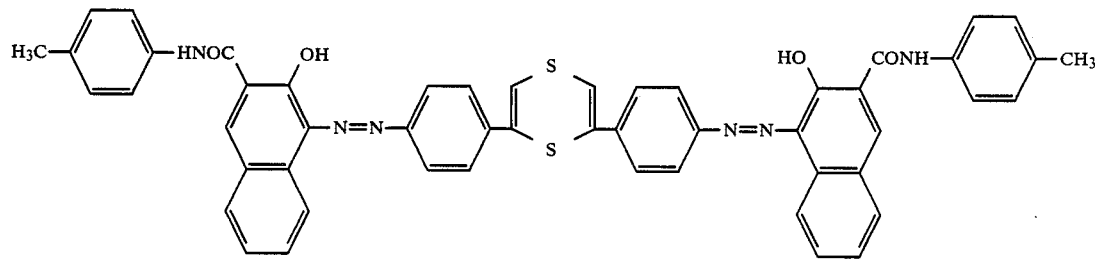
Compound No. I-2
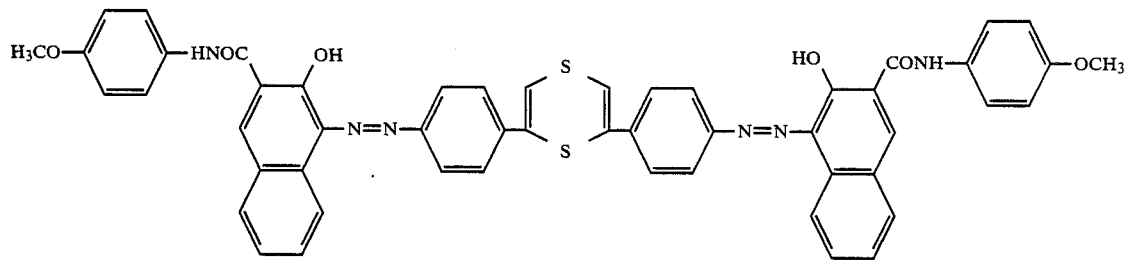
Compound No. I-3
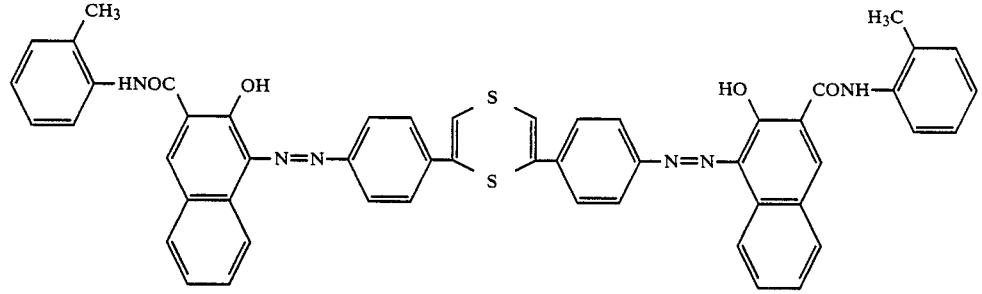
Compound No. I-4
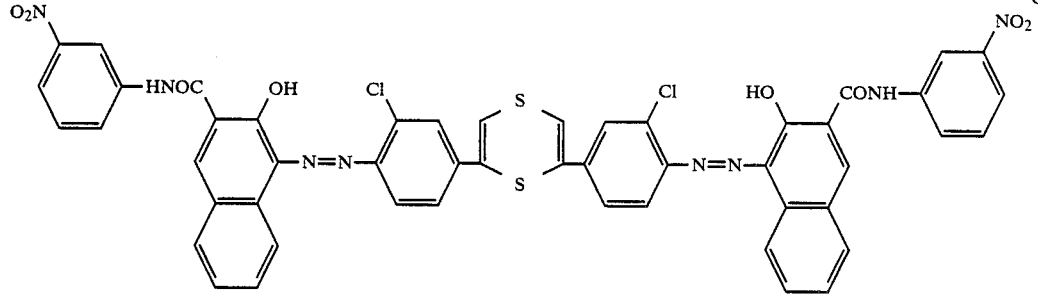
Compound No. I-5

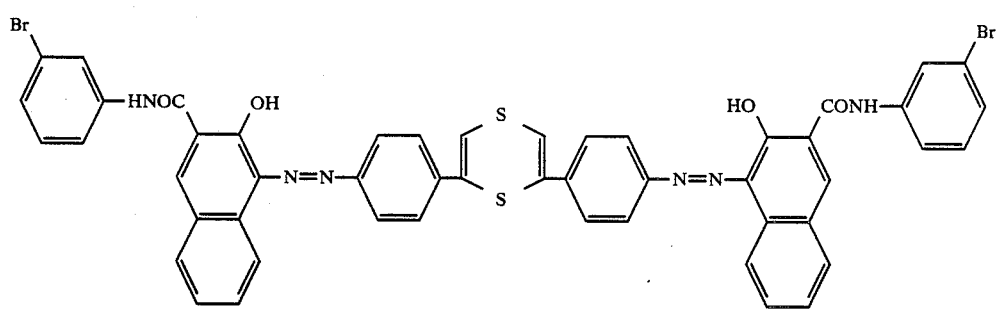
Compound No. I-6
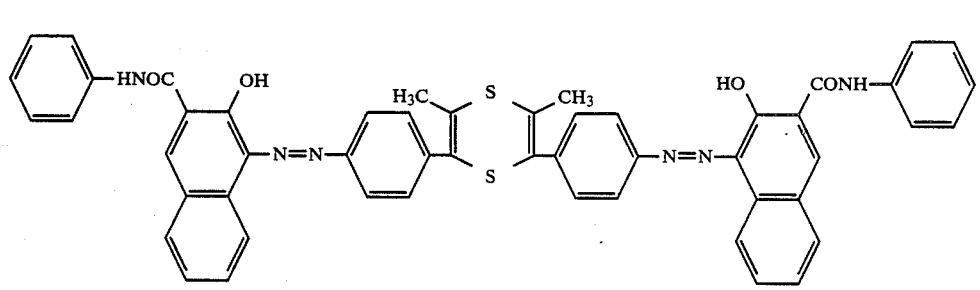
Compound No. I-7
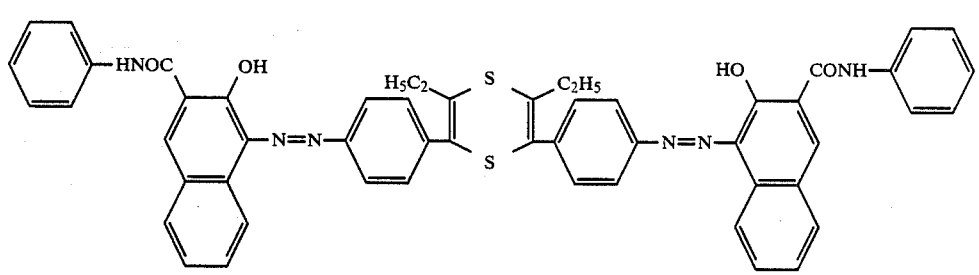
Compound No. I-8
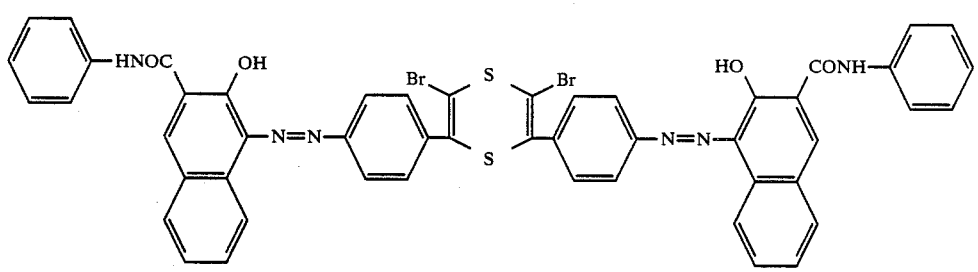
Compound No. I-9
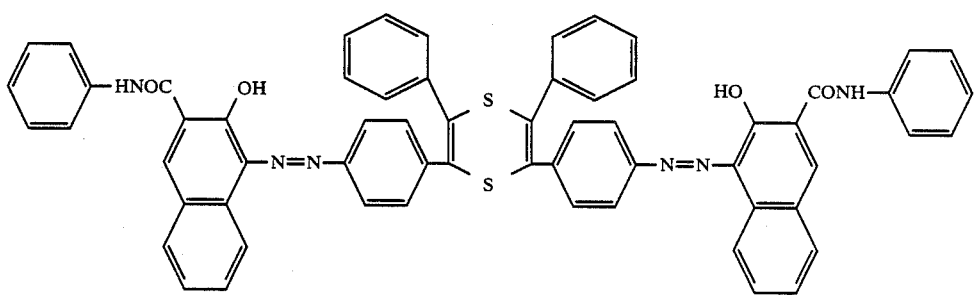
Compound No. I-10

-continued
Compound No. I-11
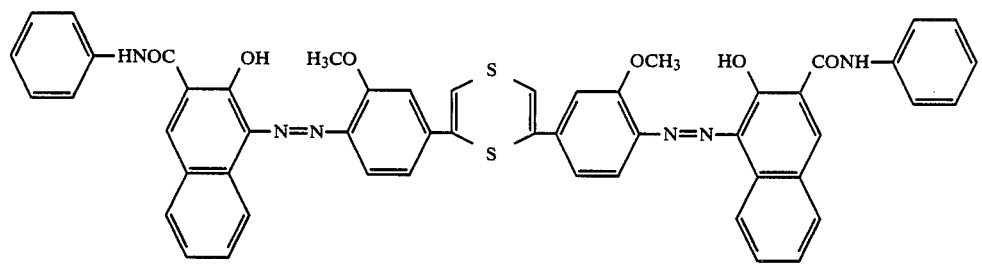
Compound No. I-12
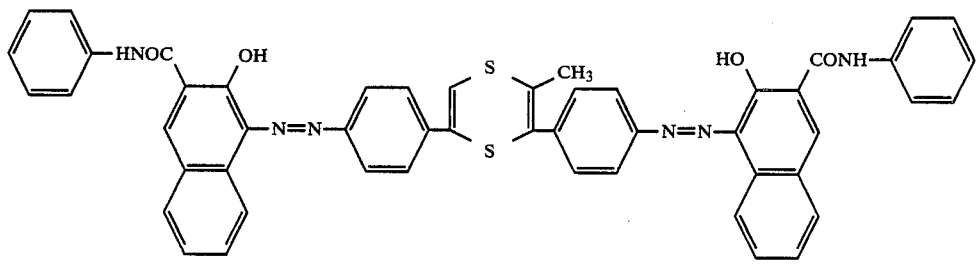
Compound No. I-13
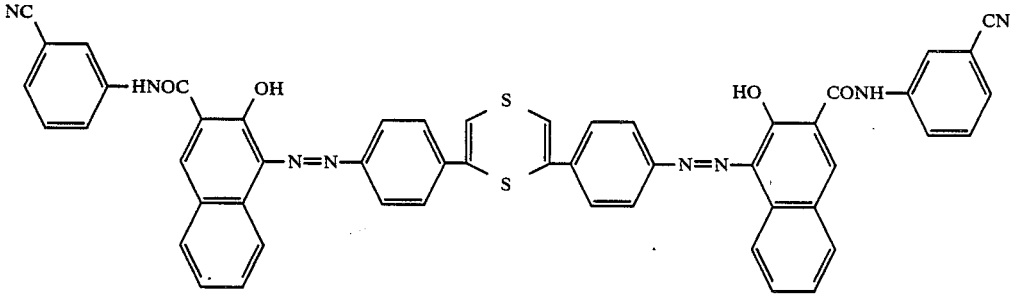
Compound No. I-14
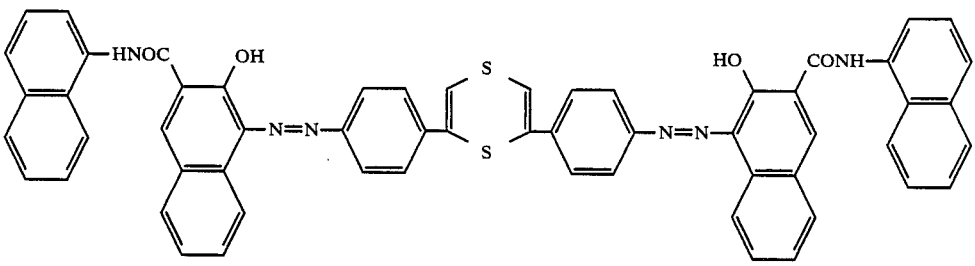
Compound No. I-15
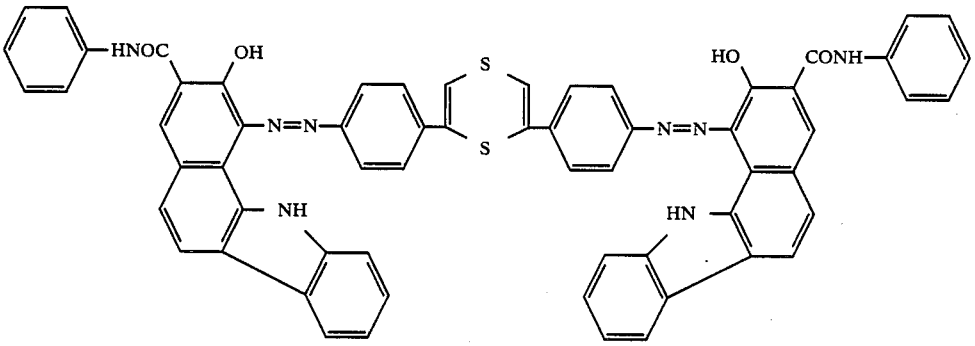

-continued
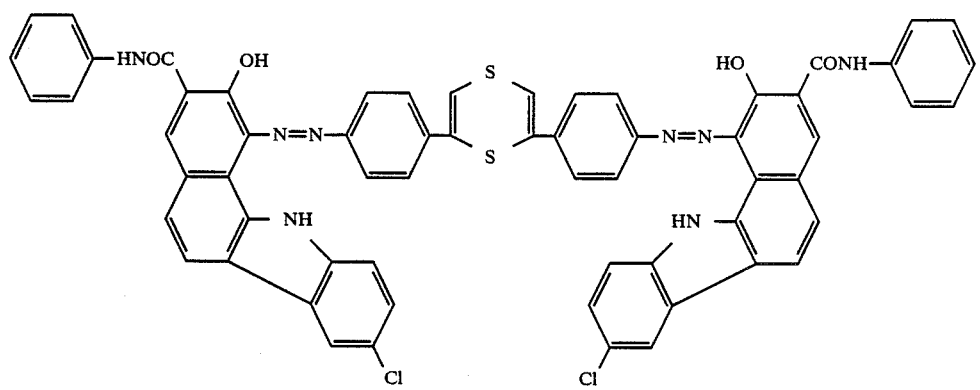
Compound No. I-16
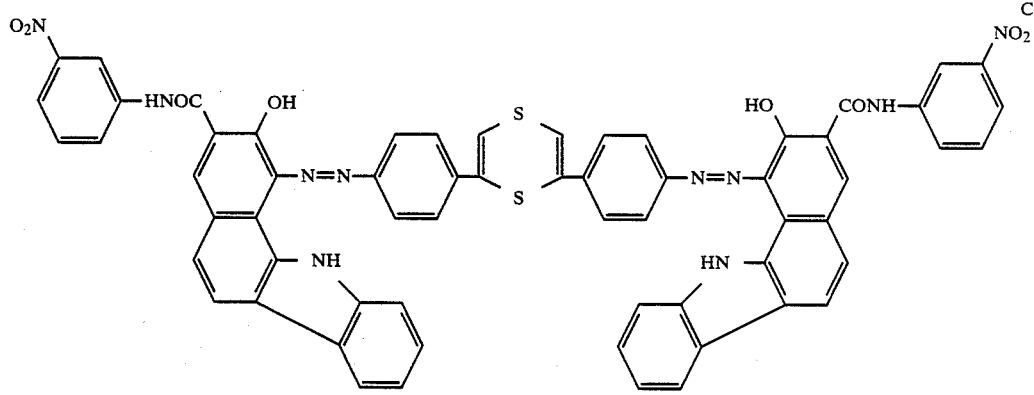
Compound No. I-17
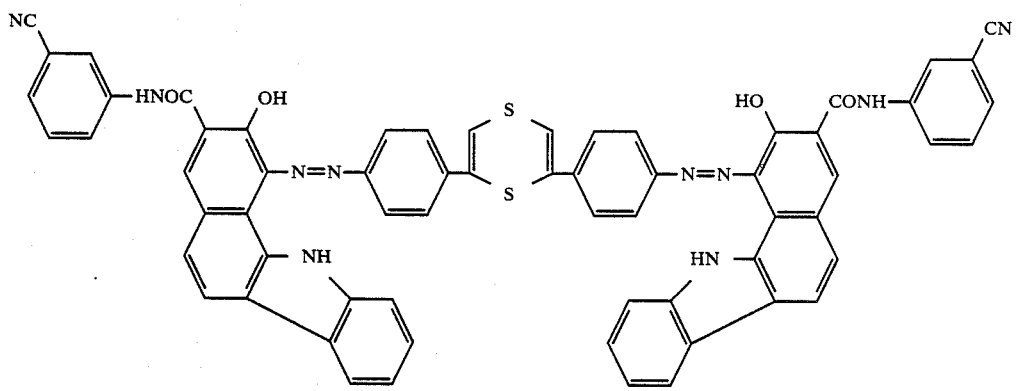
Compound No. I-18
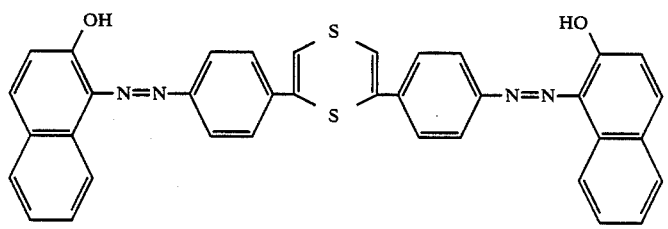
Compound No. I-19

-continued
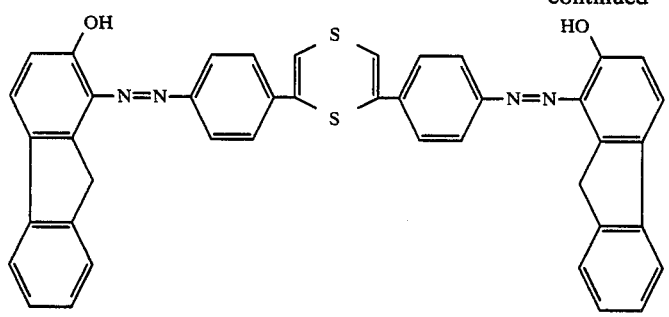
Compound No. I-20
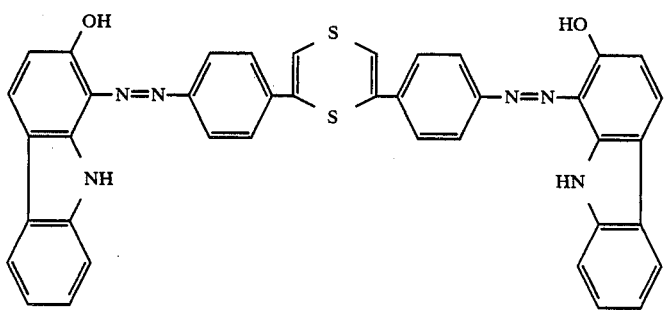
Compound No. I-21
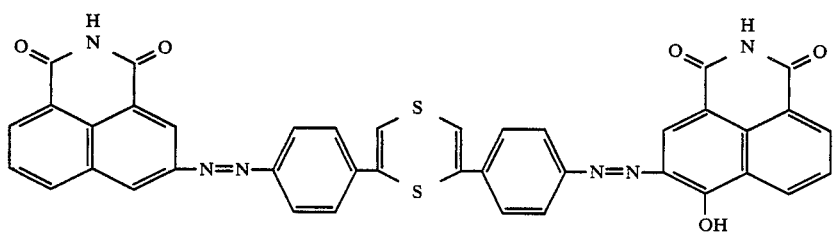
Compound No. I-22
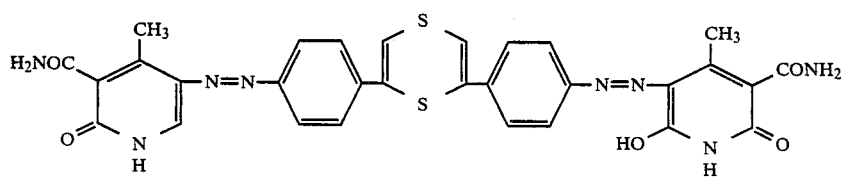
Compound No. I-23
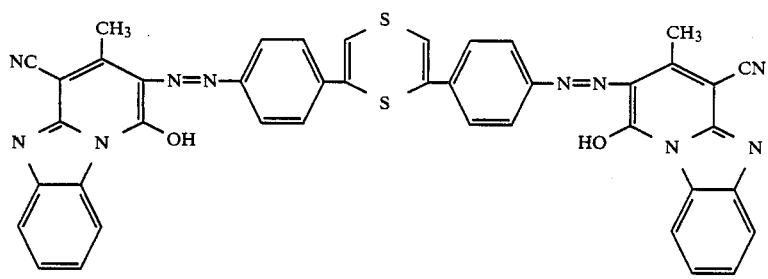
Compound No. I-24
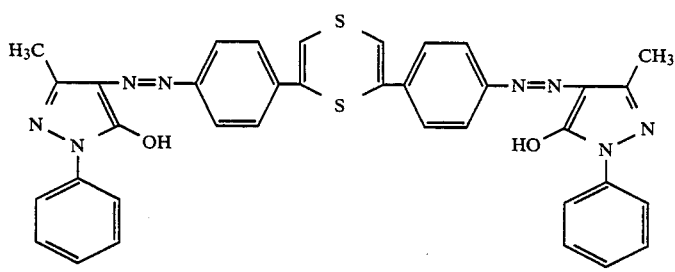
Compound No. I-25

-continued

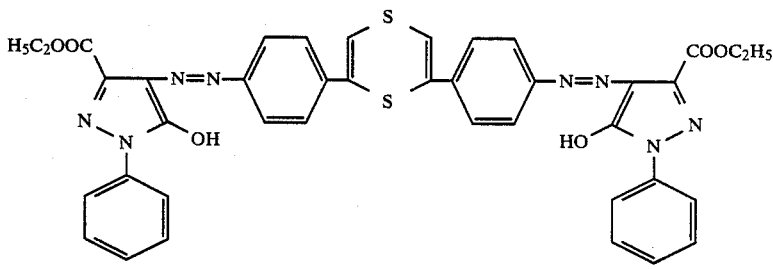

Compound No. I-26

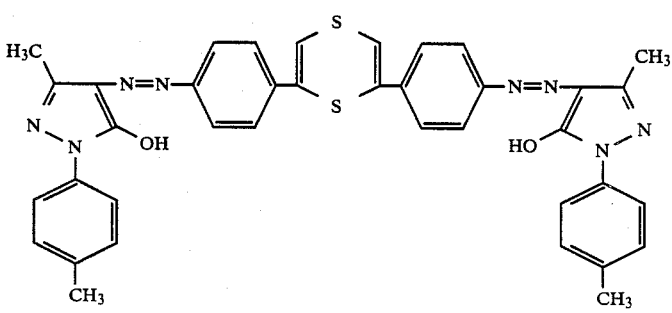

Compound No. I-27

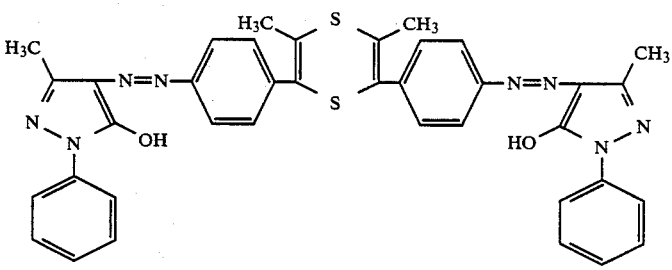

Compound No. I-28

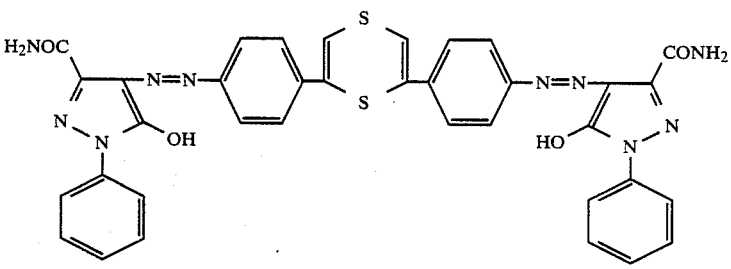

Compound No. I-29

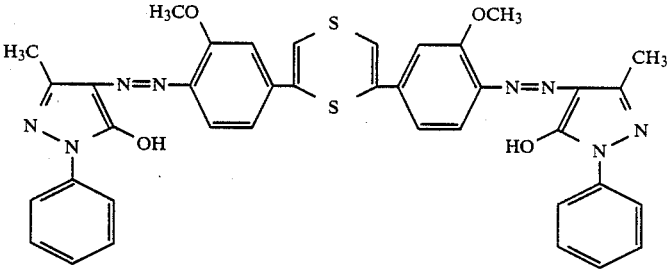

Compound No. I-30

The Examples of the present invention will be explained.

EXAMPLE I-1

50 parts by weight of the azo compound No. I-1, 100 parts by weight of a polyester resin and 100 parts by weight of 1-phenyl-3-(p-diethylaminostyryl)-5-(p-diethylaminophenyl) are mixed with tetrahydrofuran (THF) as a solvent with a mixer for 3 hours to prepare a coating liquid. The coating liquid was applied on an aluminum-deposited polyester film (Al-PET) as an electroconductive substrate by means of the wire bar technique to form a photosensitive layer having a dry thickness of 15 μm. Thus, a photoconductor with the structure shown in FIG. 1 was produced.

EXAMPLE I-2

A solution of 100 parts by weight of p-diethylaminobenzaldehyde-diphenylhydrazone (ABPH) in 700 parts by weight of tetrahydrofuran (THF) was mixed with a solution of 100 parts by weight of polycarbonate in 700 parts by weight of mixed solvent including the same parts of THF and dichloromethane to prepare a coating liquid. The coating liquid was applied on an aluminum-deposited polyester film substrate by the wire bar technique to form a charge transporting layer having a dry thickness of 15 μm. 50 parts by weight of azo compound No. I-1, 50 parts by weight of a polyester resin, and 50 parts by weight of PMMA were kneaded with a mixer for 3 hours together with THF as a solvent to prepare a coating liquid, which was then applied on the charge transporting layer by the wire bar technique to form a charge generating layer having a dry thickness of 0.5 μm. Thus, a photoconductor with a structure corresponding to that shown in FIG. 3 was produced.

EXAMPLE I-3

A charge transporting layer was produced by forming a photosensitive layer in substantially the same manner as in Example I-2 except that α-phenyl-4'-N,N-dimethylaminostilbene, which is a styryl compound, was used to replace ABPH as the charge transporting substance. Then a charge generating layer was formed on the charge transporting layer, thus a photoconductor was produced.

EXAMPLE I-4

A charge transporting layer was produced by forming a photosensitive layer in substantially the same manner as in Example I-2 except that tri(p-toryl)amine, which is a triphenylamine compoud, was used to replace ABPH as the charge transporting substance. Then a charge generating layer was formed on the charge transporting layer, thus a photoconductor was produced.

EXAMPLE I-5

A charge transporting layer was produced by forming a photosensitive layer in substantially the same manner as in Example I-2 except that 2,5-bis(p-diethylaminophenyl)-1,3,4-oxadiazole, which is a oxadiazole compoud, was used to replace ABPH as the charge transporting substance. Then a charge generating layer was formed on the charge transporting layer, thus a photoconductor was produced.

The electrophotographic characteristics of the five photoconductors thus produced were measured by utilizing an electrostatic recording paper testing apparatus (Kawaguchi Denki Model SP-428).

The surface potential $V_s$ (volts) of each photoconductor is an initial surface potential which was measured when the surface of the photoconductor was positively charged in the dark by corona discharge at +6.0 kV for 10 seconds. After the discontinuation of the corona discharge, the member was allowed to stand in the dark for 2 seconds, after which the surface potential $V_s$ (volts) of the member was measured. Subsequently, the surface of the photoconductor was irradiated with white light at an illuminance of 2 luxes and the time (seconds) required for the irradiation to decrease the surface potential of the member to half of the $V_s$ was measured, then from which time and the illuminance the half decay exposure amount $E_{\frac{1}{2}}$ (lux.sec) was calculated. Also, the surface potential of the member after 10 seconds of irradiation thereof with white light at an illuminance of 2 luxes was measured as a residual potential $V_r$ (volts). The results of the measurements are shown in Table 1.

TABLE 1

| Example | $V_s$ (Volts) | $V_r$ (Volts) | $E_{\frac{1}{2}}$ (lux · sec) |
|---|---|---|---|
| I-1 | 550 | 80 | 5.9 |
| I-2 | 520 | 100 | 5.1 |
| I-3 | 490 | 90 | 5.1 |
| I-4 | 500 | 60 | 4.8 |
| I-5 | 540 | 80 | 5.0 |

As can be seen in Table 1, the photoconductors of Examples I-1, I-2, I-3, I-4 and I-5 have good surface potential, residual potential and half decay exposure amount characteristics.

EXAMPLE I-6

100 parts by wieght of each of respective azo compounds Nos. from I-2 to I-30 and 100 parts by weight of polyester were mixed with THF as a solvent with a mixer for 3 hours to prepare a coating liquid. The respective coating liquids were applied on aluminum substrates to form a photogenerating layer having a dry thickness of about 0.5 μm. Further, the coating liquid described in Example I-2, which include ABPH as a charge transporting substance, was applied on the respective charge generating layer having a dry thickness of about 15 μm, thus photconductors as shown in FIG. 2 were produced.

The measured value of the half decay exposure amount $E_{\frac{1}{2}}$ and the residual potential of the above-mentioned examples are shown in Table 2. As shown in Table 2, all photoconductors were satisfactory with respect to the half decay exposure amount and the residual potential.

TABLE 2

| Compound No. | $E_{\frac{1}{2}}$ (lux · sec) | $V_r$ (volt) (−) |
|---|---|---|
| I-2 | 4.8 | 90 |
| I-3 | 4.7 | 70 |
| I-4 | 5.3 | 60 |
| I-5 | 5.4 | 80 |
| I-6 | 6.0 | 90 |
| I-7 | 5.9 | 60 |
| I-8 | 6.3 | 70 |
| I-9 | 4.9 | 110 |
| I-10 | 4.5 | 80 |
| I-11 | 4.9 | 90 |
| I-12 | 5.8 | 100 |
| I-13 | 4.8 | 70 |
| I-14 | 5.2 | 90 |
| I-15 | 5.0 | 110 |
| I-16 | 4.2 | 70 |
| I-17 | 4.9 | 100 |
| I-18 | 4.6 | 90 |
| I-19 | 5.5 | 80 |
| I-20 | 5.8 | 80 |
| I-21 | 6.0 | 90 |
| I-22 | 6.2 | 100 |
| I-23 | 5.8 | 120 |
| I-24 | 5.5 | 110 |
| I-25 | 5.7 | 100 |
| I-26 | 5.6 | 90 |
| I-27 | 5.1 | 100 |
| I-28 | 6.5 | 60 |
| I-29 | 6.0 | 80 |
| I-30 | 4.6 | 70 |

The second group of the azo compounds to be used in the present invention are represented by the following general formula (II).

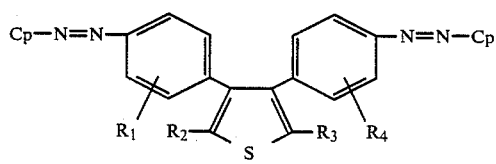 (II)

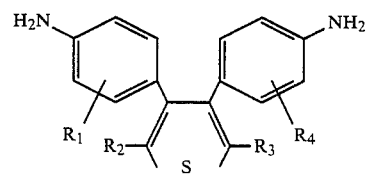

wherein each of $R_1$, $R_2$, $R_3$ and $R_4$ stands for a hydrogen atom, a halogen atom, a hydroxy group, an alkyl group, an alkoxy group, an allyl group, an aryl group, an aralkyl group, a carboxyl group or an ester group, and wherein $C_p$ stands for residual group of coupler.

These azo compouds represented by the general formula (II) can be synthesized according to the following process; that is, an amino compound represented by the general formula is diazotized by the usual method and the resultant diazo compound undergoes a coupling reaction with a corresponding coupler in a suitable solvent (for example, N,N-dimethylformamide dimethyl sulfoxide and the like) in the presence of an alkali.

Specific examples of azo compounds of the general formula (II) prepared in the above-mentioned manner include:

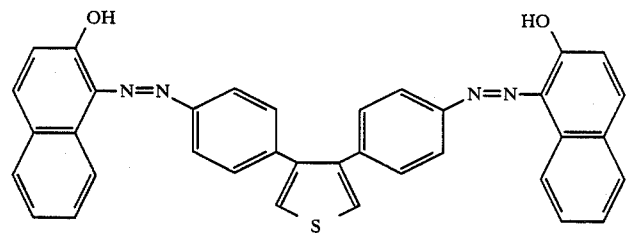

Compound No. II-1

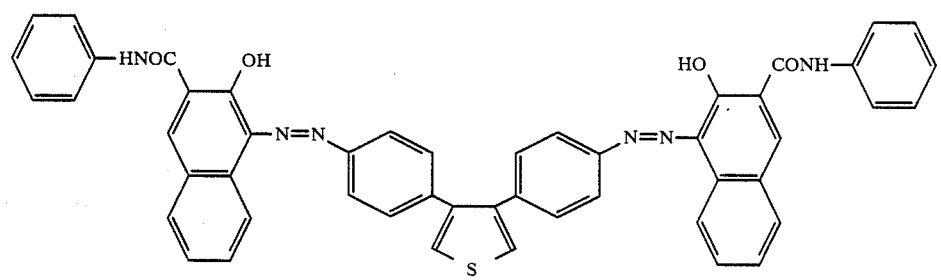

Compound No. II-2

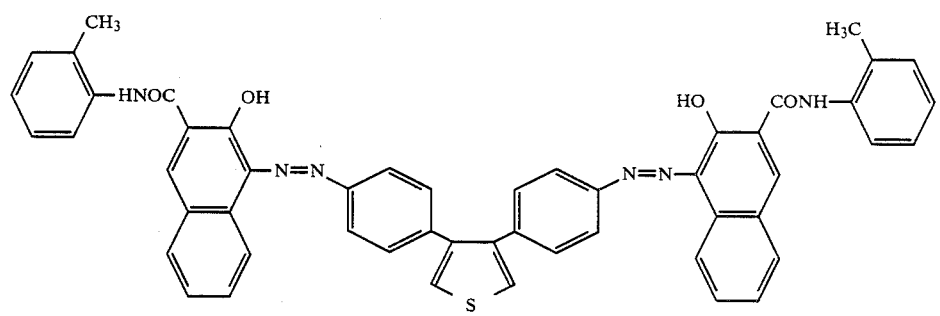

Compound No. II-3

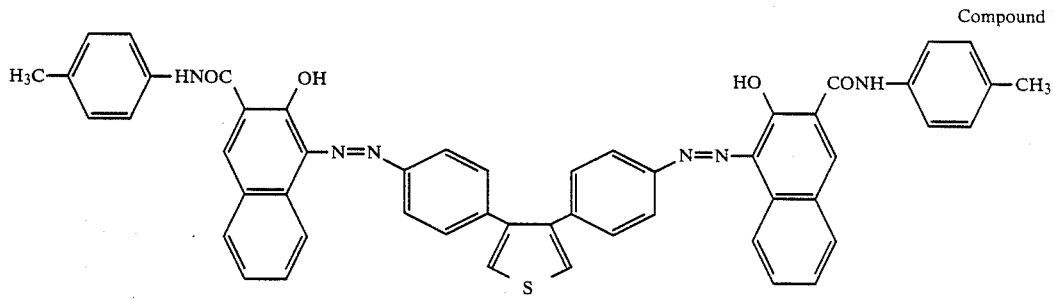

Compound No. II-4

-continued
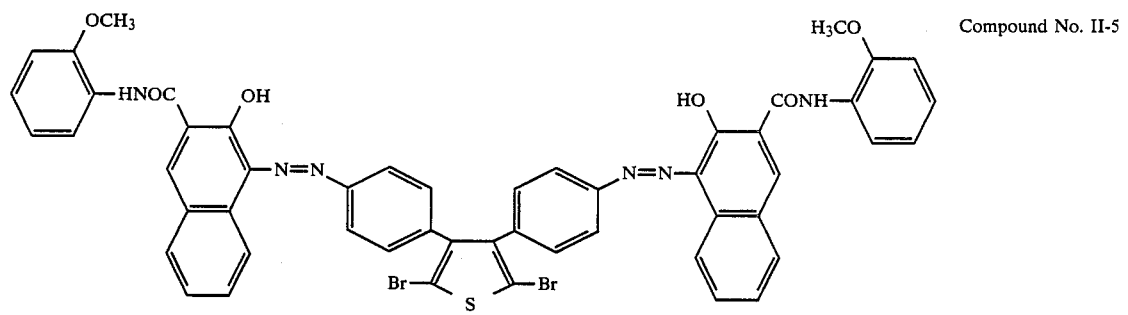
Compound No. II-5
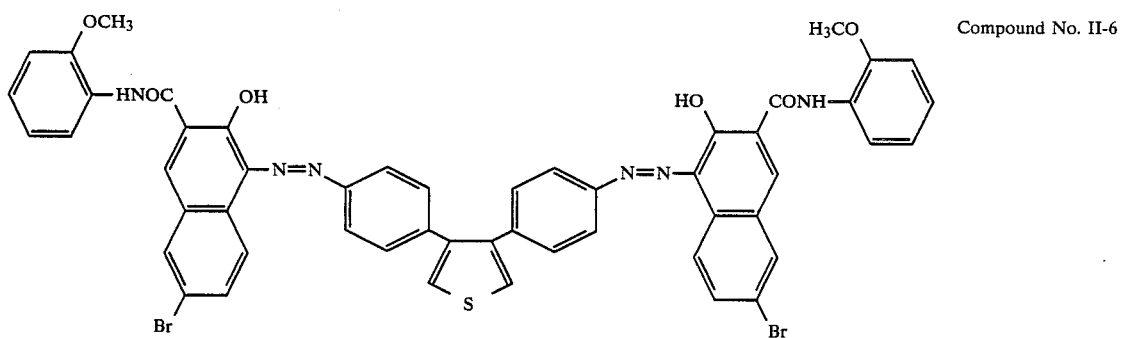
Compound No. II-6
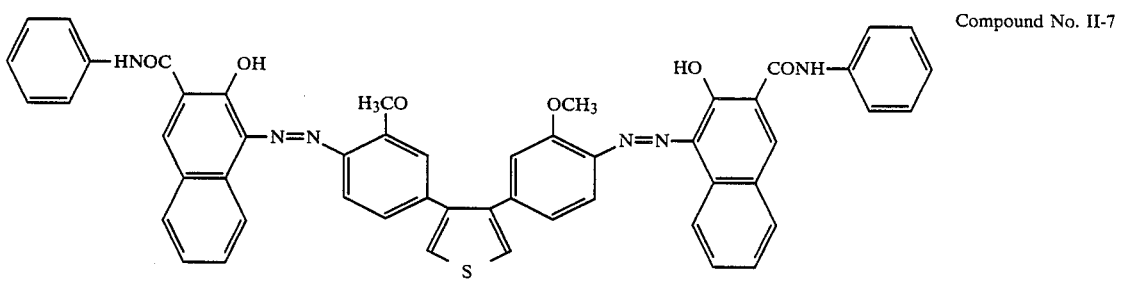
Compound No. II-7
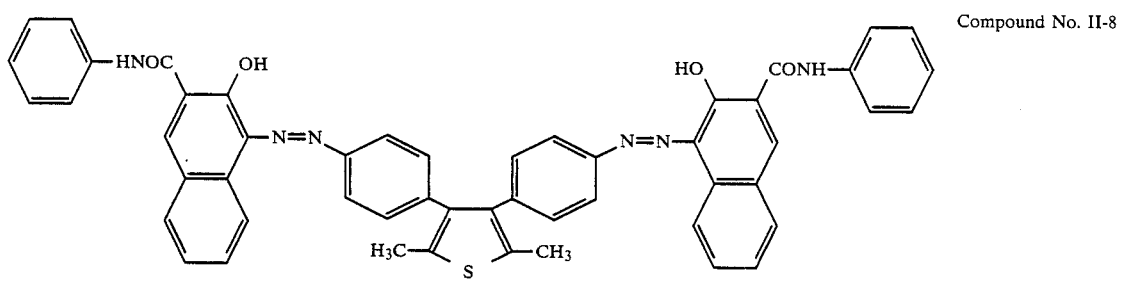
Compound No. II-8
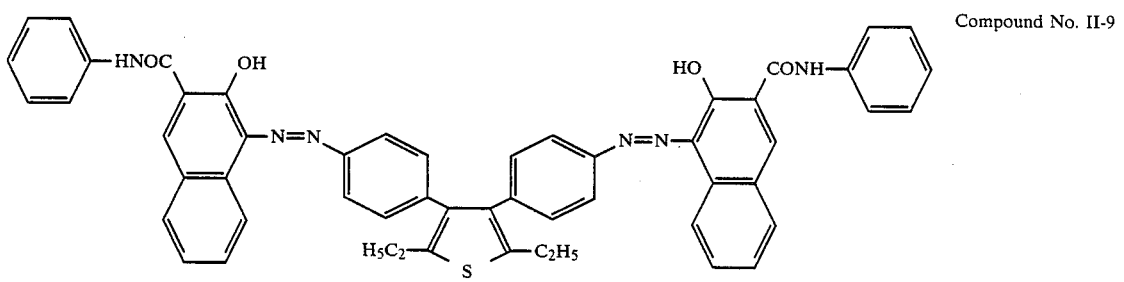
Compound No. II-9

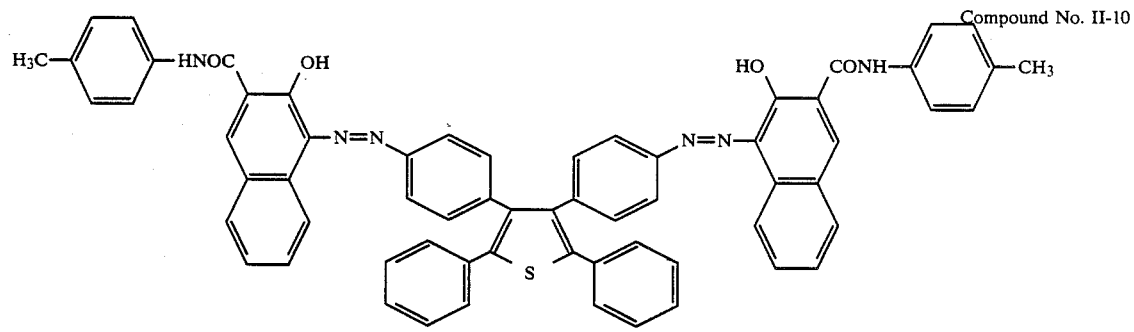
Compound No. II-10
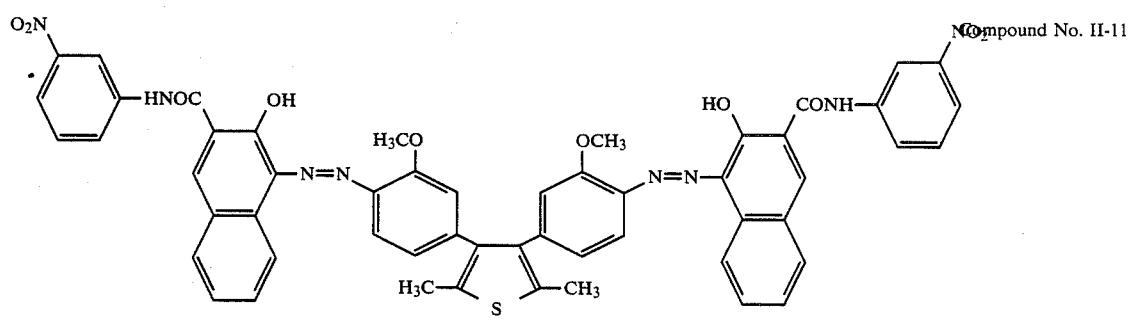
Compound No. II-11
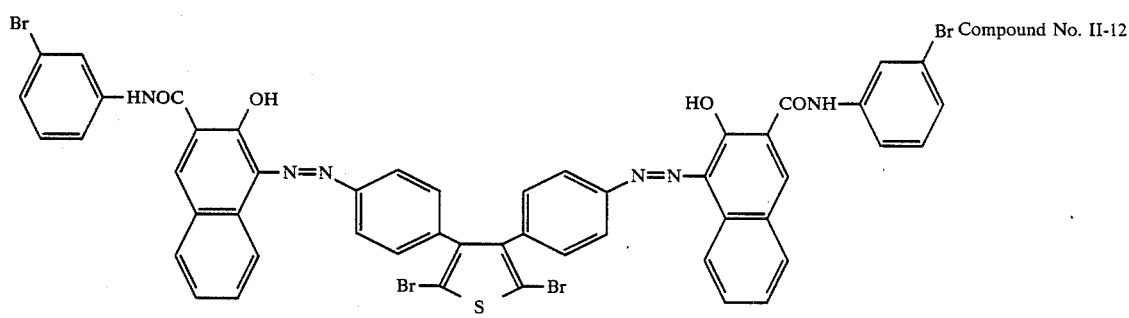
Compound No. II-12
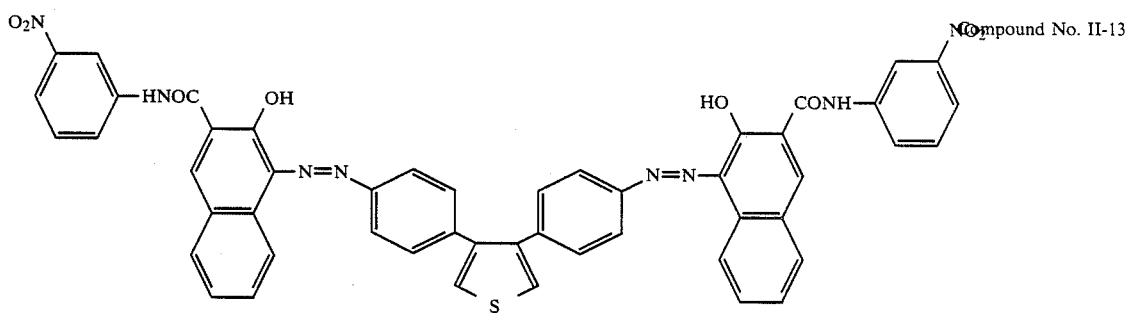
Compound No. II-13
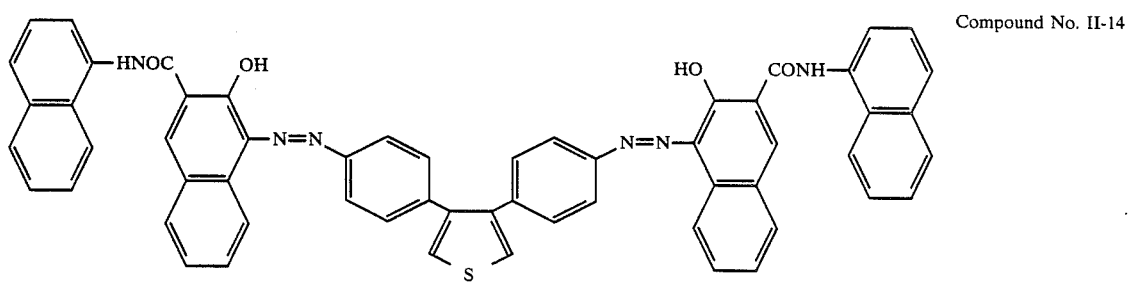
Compound No. II-14

-continued
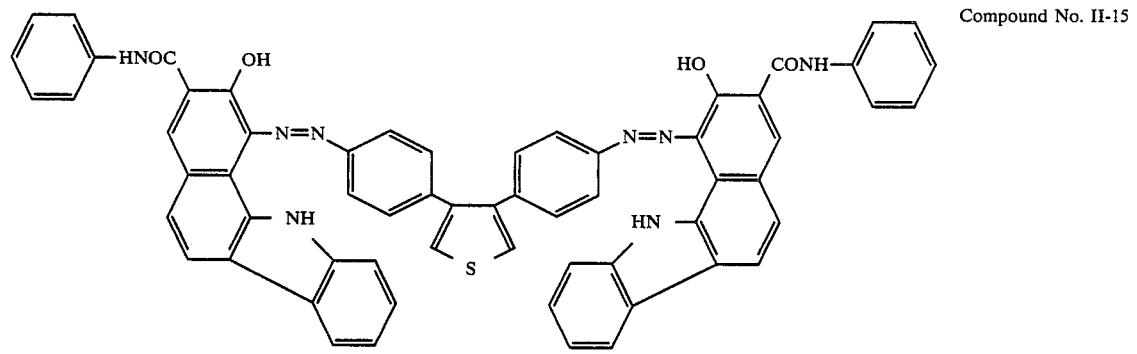
Compound No. II-15
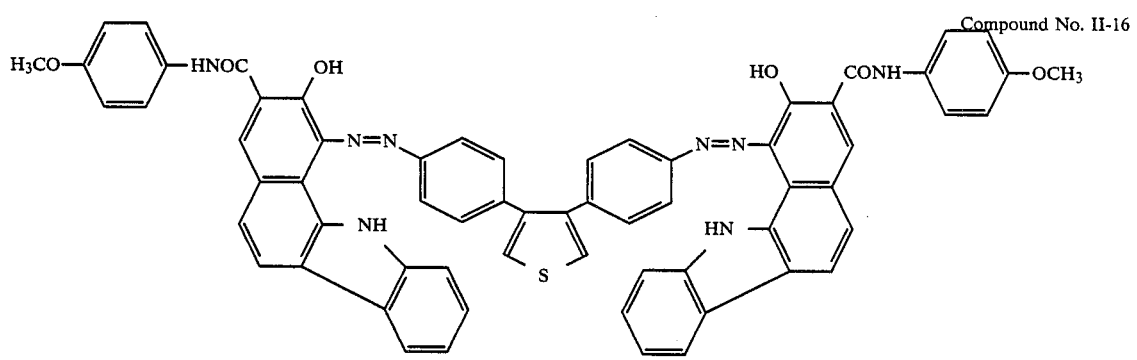
Compound No. II-16
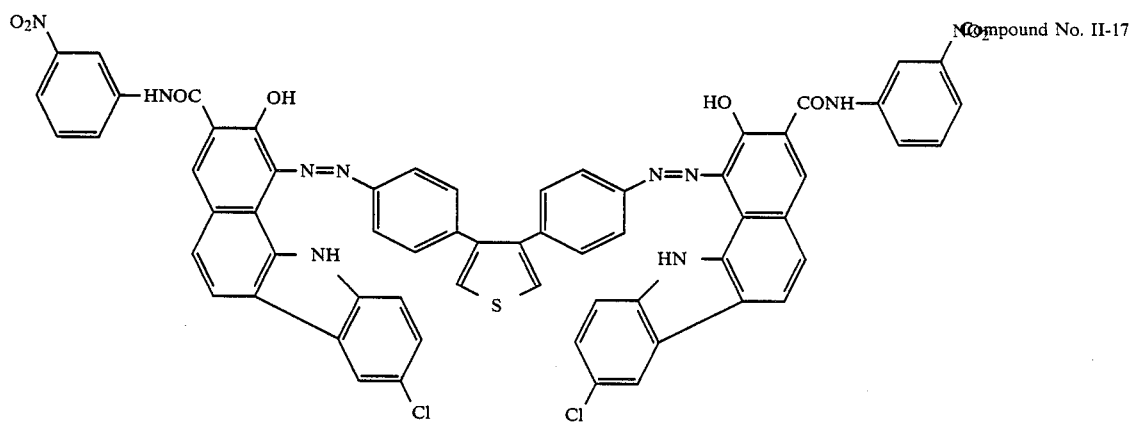
Compound No. II-17
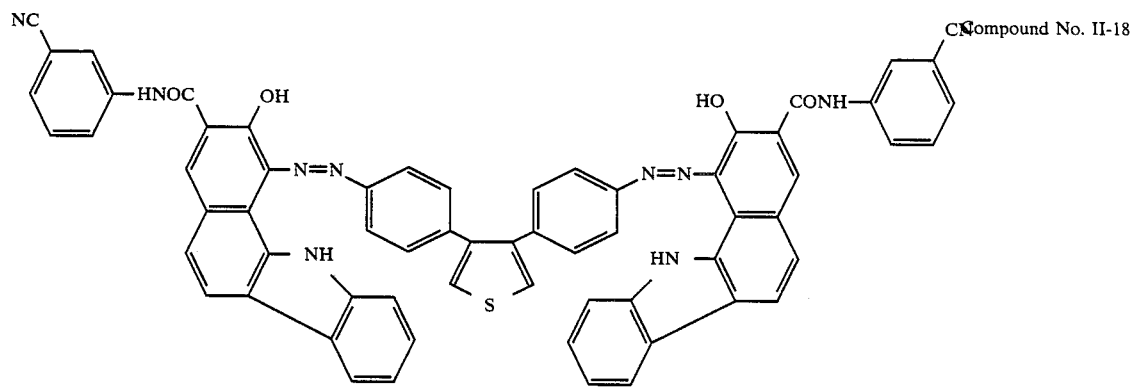
Compound No. II-18

-continued
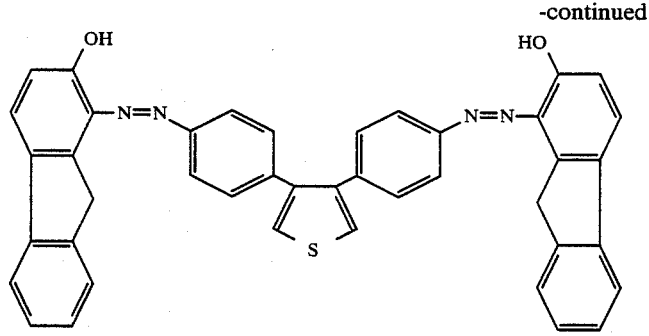
Compound No. II-19
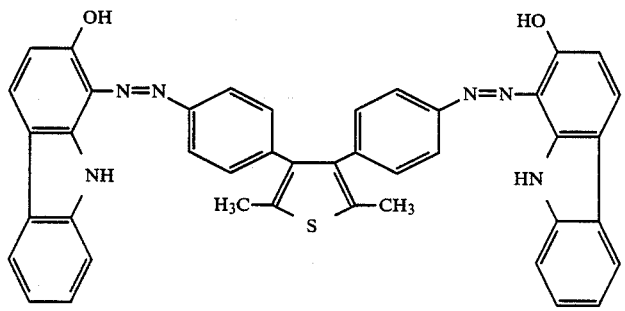
Compound No. II-20
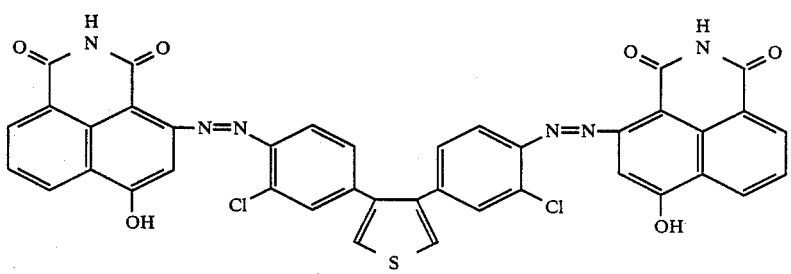
Compound No. II-21
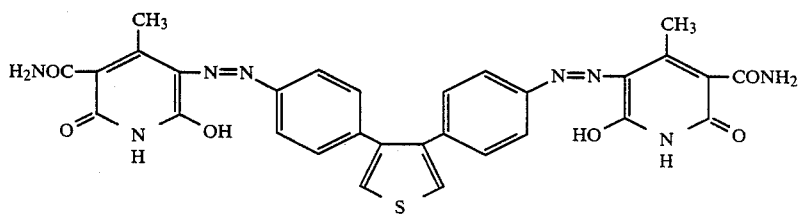
Compound No. II-22
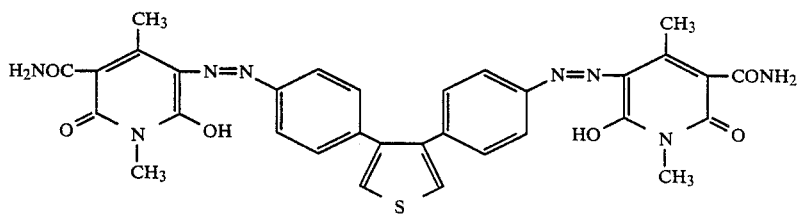
Compound No. II-23
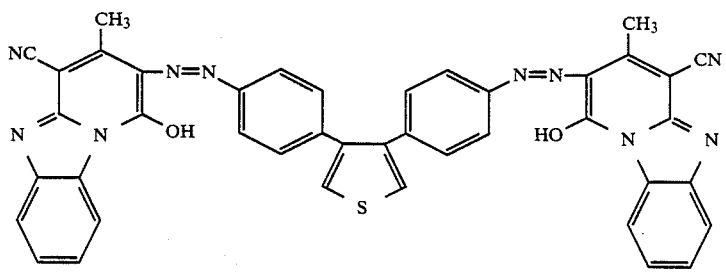
Compound No. II-24

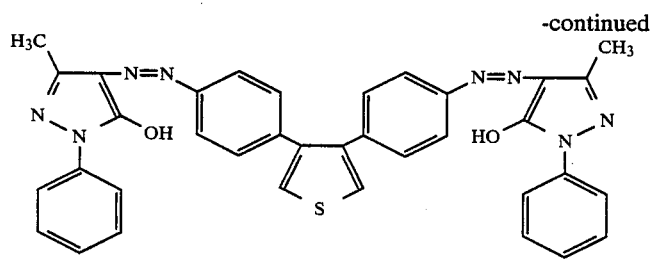

Compound No. II-25

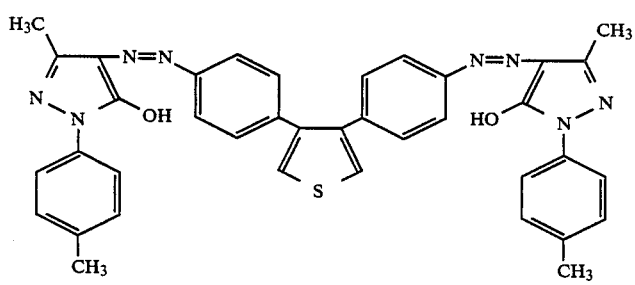

Compound No. II-26

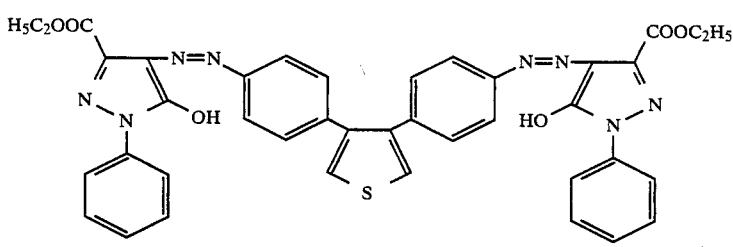

Compound No. II-27

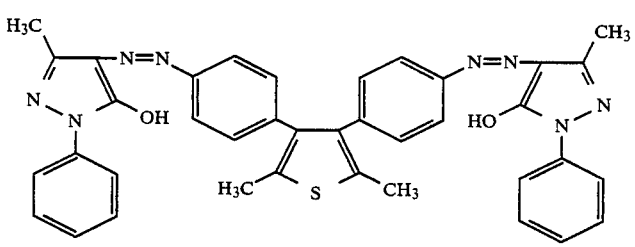

Compound No. II-28

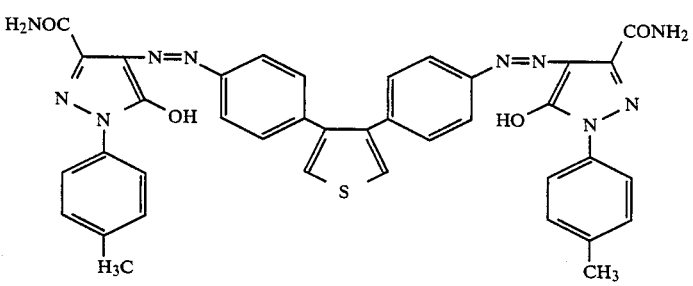

Compound No. II-29

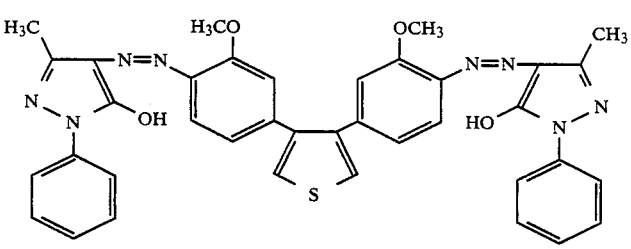

Compound No. II-30

Examples will now be given, wherein various compounds represented by the general formula (II) were respectively used to produce photoconductors.

EXAMPLE II-1

A photoconductor having the structure shown in FIG. 1 and comprising a photosensitive layer having a thickness of 15 μm was produced in substantially the same manner as in Example I-1 except that the azo compound No. II-1 mentioned above was used instead of the compound No. I-1.

EXAMPLE II-2

A solution of 100 parts by weight of p-diethylaminobenzaldehyde-diphenylhydrazone (ABPH) in 700 parts by weight of tetrahydofuran (THF) was mixed with a solution of 100 parts by weight of polycarbonate in 700 parts by weight including the same parts of THF and dichloromethane to prepare a coating liquid. The coating liquid was applied on an aluminum-deposited polyester film substrate by the wire bar technique to form a charge transporting layer having a dry thickness of 15 μm. 50 parts by weight of azo compound No. II-1, 50 parts by weight of a polyester resin, and 50 parts by weight of PMMA were kneaded with a mixer for 3 hours together with THF as a solvent to prepare a coating liquid, which was then applied on the charge transporting layer by the wire bar technique to form a charge generating layer having a dry thickness of 0.5 μm. Thus, a photoconductor with a structure corresponding to that shown in FIG. 3 was produced.

EXAMPLE II-3

A charge transporting layer was produced by forming a photosensitive layer in substantially the same manner as in Example II-2 except that α-phenyl-4'N,N-dimethylaminostilbene, which is a styryl compound, was used to replace ABPH as the charge transporting substance. Then a charge generating layer was formed on the charge transporting layer, thus a photoconductor was produced.

EXAMPLE II-4

A charge transporting layer was produced by forming a photosensitive layer in substantially the same manner as in Example II-2 except that tri(p-toryl)amine, which is a triphenylamine compound, was used to replace ABPH as the charge transporting substance. Then a charge generating layer was formed on the charge transporting layer, thus a photoconductor was produced.

EXAMPLE II-5

A charge transporting layer was produced by forming a photosensitive layer in substantially the same manner as in Example II-2 except that 2,5-bis(p-diethylaminophenyl)-1,3,4-oxadiazole, which is an oxadiazole compound, was used to replace ABPH as the charge transporting substance. Then a charge generating layer was formed on the charge transporting layer, thus a photoconductor was produced.

The electrophotographic characteristics of the five photoconductors thus produced were measured by utilizing an electrostatic recording paper testing apparatus Model SP-428.

The measured values of the surface potentials $V_s$, residual potential $V_r$ and half decay exposure amount $E_{\frac{1}{2}}$ are shown in Table 3. As shown in Table 3, all photoconductors were satisfactory with respect to the surface potential, the residual potential and the half decay exposure amount.

TABLE 3

| Example | $V_s$ (Volts) | $V_r$ (Volts) | $E_{\frac{1}{2}}$ (lux · sec) |
|---|---|---|---|
| II-1 | 520 | 100 | 4.9 |
| II-2 | 565 | 110 | 4.8 |
| II-3 | 580 | 110 | 5.5 |
| II-4 | 480 | 120 | 5.1 |

TABLE 3-continued

| Example | $V_s$ (Volts) | $V_r$ (Volts) | $E_{\frac{1}{2}}$ (lux · sec) |
|---|---|---|---|
| II-5 | 520 | 110 | 4.7 |

EXAMPLE II-6

100 parts by weight of each of respective azo compounds Nos. from II-2 to II-30 and 100 parts by weight of polyester were mixed with THF as a solvent with a mixer for 3 hours to prepare a coating liquid. The respective coating liquids were applied on aluminum substrates to form a photogenerating layer having a dry thickness of about 0.5 μm. Further, the coating liquid described in Example II-2, which include ABPH as a charge transporting substance, was applied on the respective charge generating layer having a dry thickness of about 15 μm, thus photoconductors as shown in FIG. 2 were produced.

The measured value of the half decay exposure amount $E_{\frac{1}{2}}$ and the residual potential of the above-mentioned examples are shown in Table 4. As shown in Table 4, all photoconductors have good characteristics.

TABLE 4

| Compound No. | $E_{\frac{1}{2}}$ (lux · sec) | $V_r$ (volt) (−) |
|---|---|---|
| II-2 | 5.0 | 50 |
| II-3 | 4.6 | 80 |
| II-4 | 4.8 | 110 |
| II-5 | 5.9 | 100 |
| II-6 | 6.1 | 100 |
| II-7 | 7.0 | 80 |
| II-8 | 6.0 | 100 |
| II-9 | 4.7 | 80 |
| II-10 | 4.8 | 90 |
| II-11 | 5.9 | 110 |
| II-12 | 4.8 | 70 |
| II-13 | 4.2 | 60 |
| II-14 | 4.9 | 110 |
| II-15 | 5.2 | 90 |
| II-16 | 5.1 | 70 |
| II-17 | 5.1 | 90 |
| II-18 | 4.1 | 80 |
| II-19 | 5.8 | 100 |
| II-20 | 4.5 | 120 |
| II-21 | 6.2 | 100 |
| II-22 | 6.1 | 80 |
| II-23 | 6.8 | 70 |
| II-24 | 5.3 | 60 |
| II-25 | 6.5 | 90 |
| II-26 | 5.1 | 100 |
| II-27 | 4.9 | 110 |
| II-28 | 4.8 | 80 |
| II-29 | 4.7 | 90 |
| II-30 | 6.0 | 60 |

As can be seen in Table 4, the photoconductors using the respective azo compounds Nos. II-6 to II-30 were satisfactory with respect to the half decay exposure amount $E_{\frac{1}{2}}$ and residual potential $V_r$.

The first group of disazo compound to be used in the present invention is represented by a general formula (III).

$$C_p-N=N-D-N=N-C_p \quad \text{(III)}$$

wherein D stands for one of the structures represented by the following general formulae (IIIA) to (IIIC), and wherein $C_p$ stands for a residual group of a coupler.

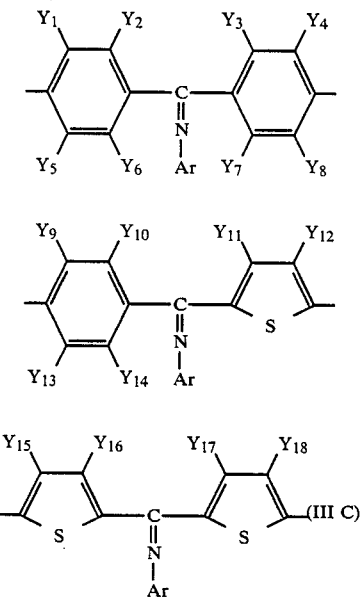

(III A)

(III B)

(III C)

In formulae (IIIA) to (IIIC), each of $Y_1$ to $Y_{18}$ stands for a hydrogen atom, a cyano group, a carbamoyl group, a carboxyl group, an ester group, an acyl group, a halogen atom, a sulfonic group, an alkyl group, a cycloalkyl group, an alkenyl group, an aryl group and an aromatic heterocyclic group, each of the last five of which may have a substituent(s) and wherein $A_r$ stands for an aromatic hydrocarbon or an aromatic heterocyclic group each of which may have a substituent(s).

In the disazo compound represented by the general formula (III), $C_p$ preferably has one of structures represented by the following general formulae (IIID) to (IIIG):

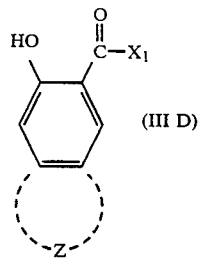

(III D)

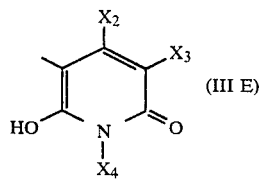

(III E)

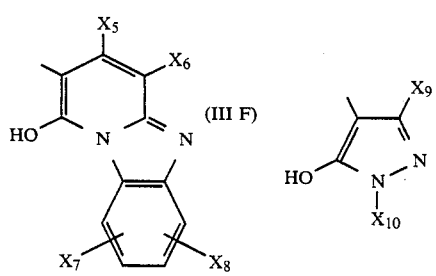

(III F)

(III G)

wherein Z stands for a residual group which forms a polycyclic aromatic ring or heterocyclic ring by condensation with a benzene ring, wherein $X_1$ stands for an —$OR_5$ group or an $NR_6R_7$ group (each of $R_5$, $R_6$ and $R_7$ standing for a hydrogen atom, an alkyl group, an aryl group, or an aromatic heterocyclic group, each of which may have a substituent(s)), wherein $X_2$ and $X_5$ stand for an alkyl group, an aryl gorup or an aromatic heterocyclic group, each of which may have a substituent(s), wherein $X_3$ and $X_6$ stand for a hydrogen atom, a cyano group a carbamoyl group, a carboxyl group, an ester group, or an acyl group, wherein $X_4$ stands for a hydrogen atom, an alkyl group, a cycloalkyl group, an alkenyl group, each of the last three of which may have a substituent(s), an aryl group or an aromatic hetrocyclic group, wherein $X_7$ and $X_8$ stand for a hydrogen atom, a halogen atom, a nitro group, an alkyl group which may have a substituent(s), or an alkoxy group which may have a substituent(s), wherein $X_9$ stands for an alkyl group, an aryl group, or a carboxyl group, and wherein $X_{10}$ stands for an aryl group, or an aromatic group each of which may have a substituent(s).

These diazo compounds are represented by the general formula (III) and can be synthesized according to the following process, that is, an amino commpound represented by one of following general formulae

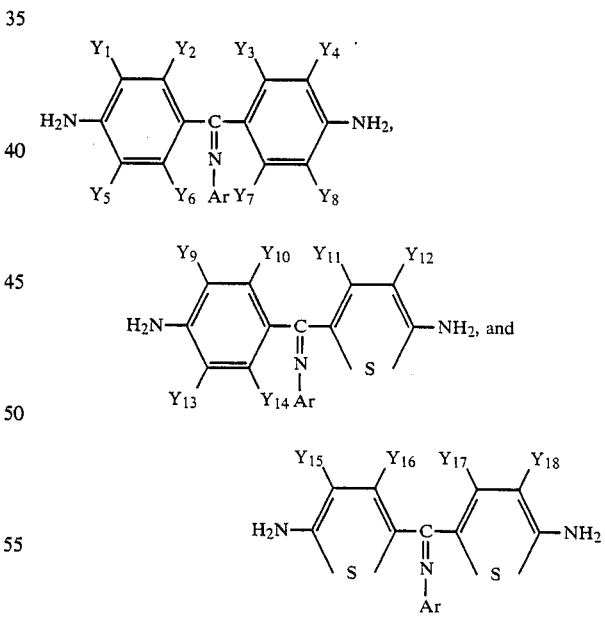

is diazotized by the usual method and the resultant diazo compound undergoes a coupling reaction with a corresponding coupler in a suitable solvent (for example, N,N-dimethylformamide, dimethyl sulfoxide and the like) in the presence of an alkali.

Specific examples of disazo compounds of the general formula (III) prepared in the above-mentioned manner include:

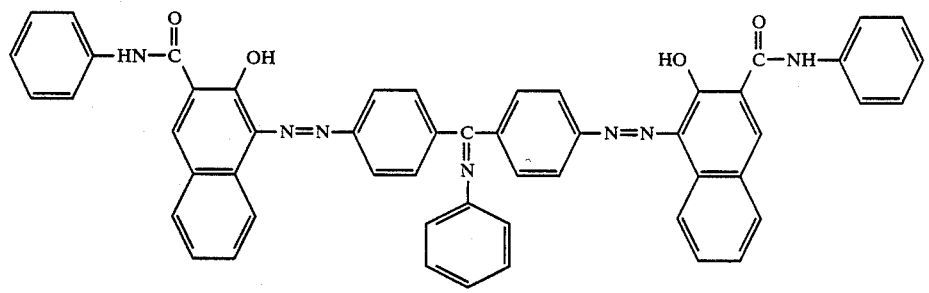
Compound No. III-1
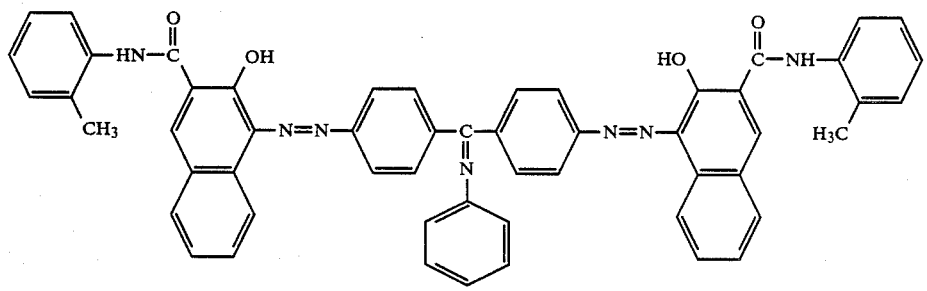
Compound No. III-2
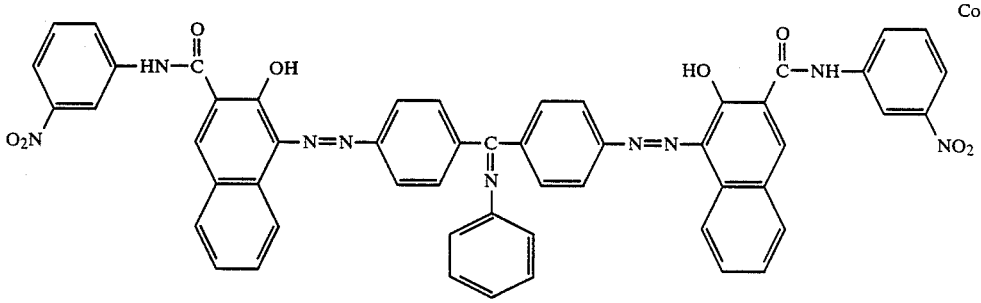
Compound No. III-3
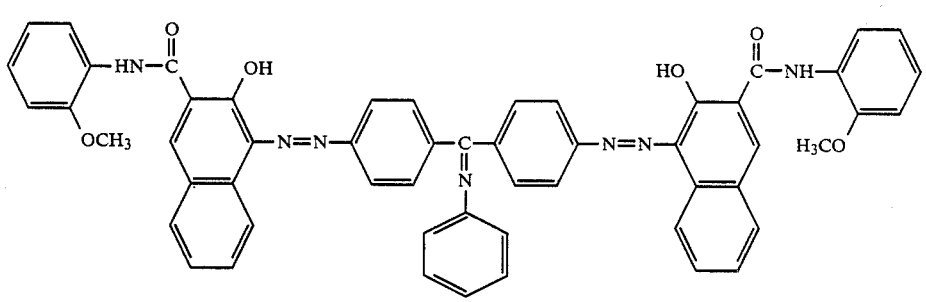
Compound No. III-4
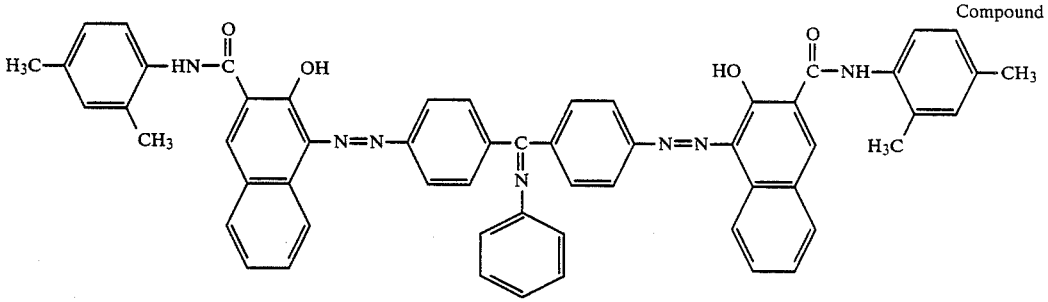
Compound No. III-5

-continued
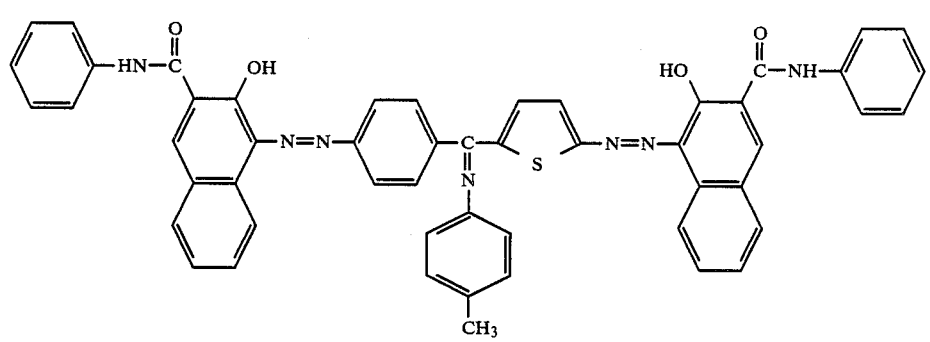
Compound No. III-6
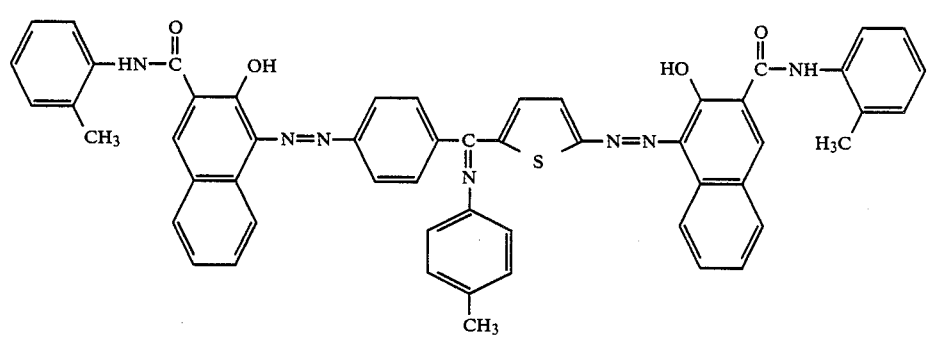
Compound No. III-7
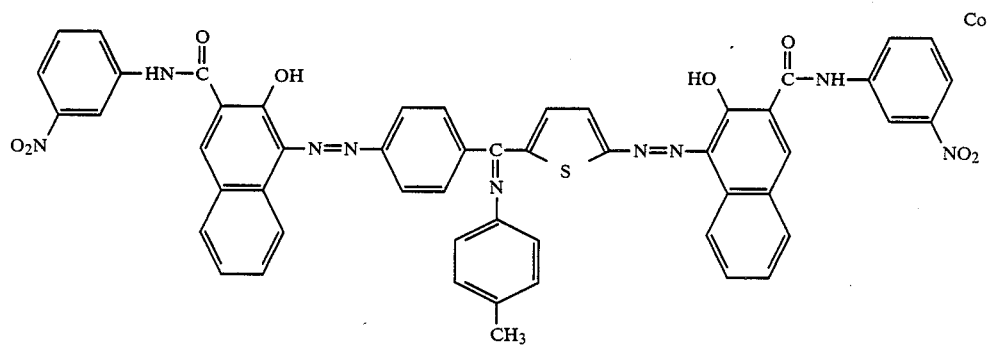
Compound No. III-8
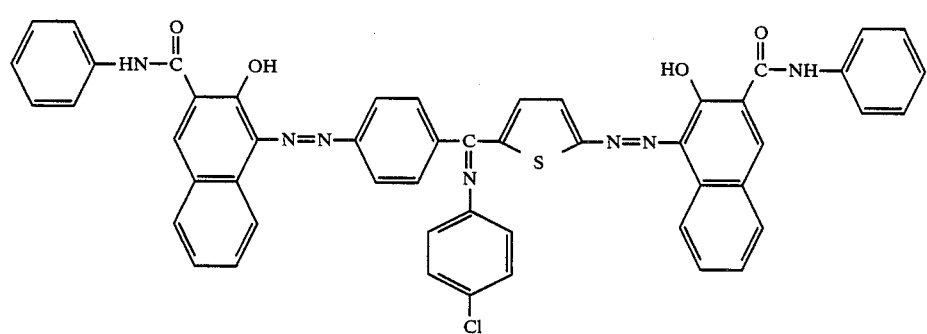
Compound No. III-9

Compound No. III-10
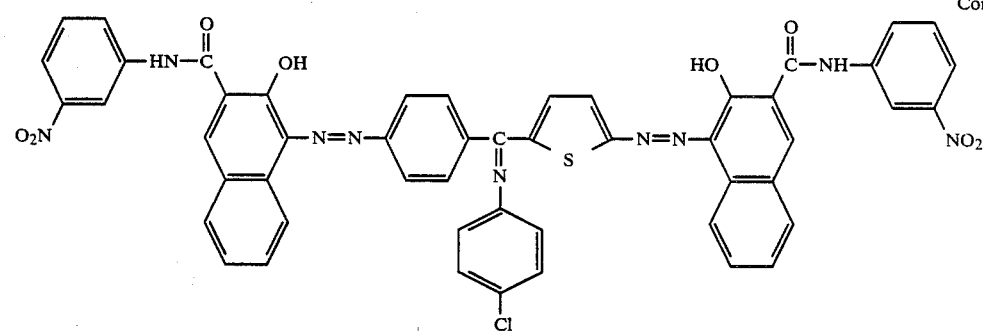
Compound No. III-11
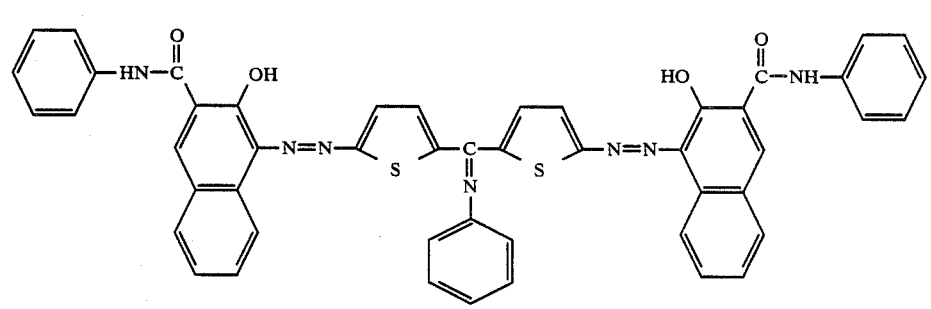
Compound No. III-12
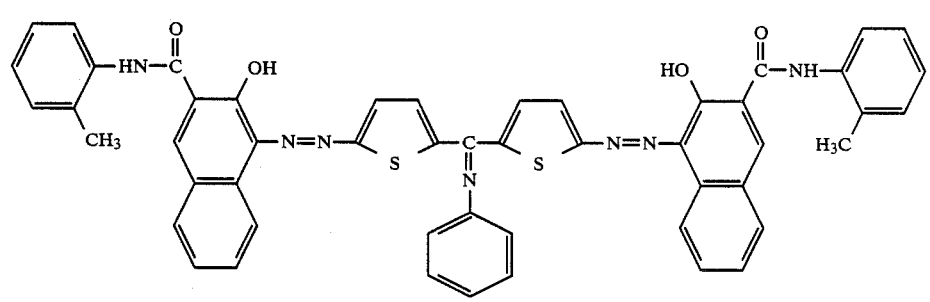
Compound No. III-13
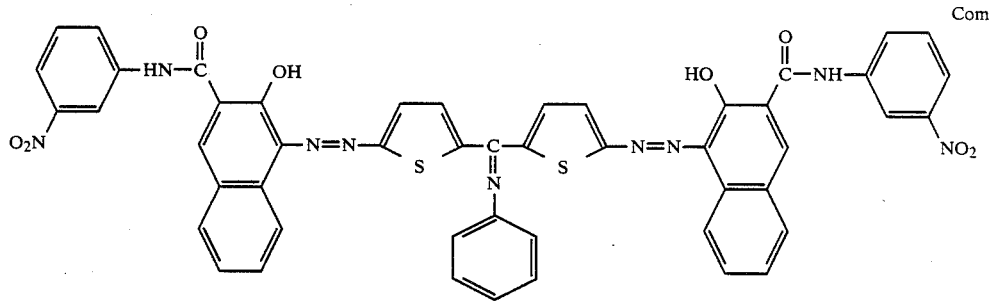
Compound No. III-14
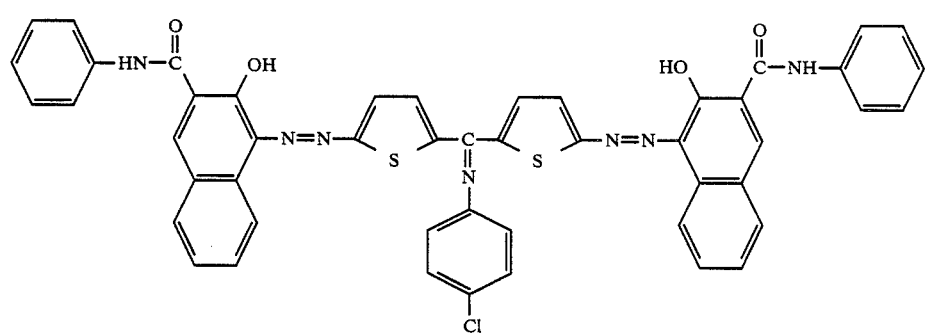

-continued
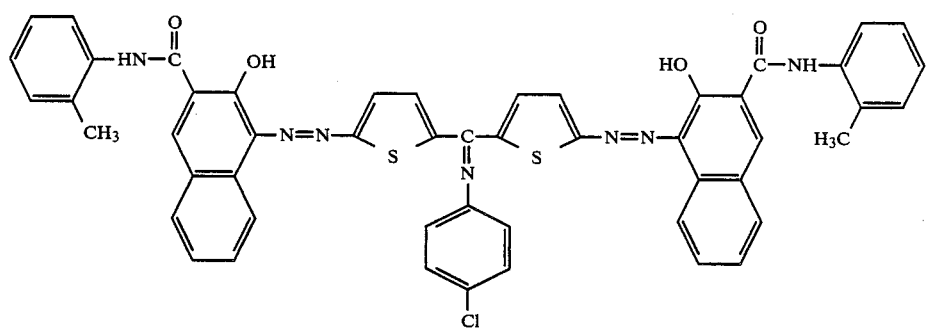
Compound No. III-15
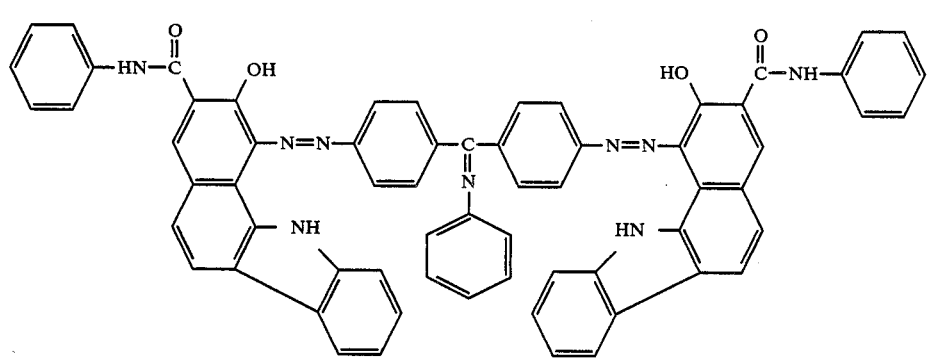
Compound No. III-16
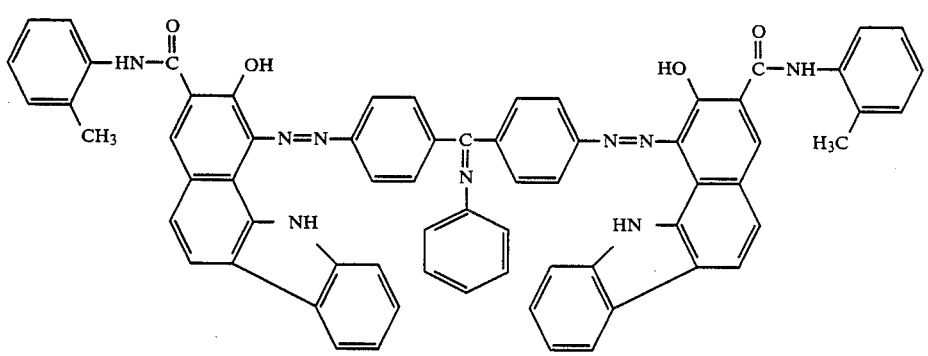
Compound No. III-17
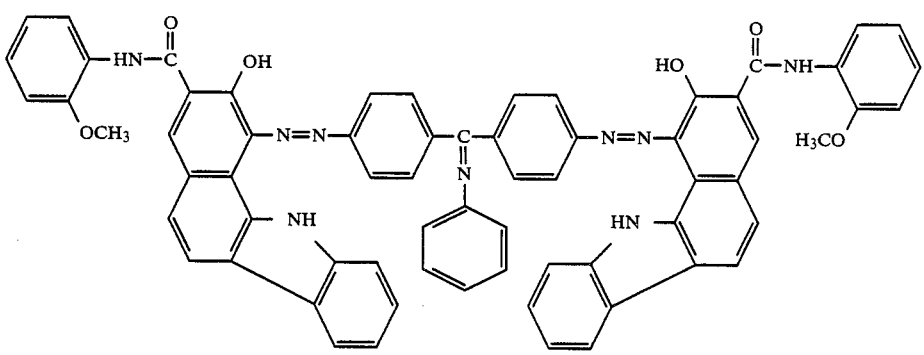
Compound No. III-18

-continued
Compound No. III-19
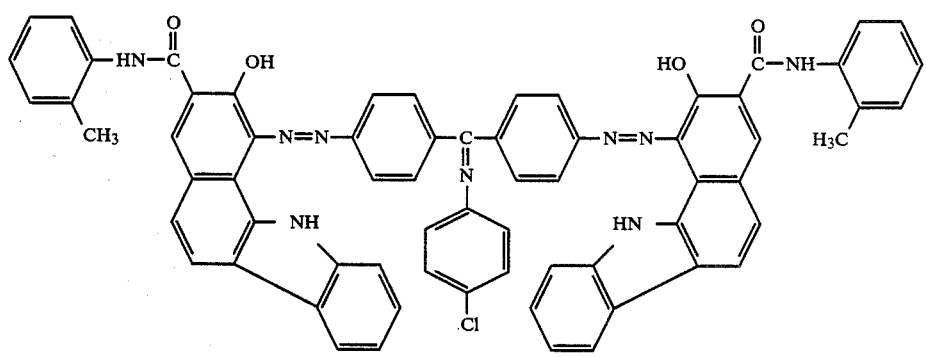
Compound No. III-20
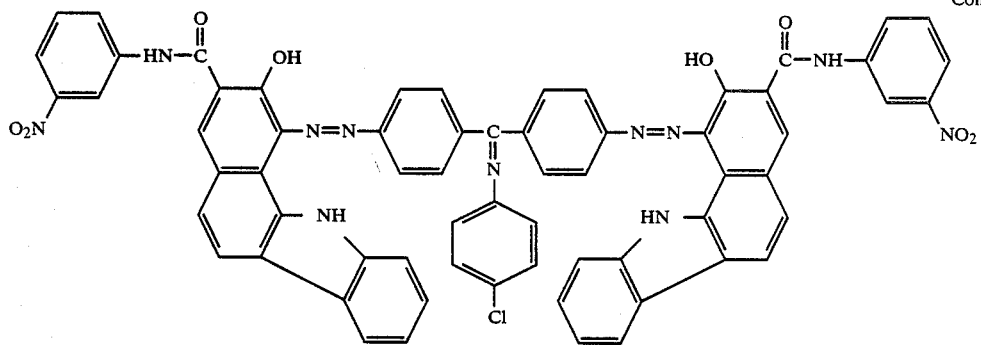
Compound No. III-21
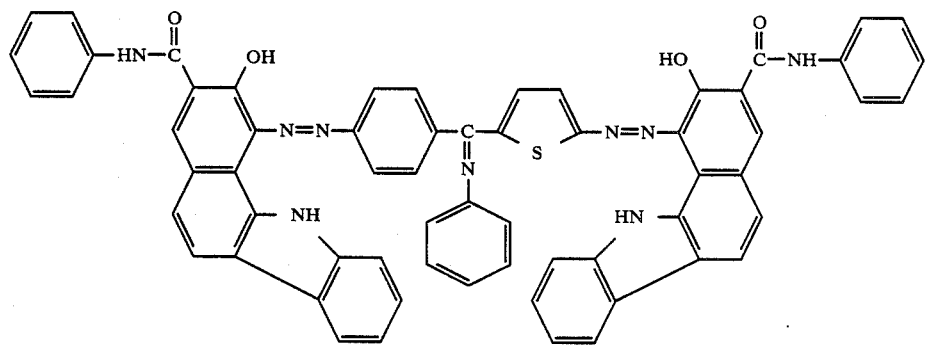
Compound No. III-22
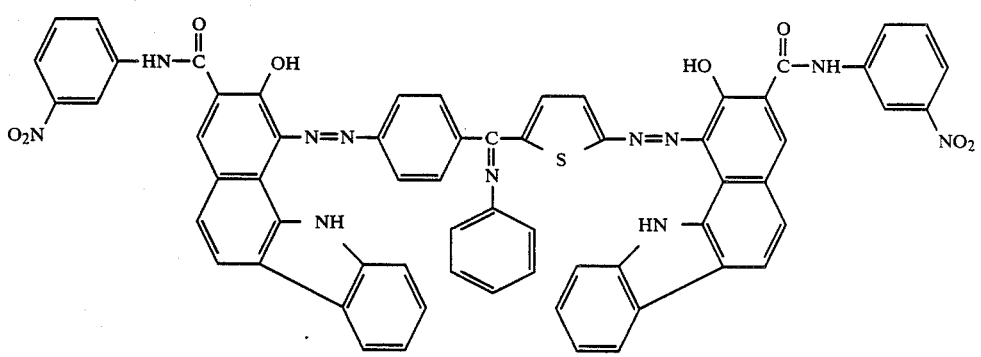

-continued
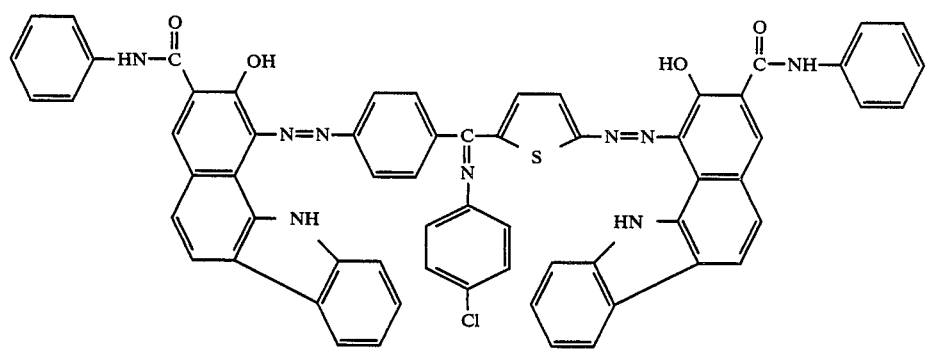
Compound No. III-23
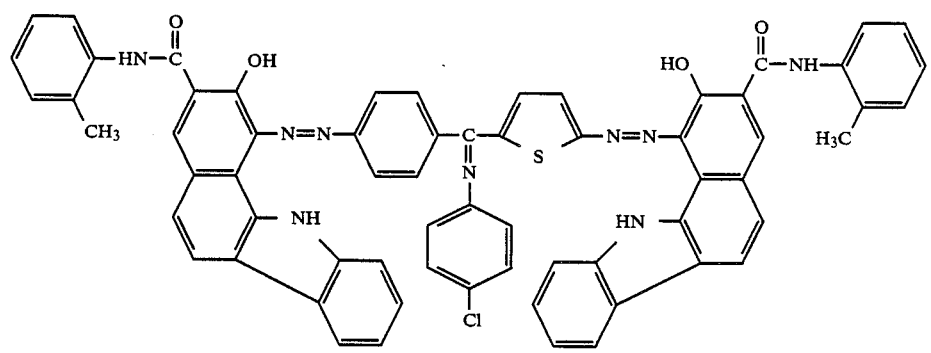
Compound No. III-24
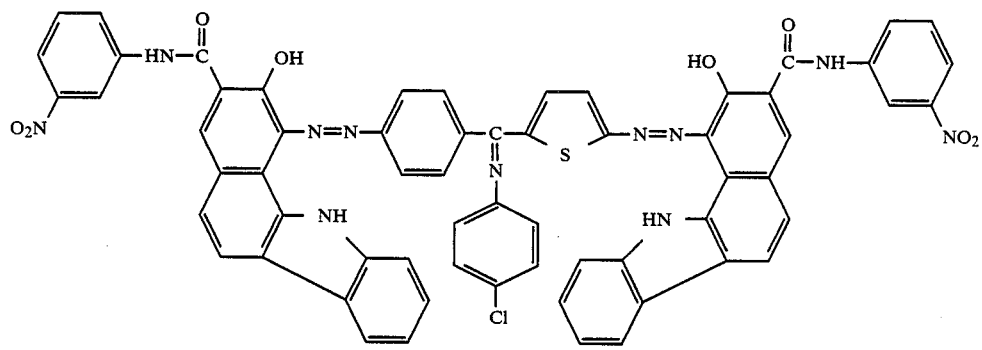
Compound No. III-25
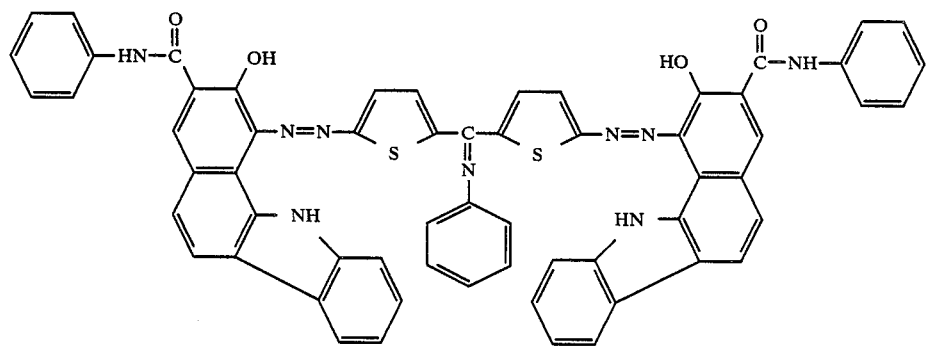
Compound No. III-26

-continued
Compound No. III-27
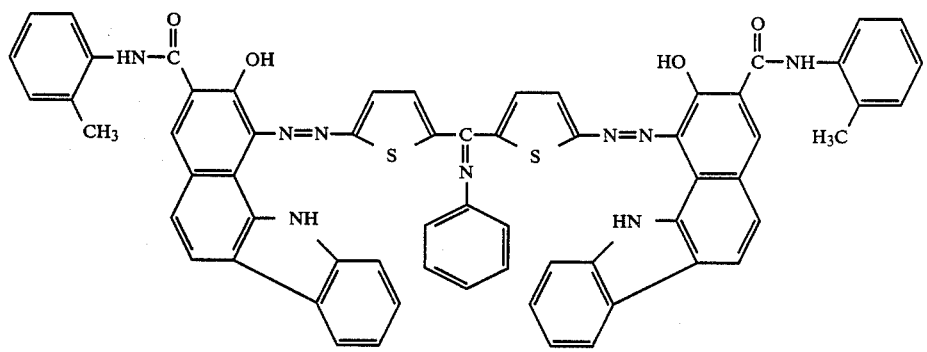
Compound No. III-28
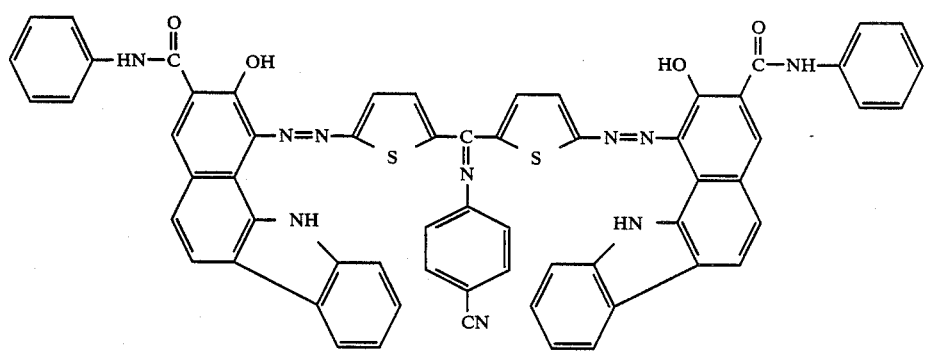
Compound No. III-29
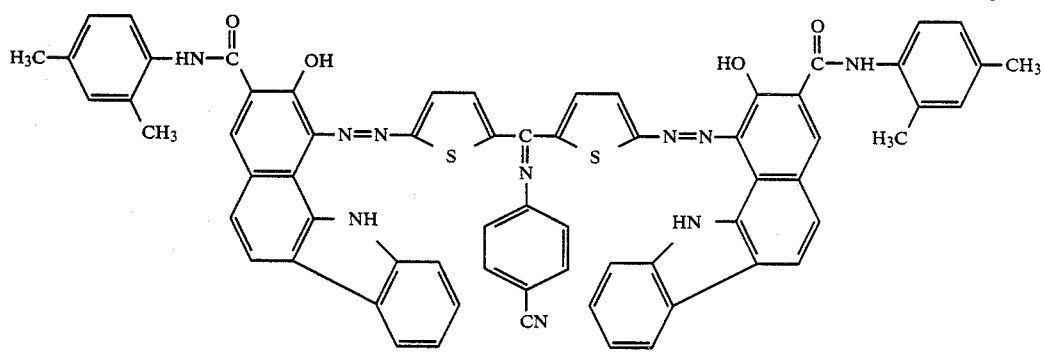
Compound No. III-30
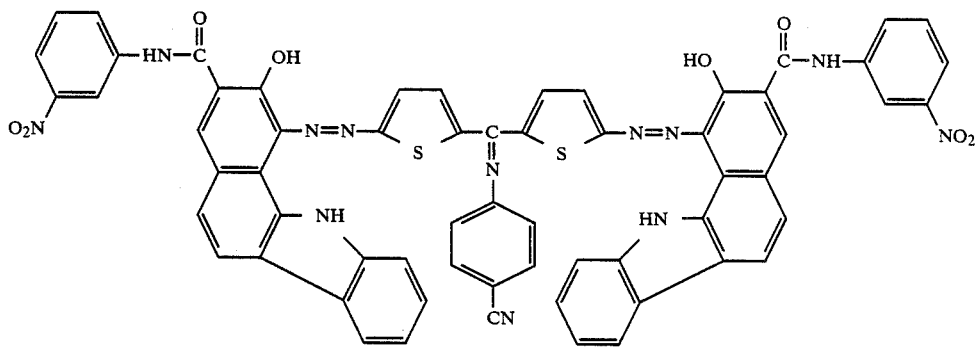

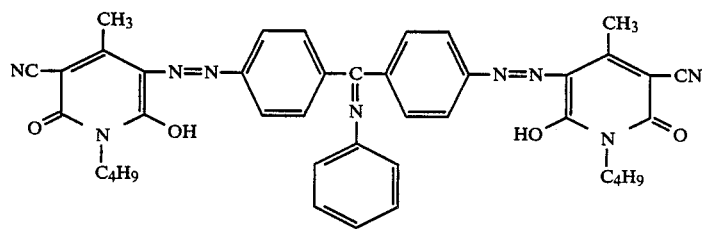
Compound No. III-31
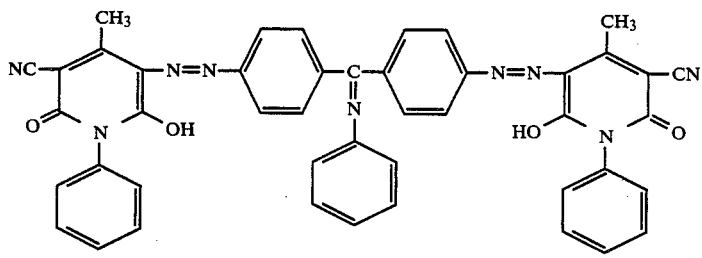
Compound No. III-32
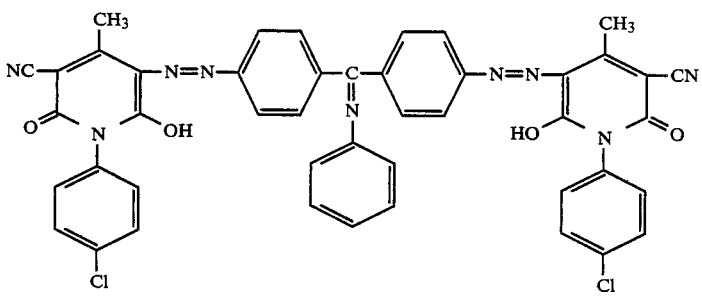
Compound No. III-33
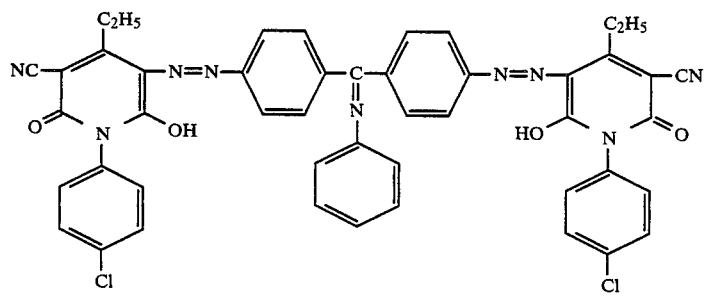
Compound No. III-34
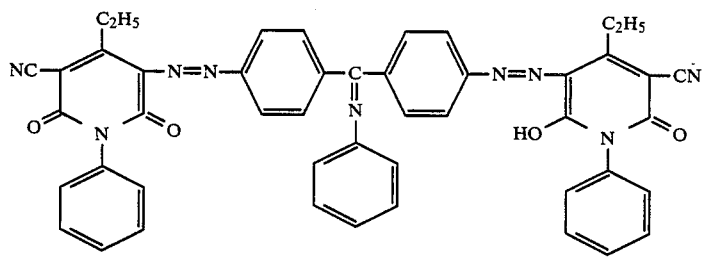
Compound No. III-35
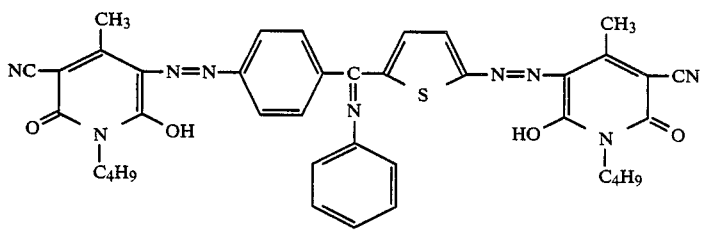
Compound No. III-36

-continued
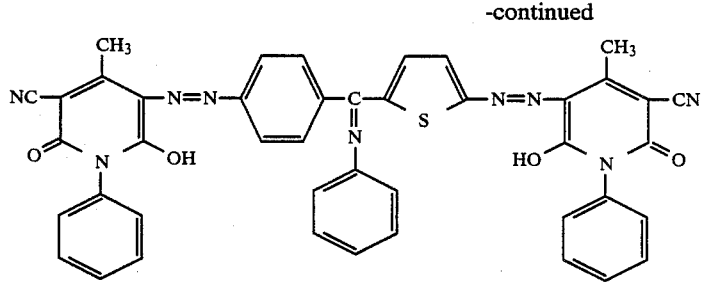
Compound No. III-37
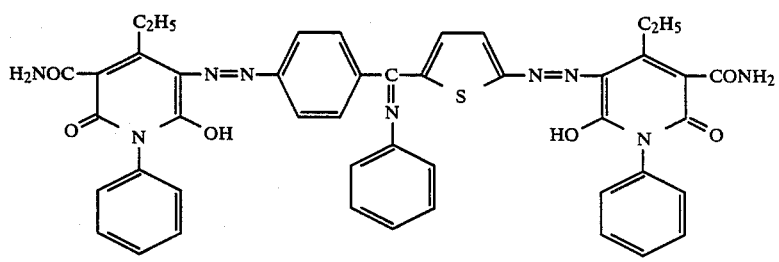
Compound No. III-38
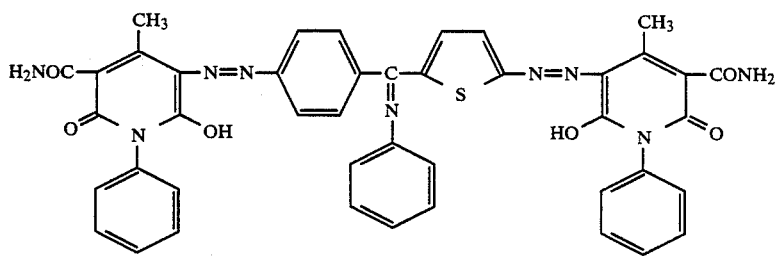
Compound No. III-39
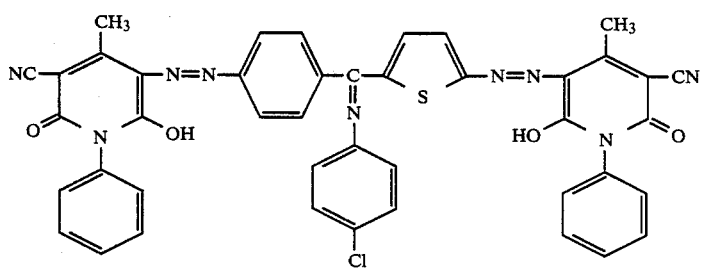
Compound No. III-40
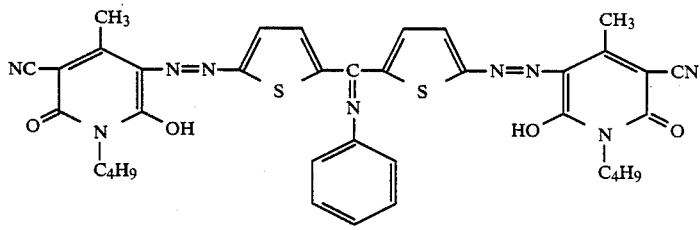
Compound No. III-41
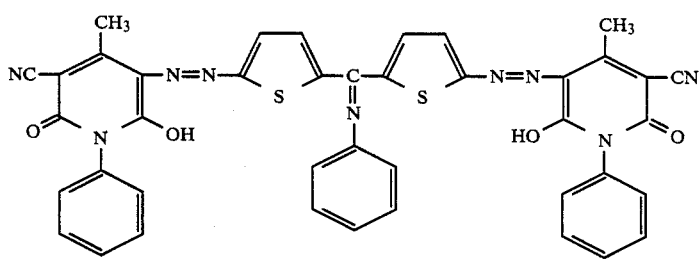
Compound No. III-42

-continued
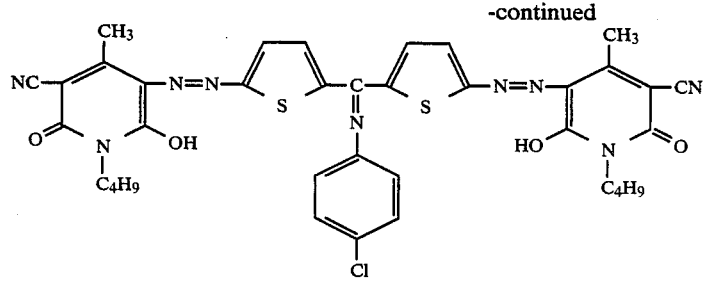
Compound No. III-43
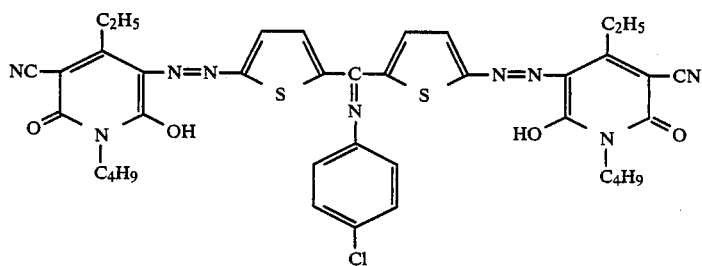
Compound No. III-44
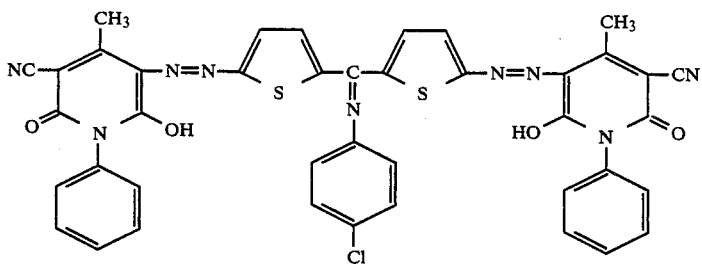
Compound No. III-45
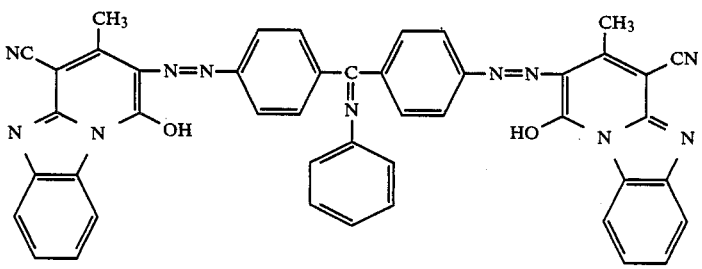
Compound No. III-46
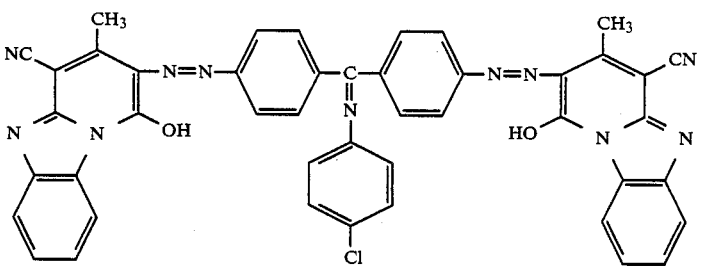
Compound No. III-47
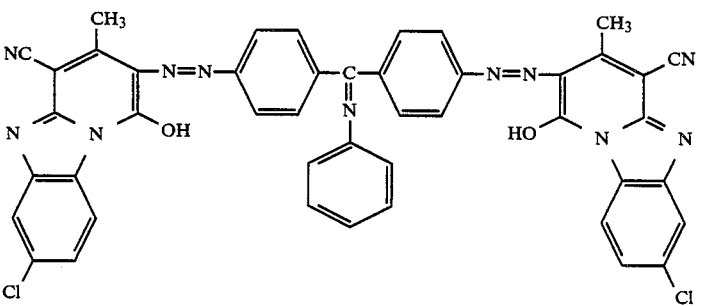
Compound No. III-48

-continued
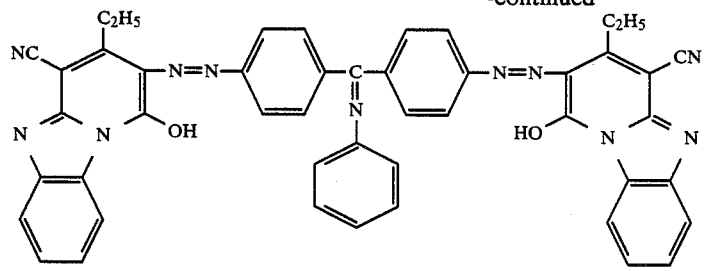
Compound No. III-49
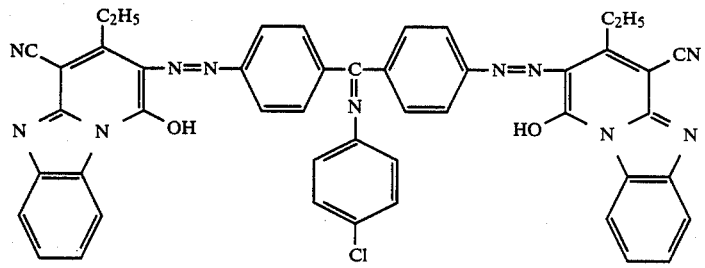
Compound No. III-50
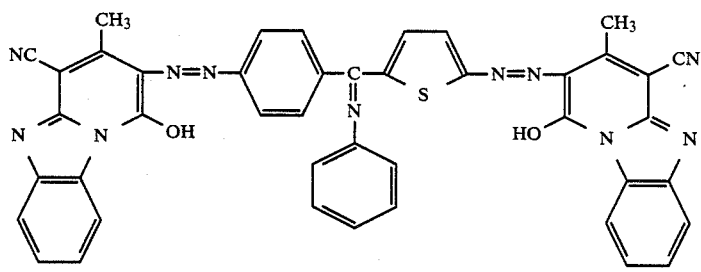
Compound No. III-51
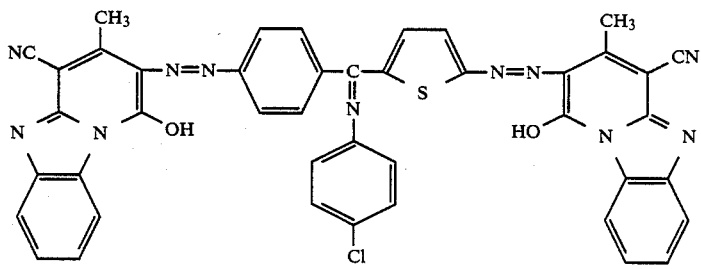
Compound No. III-52
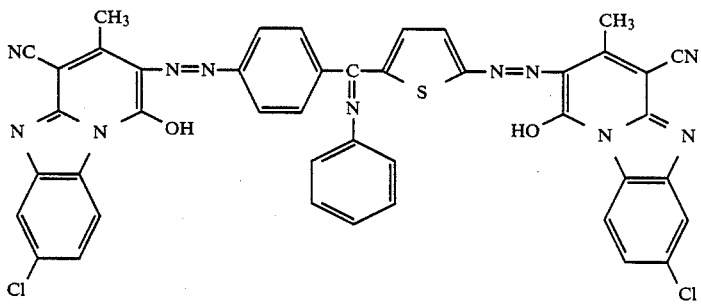
Compound No. III-53
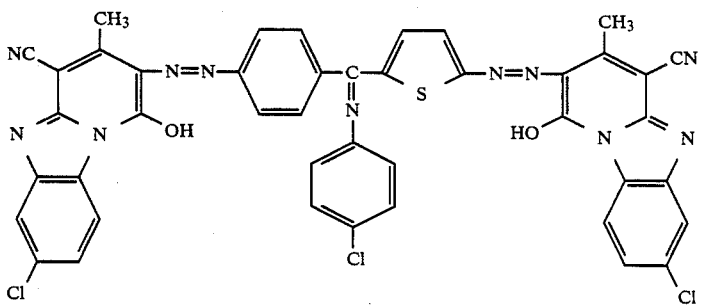
Compound No. III-54

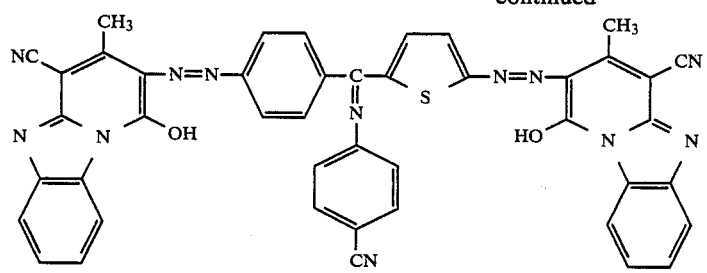
Compound No. III-55
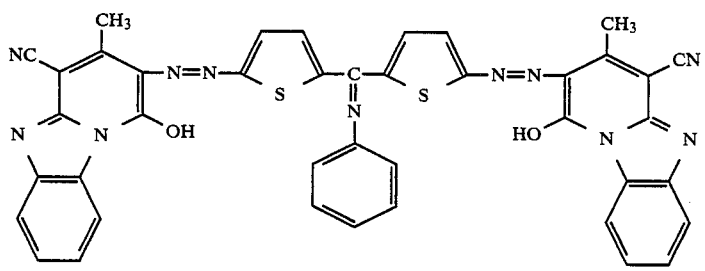
Compound No. III-56
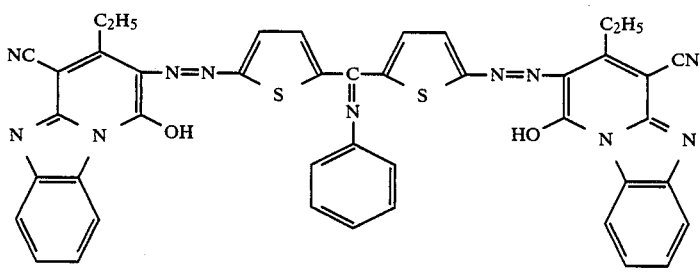
Compound No. III-57
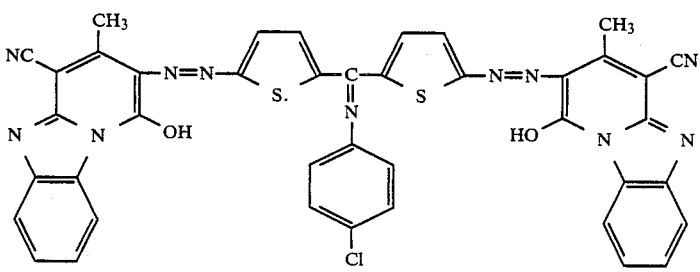
Compound No. III-58
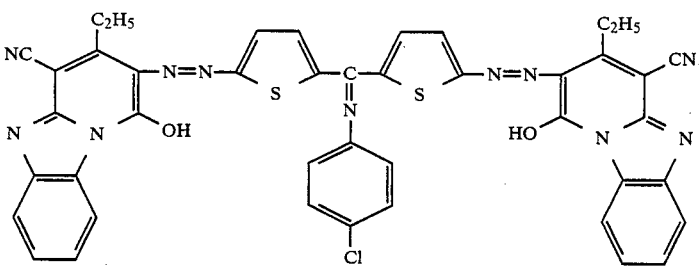
Compound No. III-59
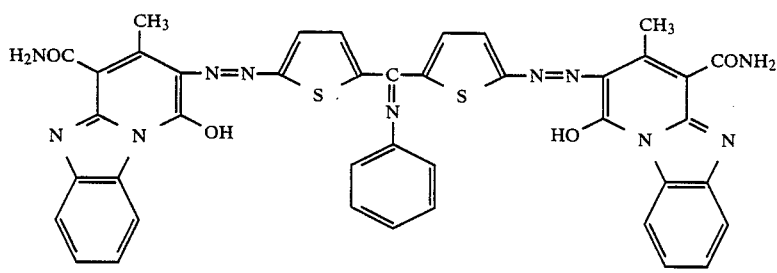
Compound No. III-60

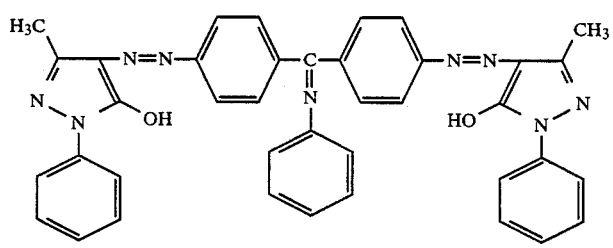
Compound No. III-61
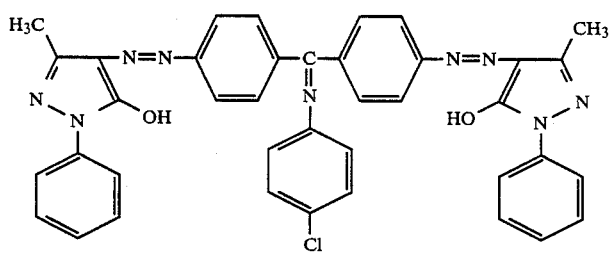
Compound No. III-62
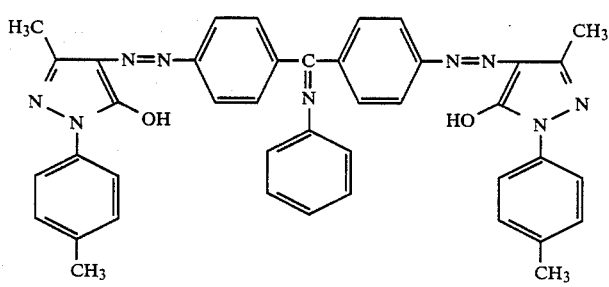
Compound No. III-63
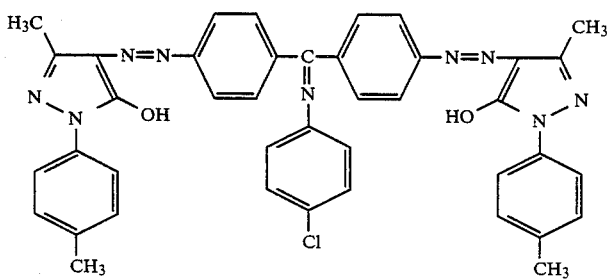
Compound No. III-64
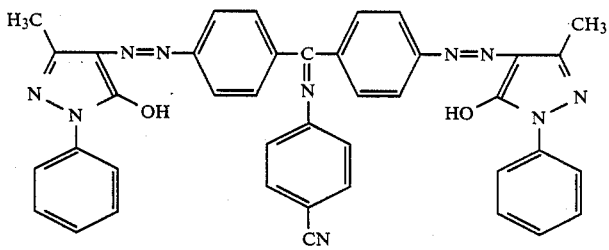
Compound No. III-65
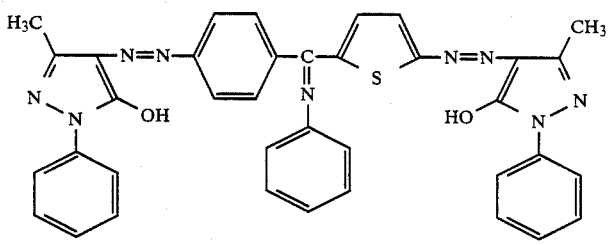
Compound No. III-66

-continued
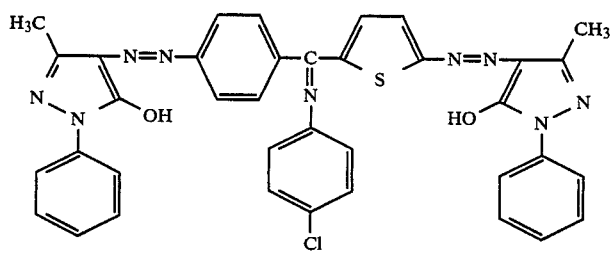
Compound No. III-67
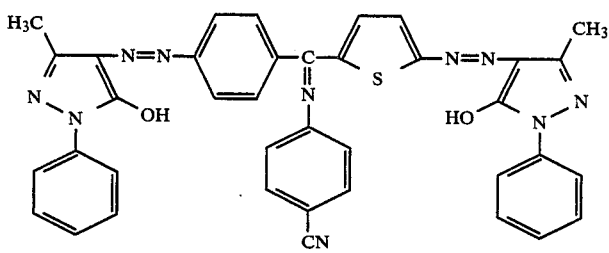
Compound No. III-68
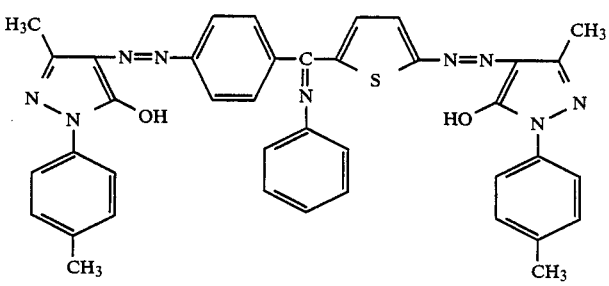
Compound No. III-69
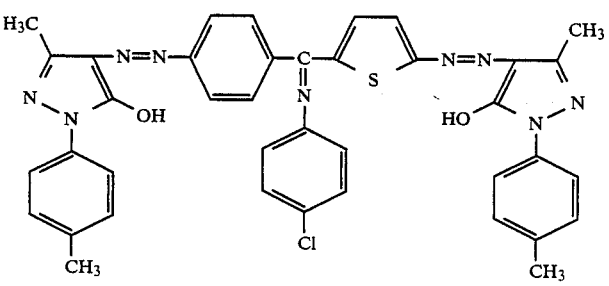
Compound No. III-70
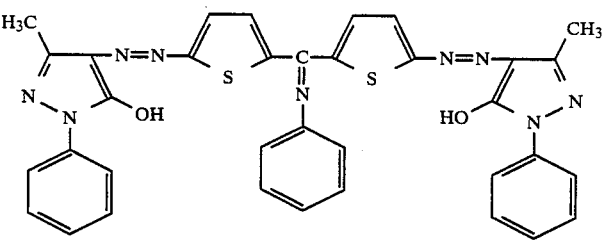
Compound No. III-71
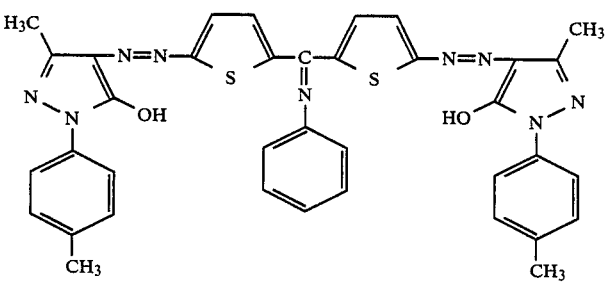
Compound No. III-72

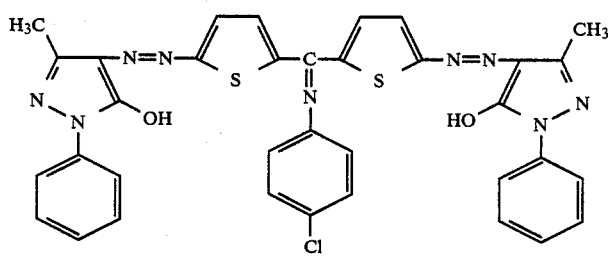

Compound No. III-73

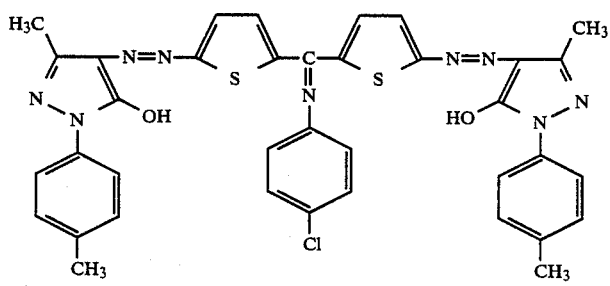

Compound No. III-74

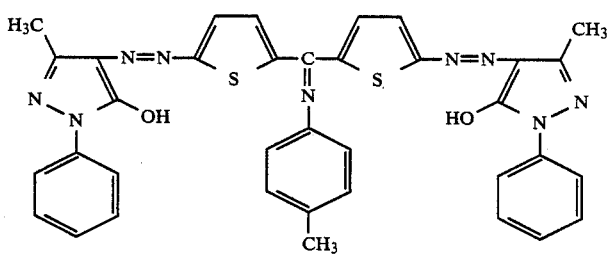

Compound No. III-75

Examples of the photoconductor, in which chemical compound included in the compound represented by the general formula (III) is used as a charge generating substance, will be explained.

EXAMPLE III-1

A photoconductor having the structure shown in FIG. 1 and comprising a photosensitive layer having a thickness of 15 μm was produced in substantially the same manner as in Example I-1 except that the disazo compound No. III-1 mentioned above was used instead of the compound No. I-1.

EXAMPLE III-2

A solution of 100 parts by weight of p-diethylaminobenzaldehyde-diphenylhydrazone (ABPH) in 700 parts by weight of tetrahydrofuran (THF) was mixed with a solution of 100 parts by weight of polycarbonate in 700 parts by weight including the same parts of THF and dichloromethane to prepare a coating liquid. The coating liquid was applied on an aluminum-deposited polyester film substrate by the wire bar technique to form a charge transporting layer having a dry thickness of 15 μm. 50 parts by weight of disazo compound No. III-1, 50 parts by weight of a polyester resin, and 50 parts by weight of PMMA were kneaded with a mixer for 3 hours together with THF as a solvent to prepare a coating liquid, which was then applied on the charge transporting layer by the wire bar technique to form a charge generating layer having a dry thickness of 0.5 μm. Thus, a photoconductor with a structure corresponding to that shown in FIG. 3 was produced.

No covering layer was provided since the present invention is no directly concerned with a covering layer.

EXAMPLE III-3

A charge transporting layer was produced by forming a photosensitive layer in substantially the same manner as in Example III-2 except that α-phenyl-4'-N,N-dimethylaminostilbene, which is a styryl compound, was used to replace ABPH as the charge transporting substance. Then a charge generating layer was formed on the charge transporting layer, thus a photoconductor was produced.

EXAMPLE III-4

A charge transporting layer was produced by forming a photosensitive lyaer in substantially the same manner as in Example III-2 except that tri(p-toryl)amine, which is a triphenylamine compoud, was used to replace ABPH as the charge transporting substance. Then a charge generating layer was formed on the charge transporting layer, thus a photoconductor was produced.

EXAMPLE III-5

A charge transporting layer was produced by forming a photosensitive layer in substantially the same manner as in Example III-2 except that 2,5-bis(p-diethylaminophenyl)-1,3,4-oxadiazole, which is an oxadiazole compoud, was used to replace ABPH as the charge transporting substance. Then a charge generating layer was formed on the charge transporting layer, thus a photoconductor was produced.

The electrophotographic characteristics of the five photoconductors thus produced were measured by utilizing an electrostatic recording paper testing apparatus Model SP-428.

The measured values of the surface potentials $V_s$, residual potential $V_r$ and half decay exposure amount $E_{\frac{1}{2}}$ are shown in Table 5. As shown in Table 5, all photocouductors were satisfactory with respect to the surface potential, the residual potential and the half decay exposrue amount.

TABLE 5

| Example | $V_s$ (Volts) | $V_r$ (Volts) | $E_{\frac{1}{2}}$ (lux · sec) |
|---|---|---|---|
| III-1 | 465 | 120 | 5.6 |
| III-2 | 480 | 110 | 5.9 |
| III-3 | 470 | 105 | 6.7 |
| III-4 | 455 | 115 | 5.1 |
| III-5 | 475 | 90 | 7.1 |

EXAMPLE III-6

100 parts by weight of each of respective disazo compounds Nos. from III-2 to III-75 and 100 parts by weight of polyester were mixed with THF as a solvent with a mixer for 3 hours to prepare a coating liquid. The respective coating liquids were applied on aouminum substrates to form a photogenerating layer having a dry thickness of about 0.5 μm. Further, the coating liquid described in Exampel III-2, which include ABPH as a charge transporting substance, was applied on the respective charge generating layer having a dry thickenss of about 15 μm, thus photoconductors ans shown in FIG. 2 were produced.

The measured value of the half decay exposure amount $E_{\frac{1}{2}}$ and the residual potential of the above-mentioned examples are shown in Table 6. As shown in Table 6, all photoconductors have good characteristics.

TABLE 6

| Compound No. | $E_{\frac{1}{2}}$ (lux · sec) | $V_r$ (volt) |
|---|---|---|
| III-2 | 6.3 | −90 |
| III-3 | 6.1 | −100 |
| III-4 | 5.9 | −95 |
| III-5 | 6.9 | −115 |
| III-6 | 7.1 | −120 |
| III-7 | 6.1 | −115 |
| III-8 | 8.5 | −105 |
| III-9 | 8.9 | −80 |
| III-10 | 9.1 | −95 |
| III-11 | 10.2 | −85 |
| III-12 | 11.3 | −115 |
| III-13 | 9.1 | −120 |
| III-14 | 10.1 | −130 |
| III-15 | 9.8 | −105 |
| III-16 | 8.9 | −140 |
| III-17 | 7.9 | −105 |
| III-18 | 7.8 | −100 |
| III-19 | 8.4 | −100 |
| III-20 | 8.9 | −95 |
| III-21 | 10.1 | −90 |
| III-22 | 7.9 | −105 |
| III-23 | 9.8 | −100 |
| III-24 | 8.4 | −85 |
| III-25 | 7.5 | −105 |
| III-26 | 8.3 | −100 |
| III-27 | 8.8 | −85 |
| III-28 | 7.9 | −90 |
| III-29 | 8.0 | −85 |
| III-30 | 8.5 | −100 |
| III-31 | 7.2 | −115 |
| III-32 | 6.9 | −105 |
| III-33 | 7.8 | −105 |

TABLE 6-continued

| Compound No. | $E_{\frac{1}{2}}$ (lux · sec) | $V_r$ (volt) |
|---|---|---|
| III-34 | 8.8 | −100 |
| III-35 | 8.3 | −85 |
| III-36 | 10.1 | −80 |
| III-37 | 10.4 | −95 |
| III-38 | 9.8 | −105 |
| III-39 | 8.9 | −90 |
| III-40 | 9.3 | −75 |
| III-41 | 10.7 | −120 |
| III-42 | 11.1 | −130 |
| III-43 | 13.2 | −140 |
| III-44 | 12.1 | −120 |
| III-45 | 10.9 | −115 |
| III-46 | 9.8 | −105 |
| III-47 | 9.9 | −100 |
| III-48 | 10.7 | −105 |
| III-49 | 10.3 | −115 |
| III-50 | 11.2 | −130 |
| III-51 | 10.1 | −115 |
| III-52 | 12.1 | −120 |
| III-53 | 13.1 | −130 |
| III-54 | 14.1 | −135 |
| III-55 | 13.5 | −135 |
| III-56 | 12.1 | −105 |
| III-57 | 12.9 | −120 |
| III-58 | 10.8 | −125 |
| III-59 | 10.2 | −115 |
| III-60 | 10.5 | −105 |
| III-61 | 9.7 | −100 |
| III-62 | 9.3 | −90 |
| III-63 | 8.9 | −90 |
| III-64 | 8.2 | −95 |
| III-65 | 10.1 | −90 |
| III-66 | 12.3 | −100 |
| III-67 | 14.1 | −120 |
| III-68 | 10.5 | −115 |
| III-69 | 9.6 | −130 |
| III-70 | 12.8 | −140 |
| III-71 | 10.9 | −120 |
| III-72 | 11.3 | −115 |
| III-73 | 10.2 | −105 |
| III-74 | 9.5 | −110 |
| III-75 | 10.8 | −105 |

The second group of disazo compound to be used in the present invention is represented by a general formula (IV):

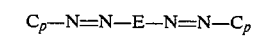

$$C_p-N=N-E-N=N-C_p \quad (IV)$$

wherein E stands for one of the structures represented by following general formulae (IVA) to (IVC) and $C_p$ stands for a residual group of a coupler.

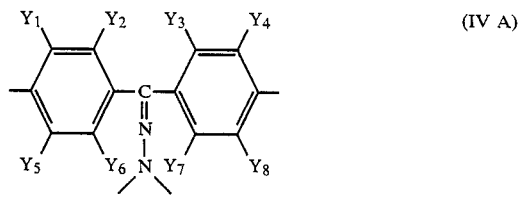

(IV A)

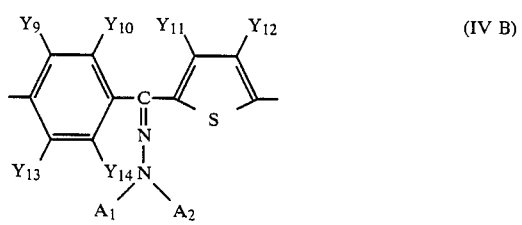

(IV B)

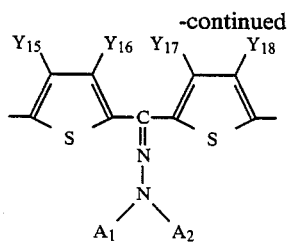

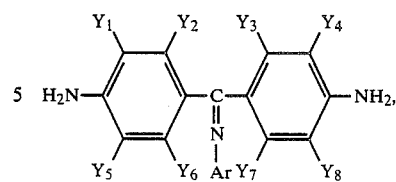

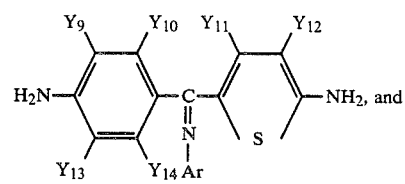

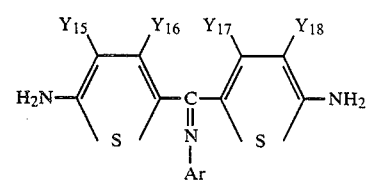

In the formulae (IVA) to (IVC), $Y_1$ to $Y_{18}$ are the same as that in the formulae (IIIA) to (IIIC) described before, while each of $A_1$ and $A_2$ stands for an aryl group which may have a substituent(s), an aralkyl group or an aromatic heterocyclic group.

In the disazo compound represented by the general formula (IV), $C_p$ preferably has one of structures represented by the general formulae (IIID) to (IIIG) mentioned before.

These disazo compounds represent by the generla formual (IV) can be synthesized according to the following process, that is an amino compound represented by one of following general formulae;

is diazotized by the usual method and the resultant diazo compound undergoes a coupling reaction with a corresponding coupler in a suitable solvent (for example, N,N-dimethylformamide, dimethyl sulfoxide and the like) under the present of an alkali.

Specific examples of dissazo compounds of the general formula (IV) prepared in the above-mentioned manner include:

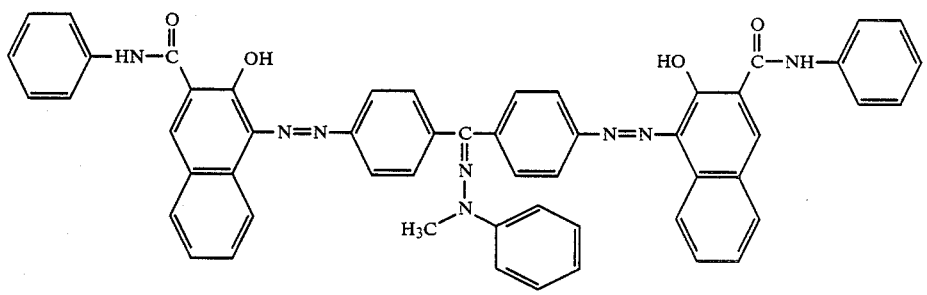

Compound No. IV-1

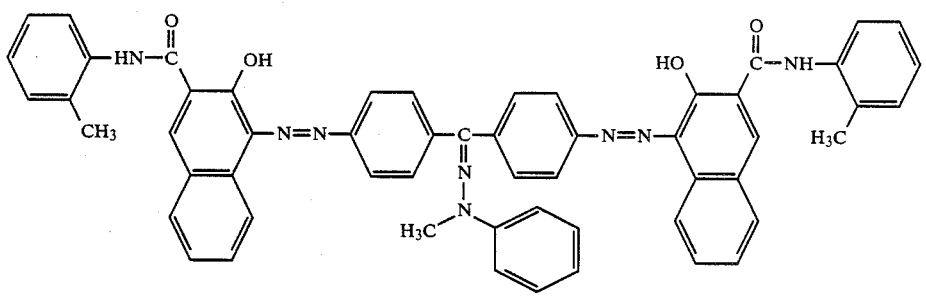

Compound No. IV-2

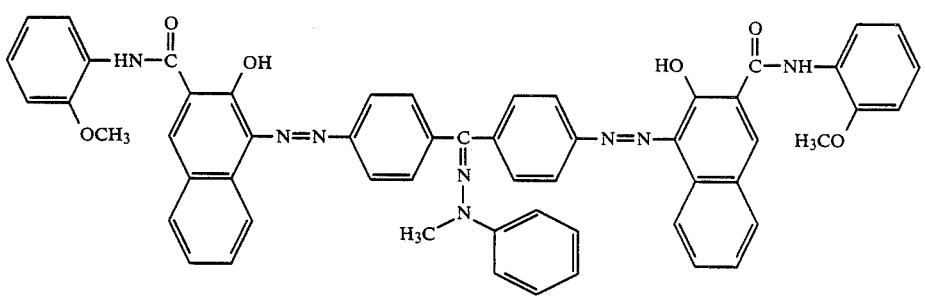

Compound No. IV-3

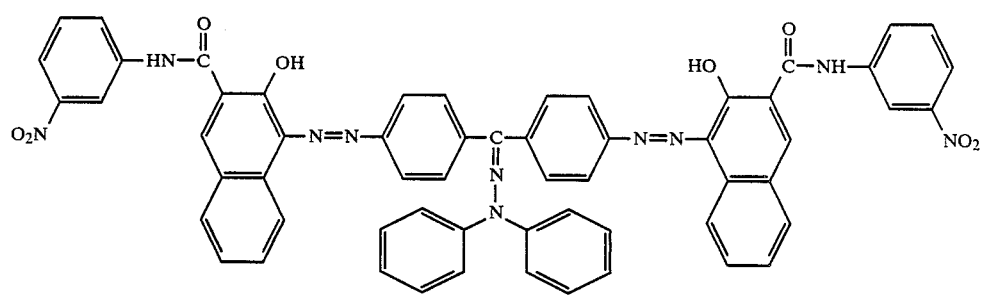
Compound No. IV-4
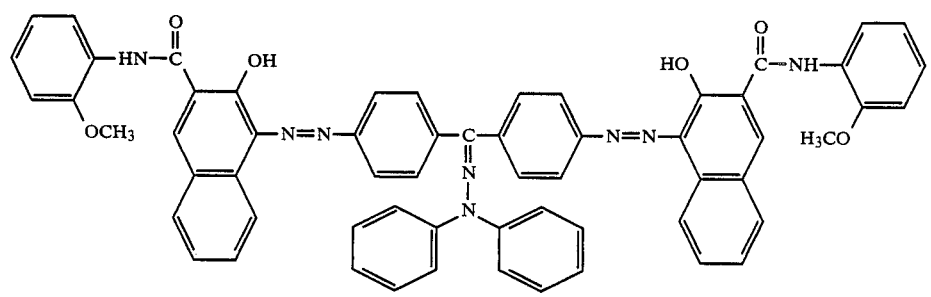
Compound No. IV-5
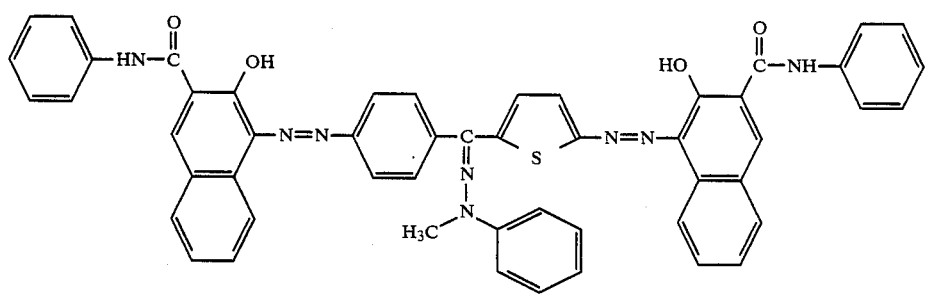
Compound No. IV-6
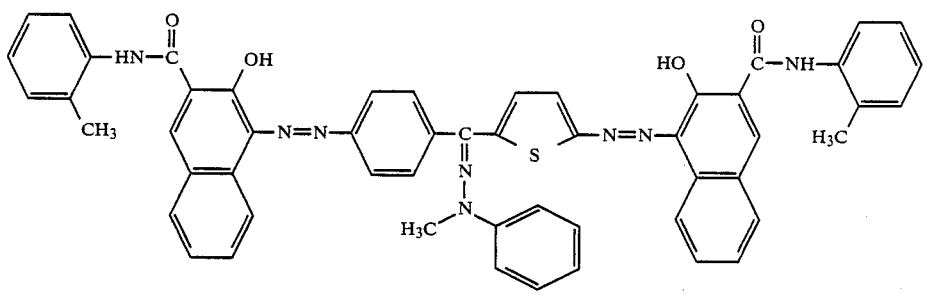
Compound No. IV-7
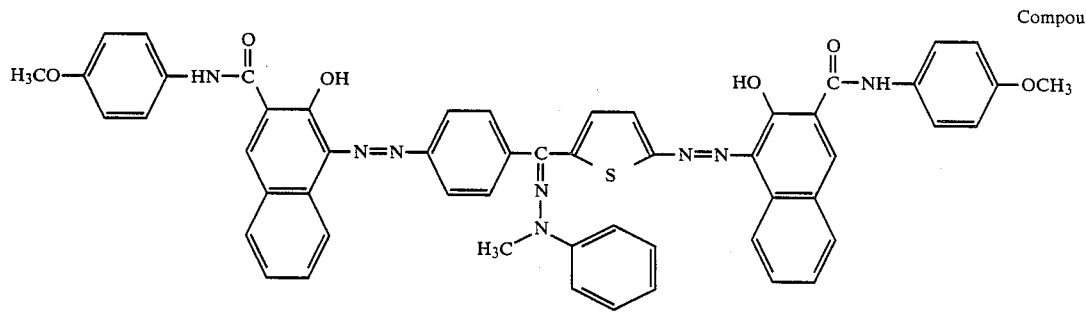
Compound No. IV-8

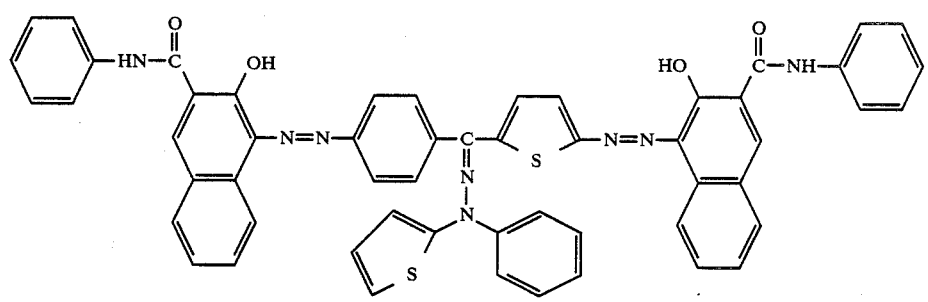
Compound No. IV-9
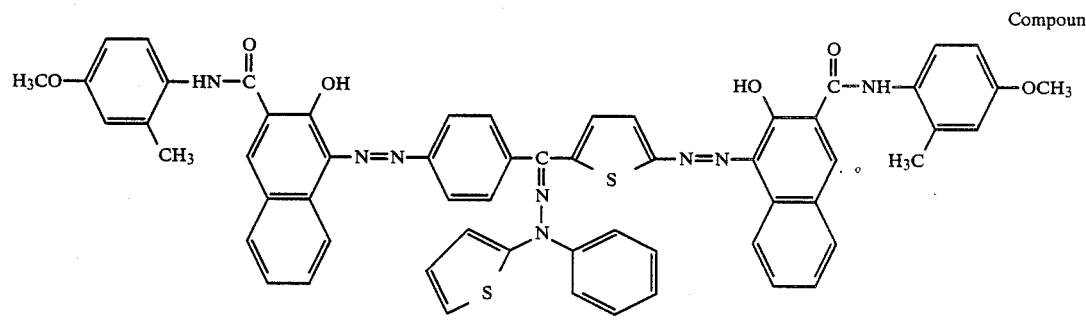
Compound No. IV-10
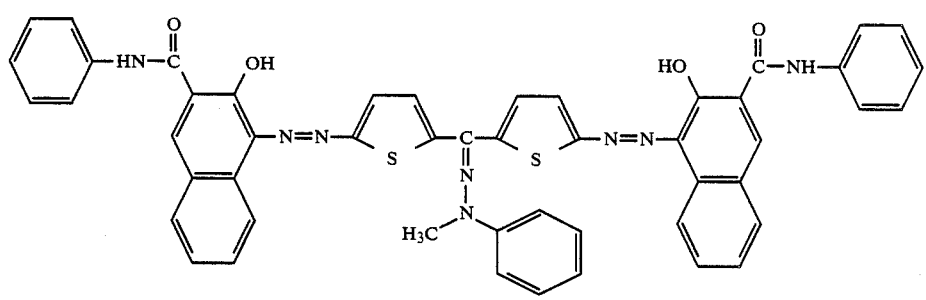
Compound No. IV-11
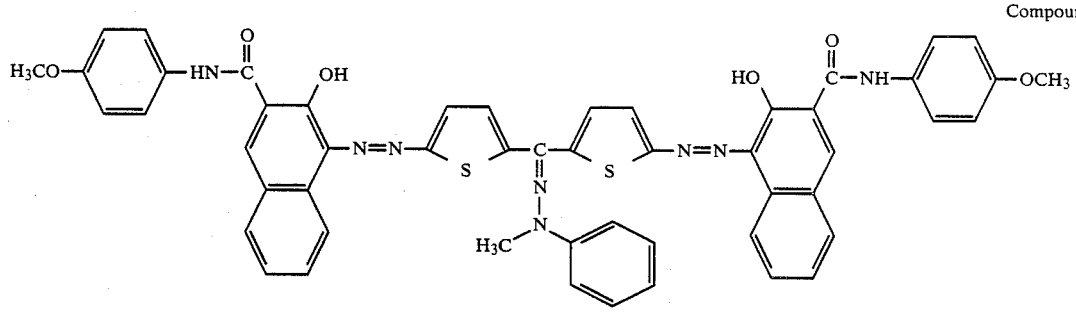
Compound No. IV-12
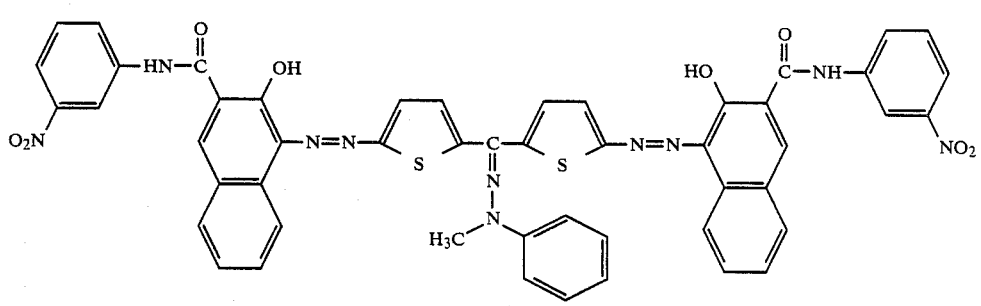
Compound No. IV-13

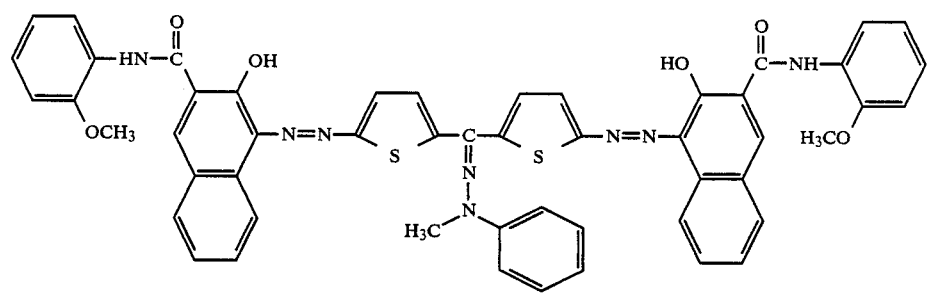
Compound No. IV-14
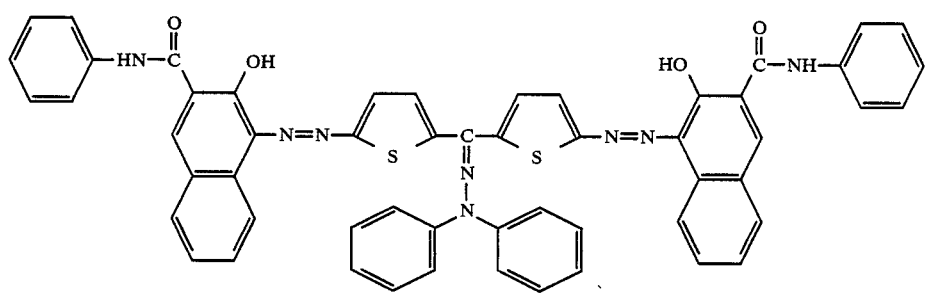
Compound No. IV-15
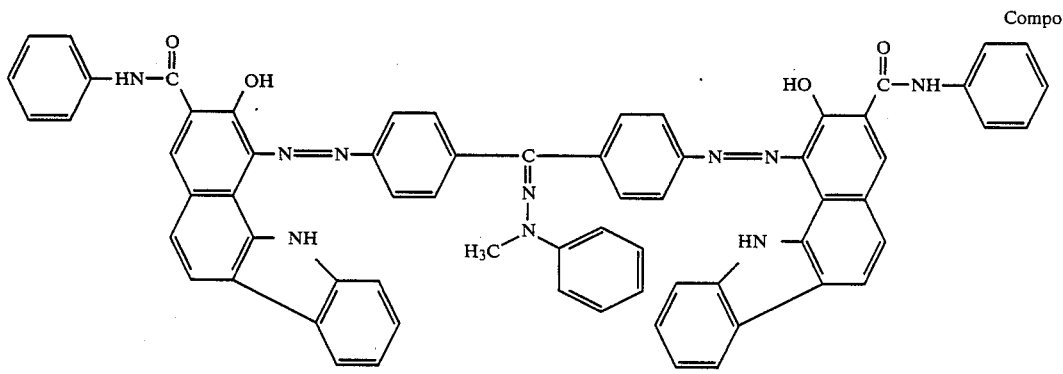
Compound No. IV-16
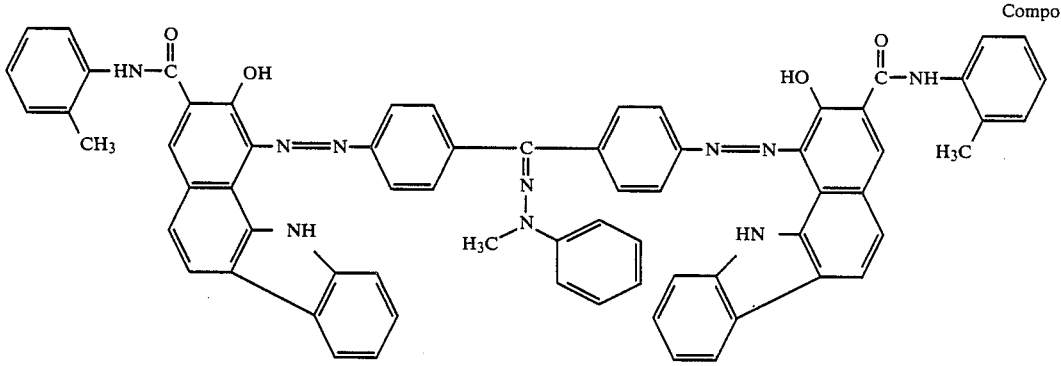
Compound No. IV-17

Compound No. IV-18
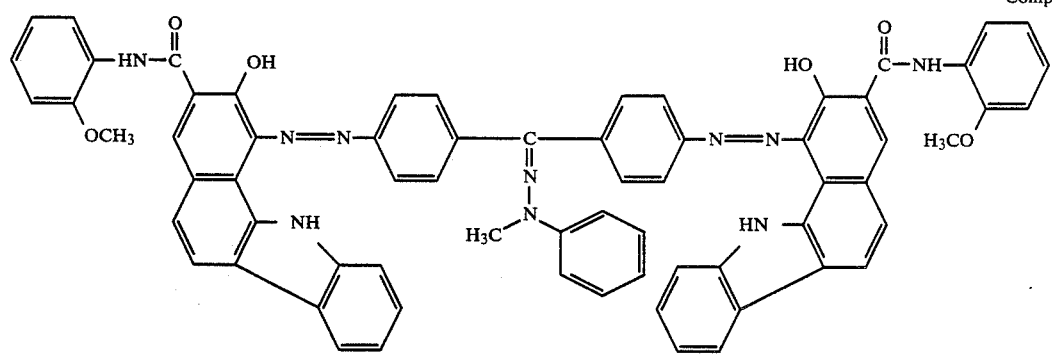
Compound No. IV-19
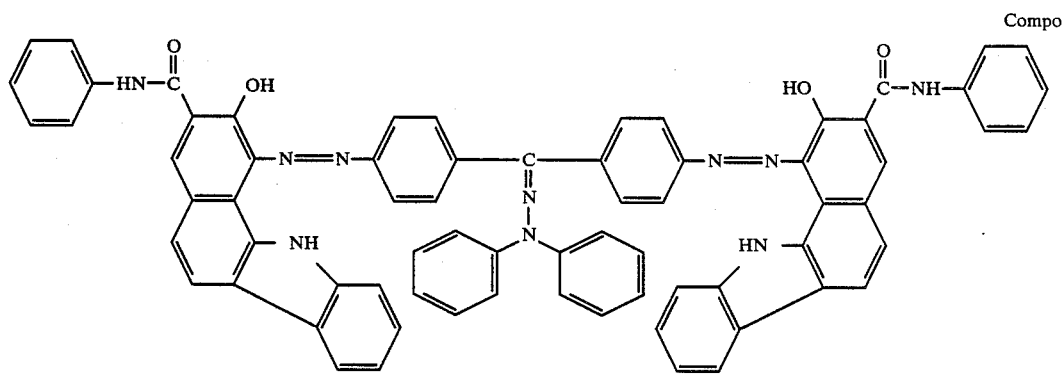
Compound No. IV-20
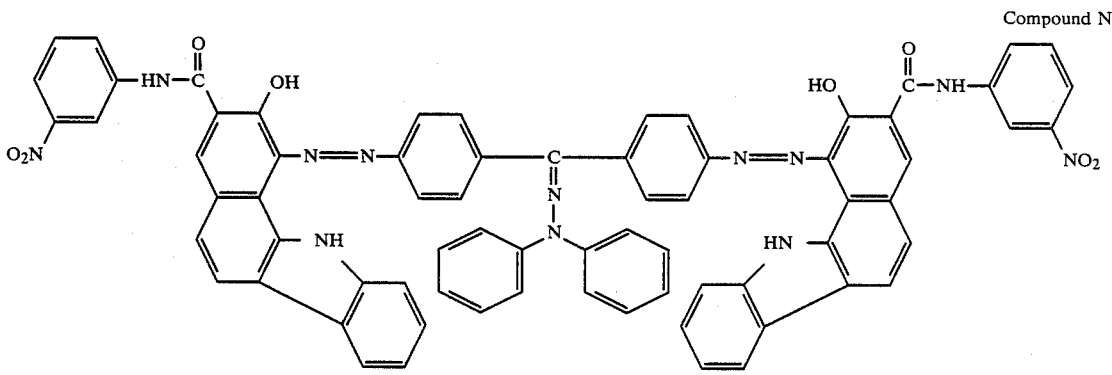
Compound No. IV-21
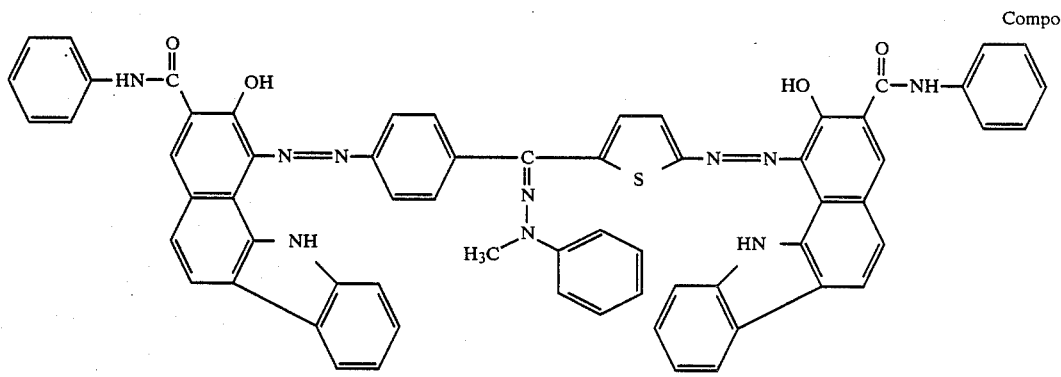

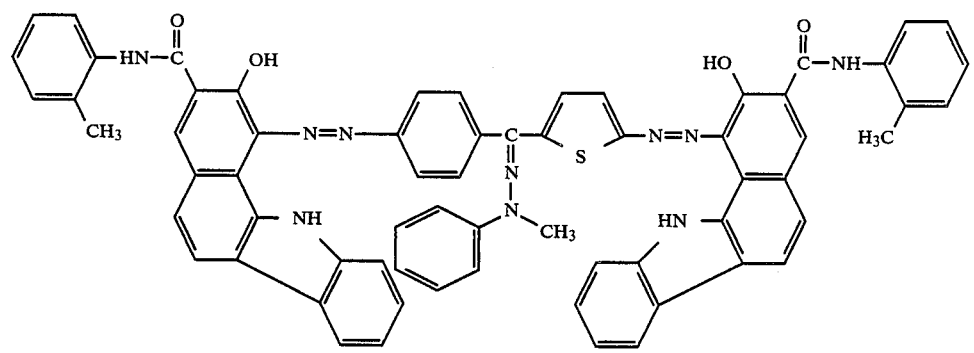
Compound No. IV-22
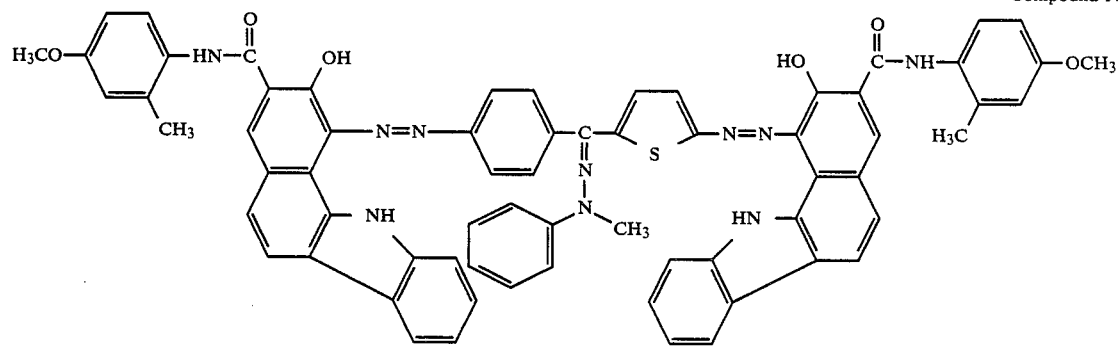
Compound No. IV-23
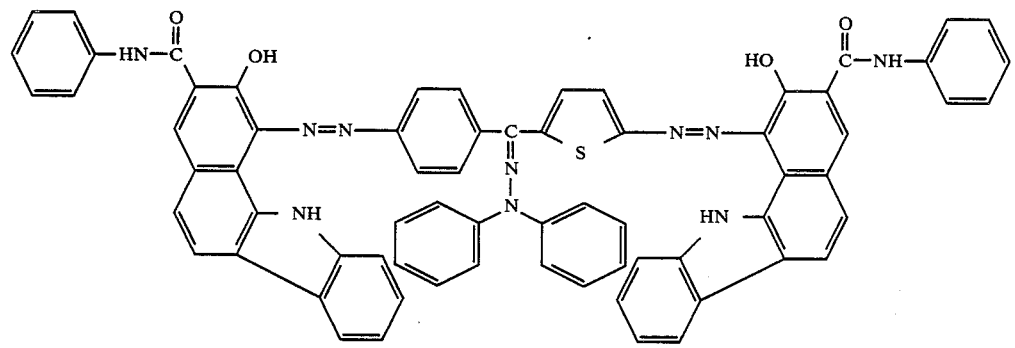
Compound IV-24
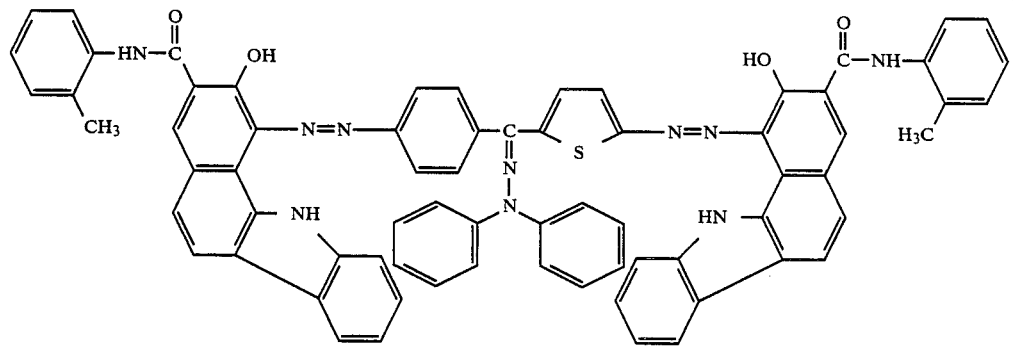
Compound No. IV-25

-continued
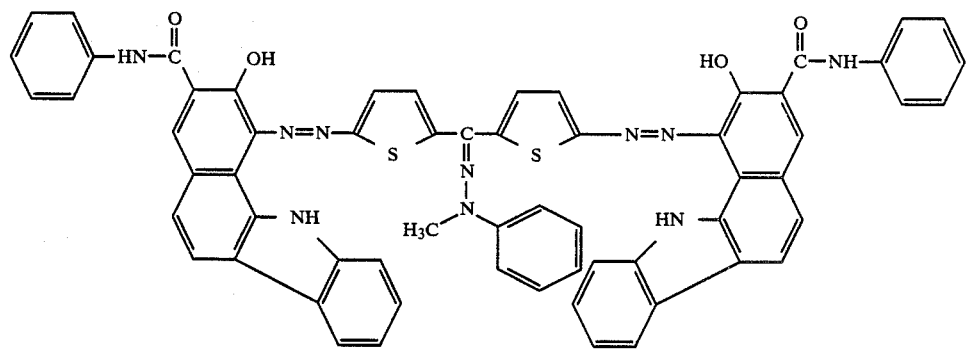
Compound No. IV-26
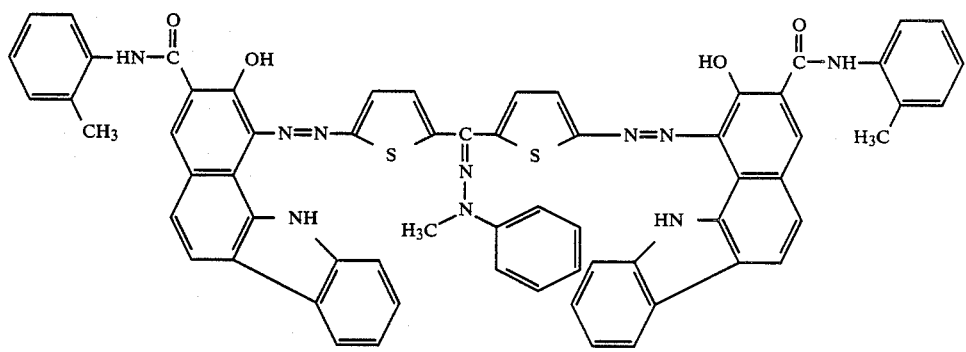
Compound No. IV-27
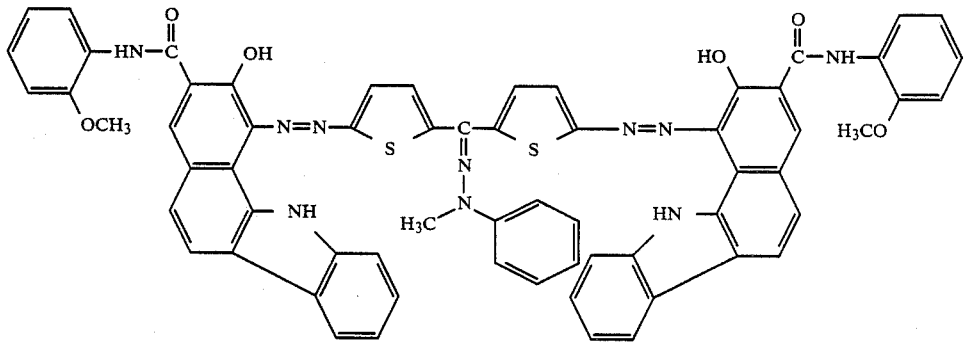
Compound No. IV-28
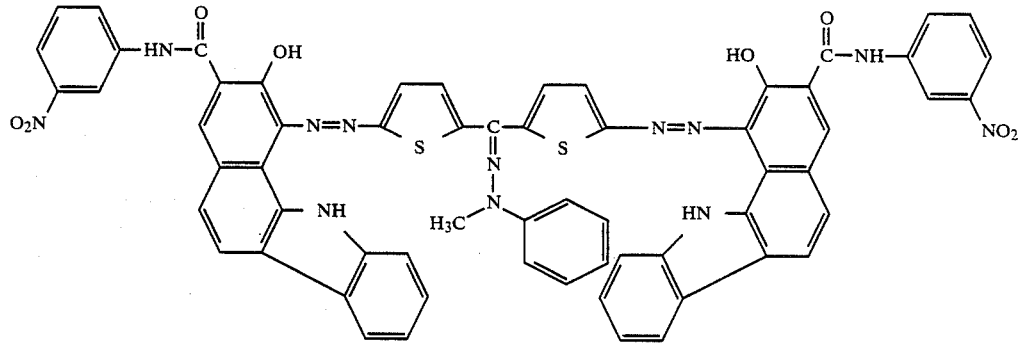
Compound No. IV-29

-continued
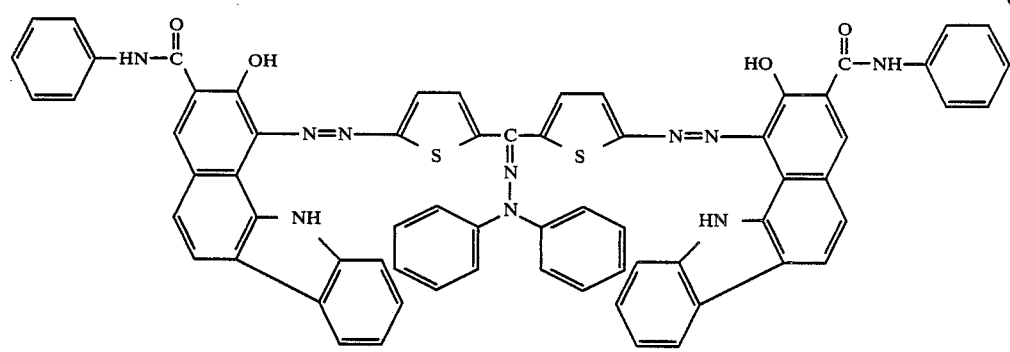
Compound No. IV-30
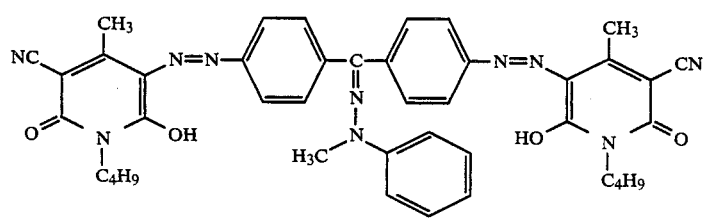
Compound No. IV-31
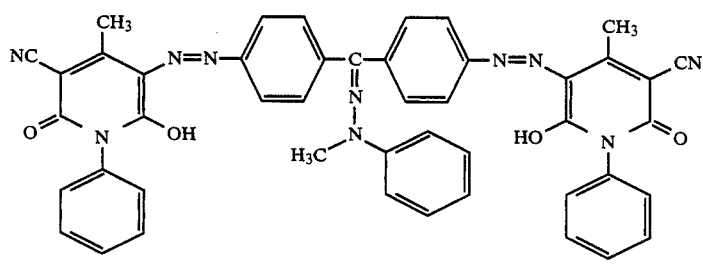
Compound No. IV-32
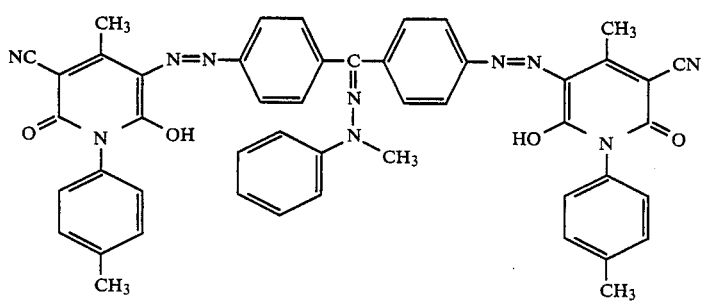
Compound No. IV-33
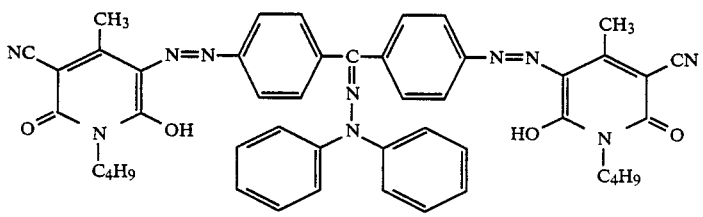
Compound No. IV-34
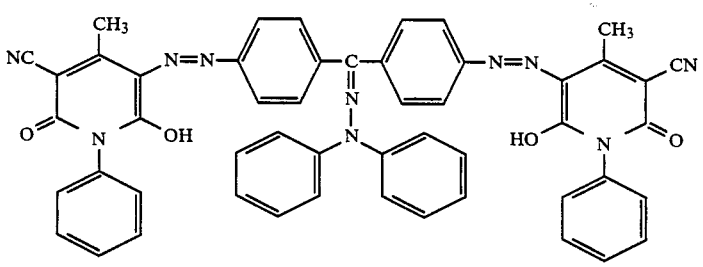
Compound No. IV-35

-continued
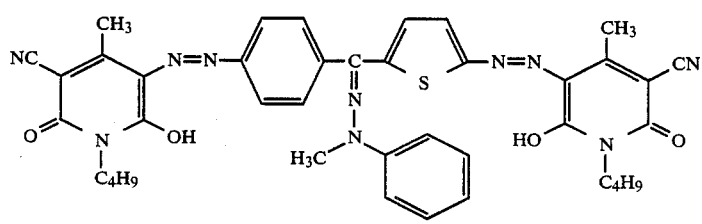
Compound No. IV-36
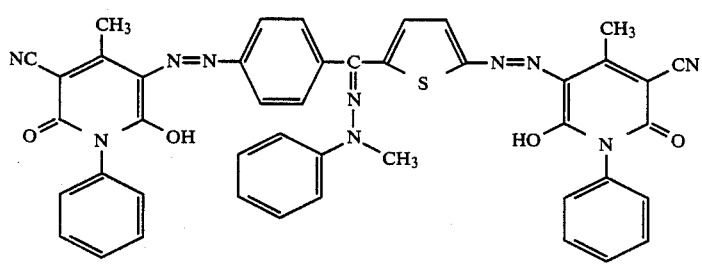
Compound No. IV-37
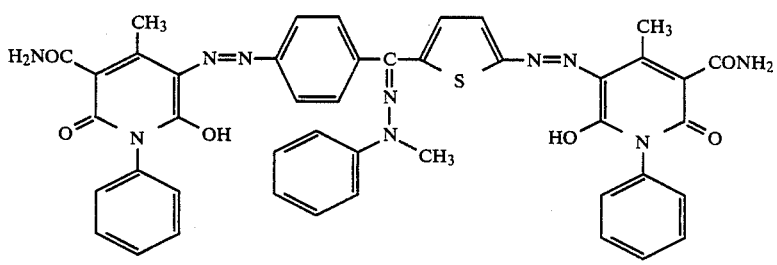
Compound No. IV-38
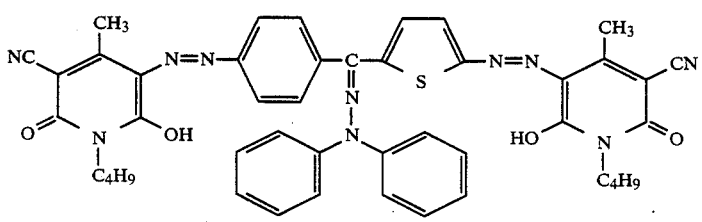
Compound No. IV-39
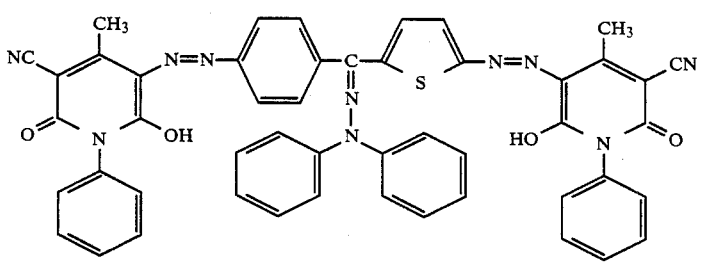
Compound No. IV-40
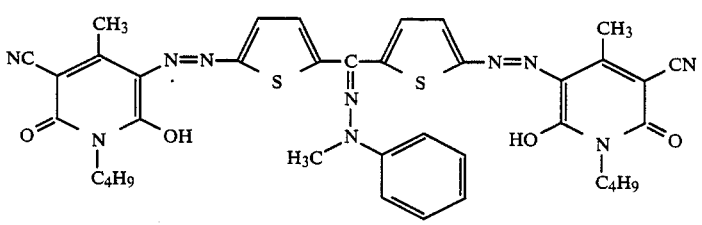
Compound No. IV-41

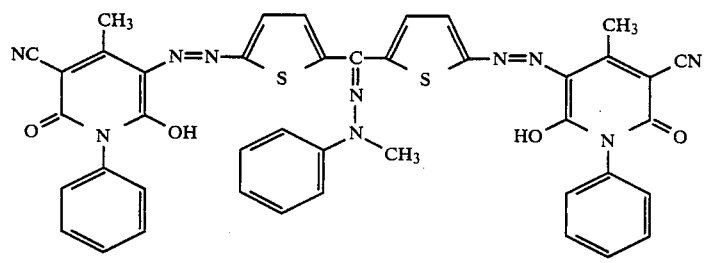
Compound No. IV-42
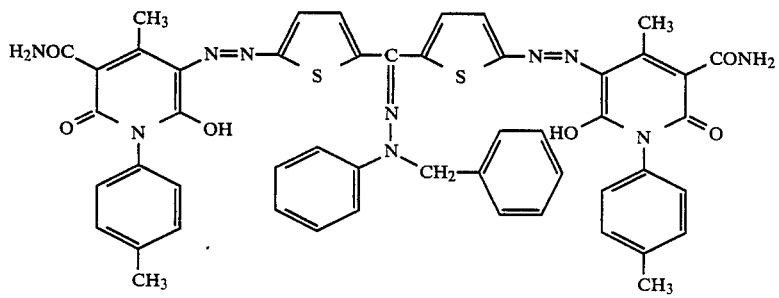
Compound No. IV-43
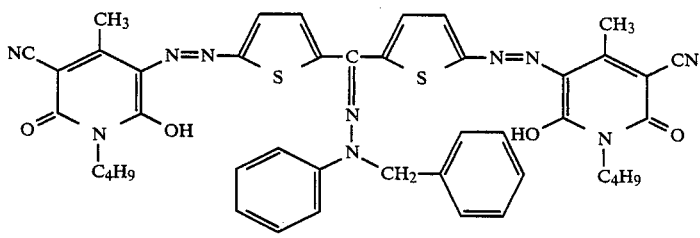
Compound No. IV-44
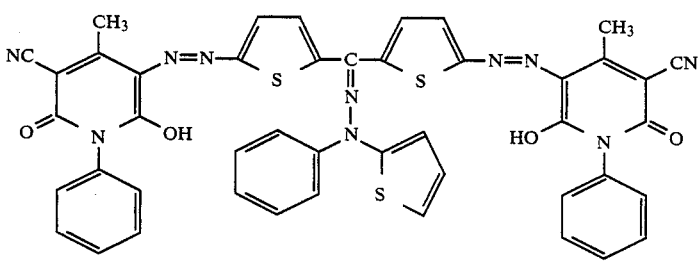
Compound No. IV-45
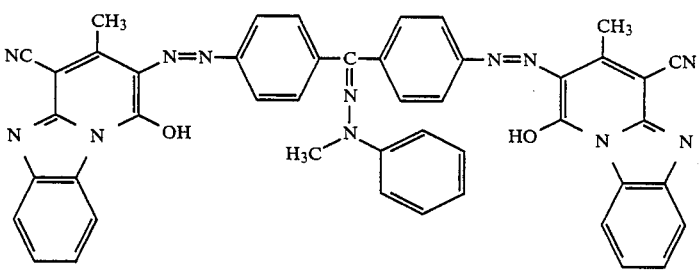
Compound No. IV-46
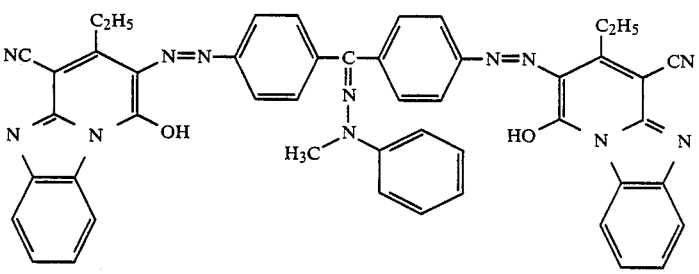
Compound No. IV-47

-continued
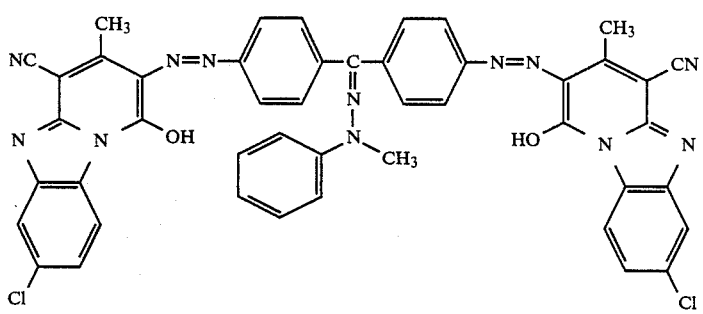
Compound No. IV-48
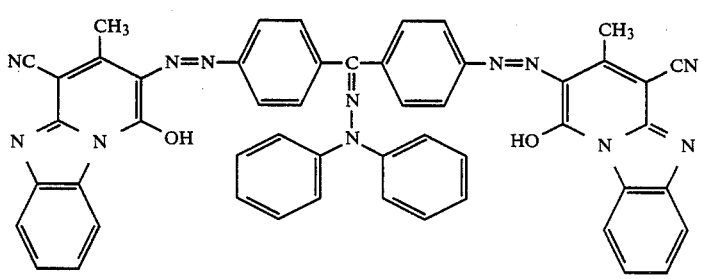
Compound No. IV-49
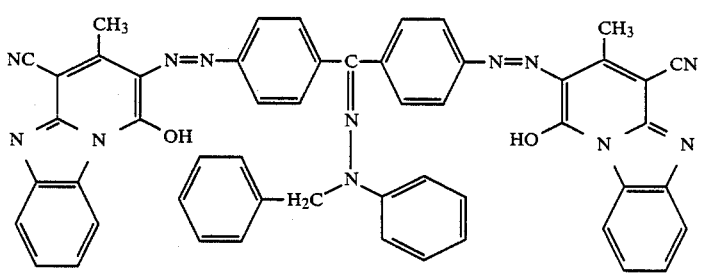
Compound No. IV-50
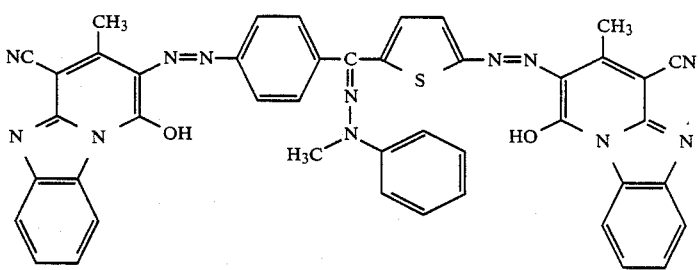
Compound No. IV-51
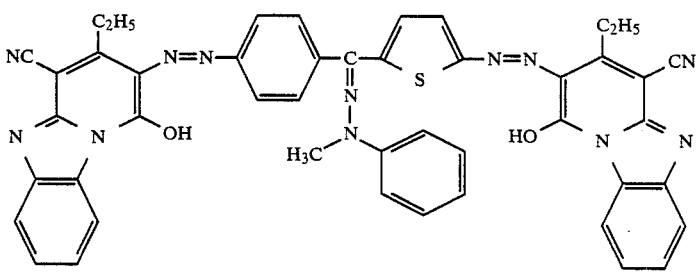
Compound No. IV-52

-continued
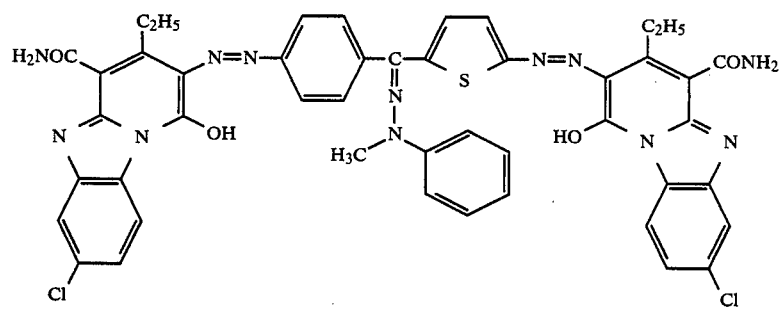
Compound No. IV-53
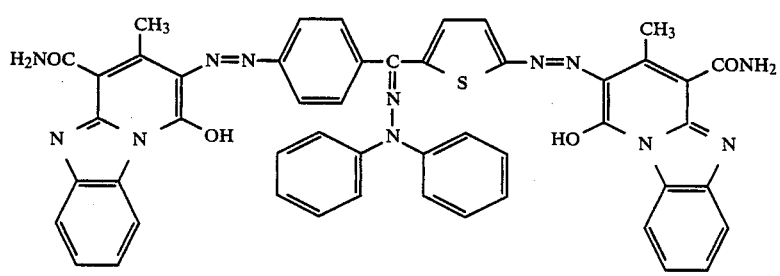
Compound No. IV-54
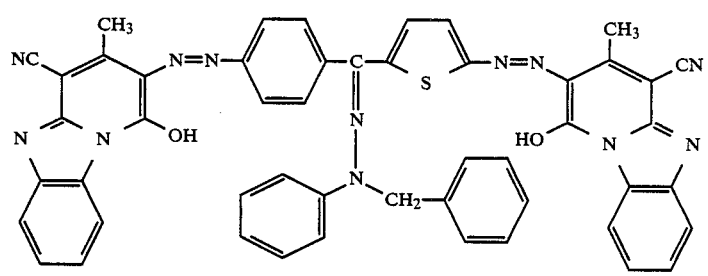
Compound No. IV-55
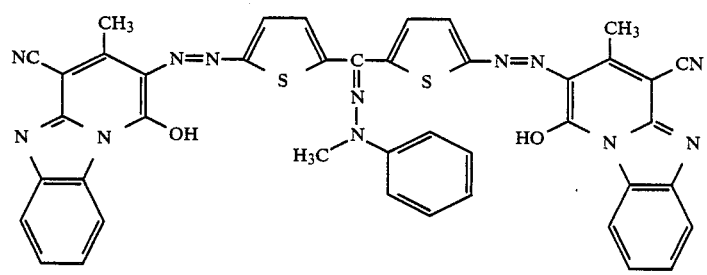
Compound No. IV-56
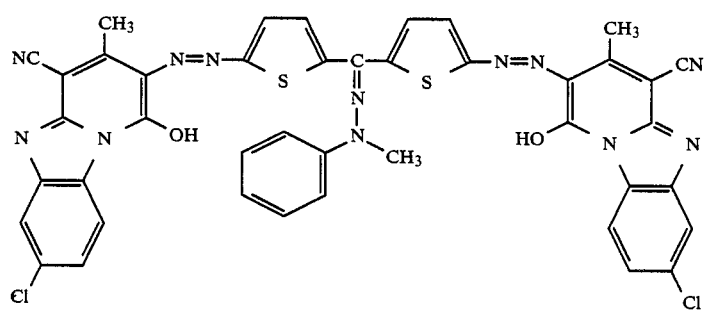
Compound No. IV-57

-continued
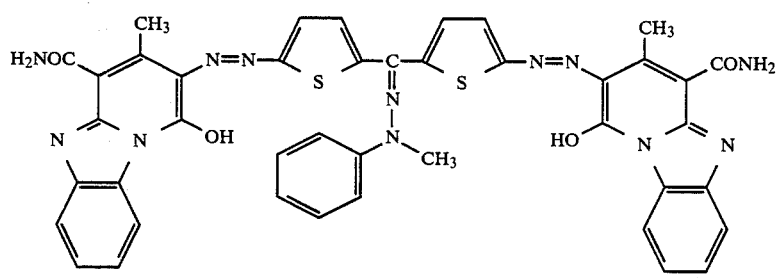
Compound No. IV-58
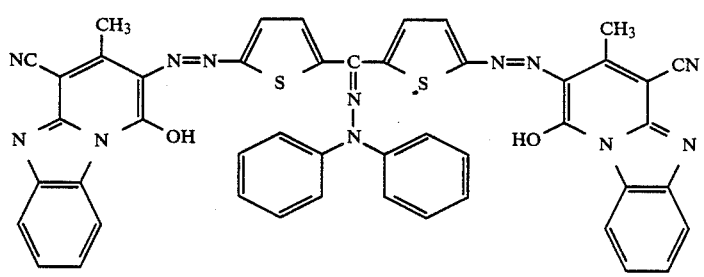
Compound No. IV-59
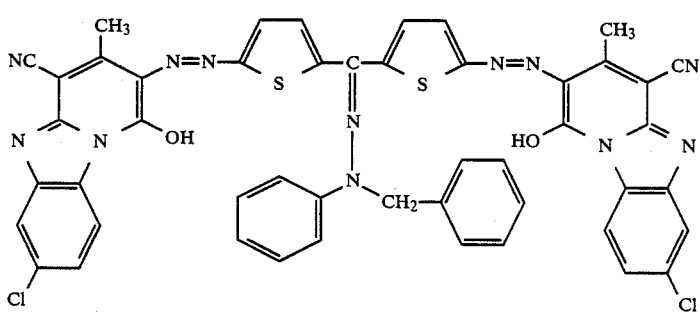
Compound No. IV-60
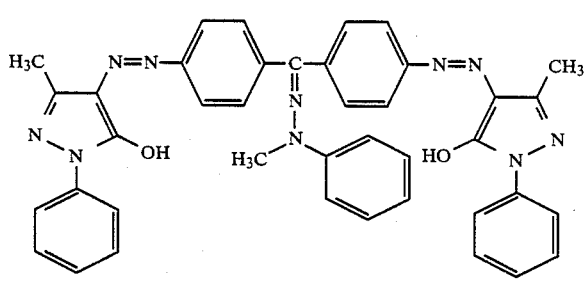
Compound No. IV-61
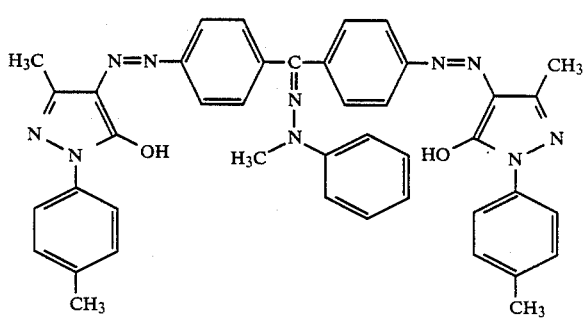
Compound No. IV-62

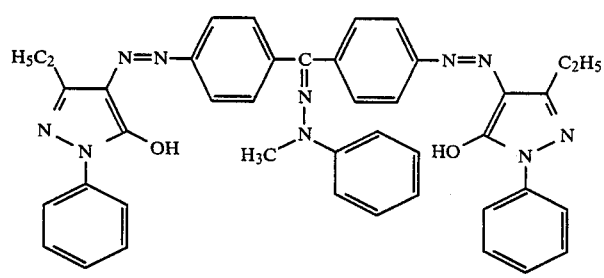
Compound No. IV-63
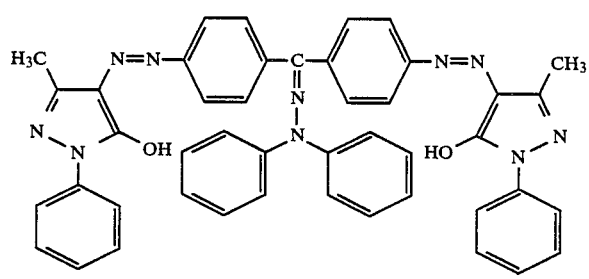
Compound No. IV-64
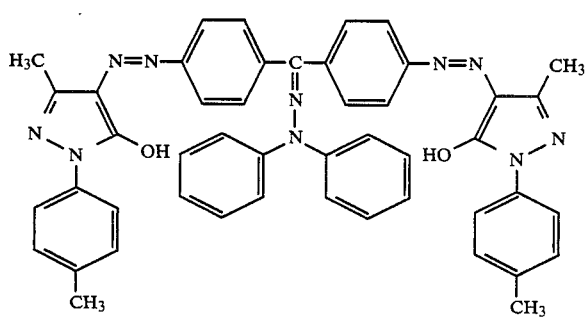
Compound No. IV-65
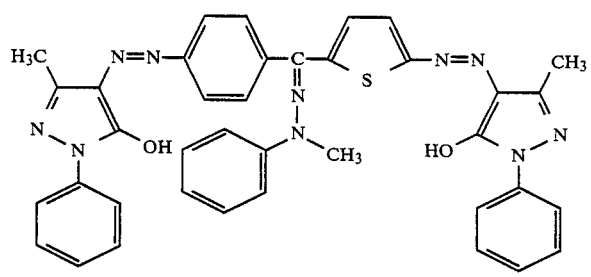
Compound No. IV-66
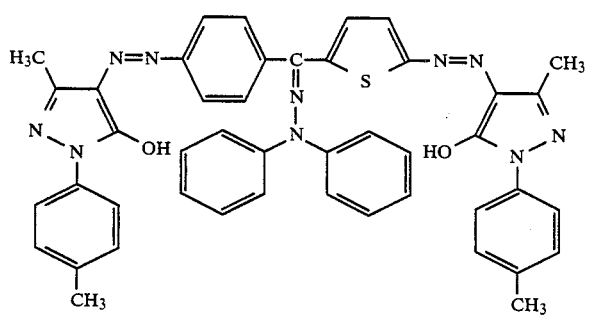
Compound No. IV-67

-continued
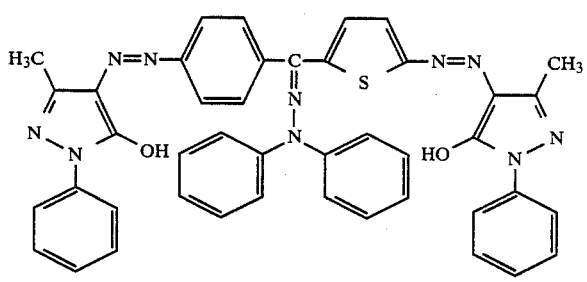
Compound No. IV-68
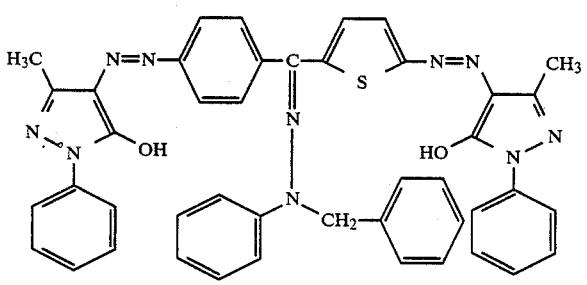
Compound No. IV-69
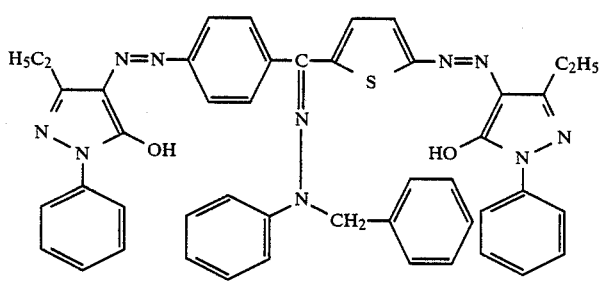
Compound No. IV-70
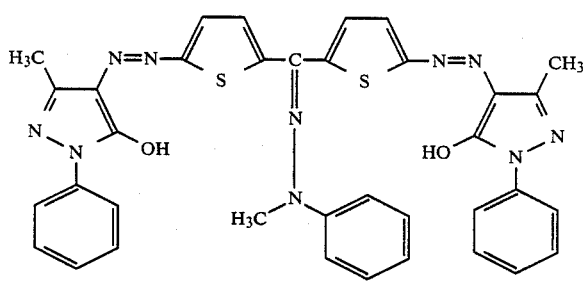
Compound No. IV-71
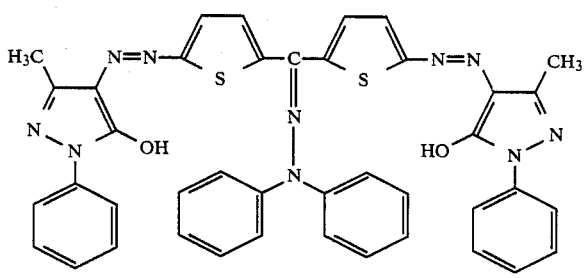
Compound No. IV-72

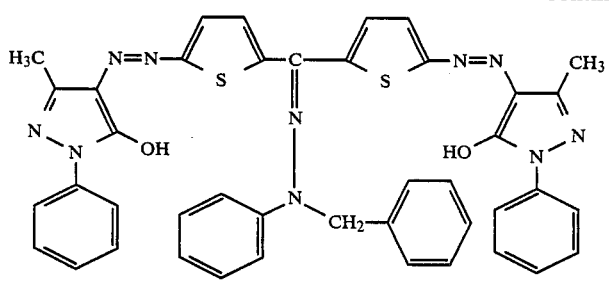

Compound No. IV-73

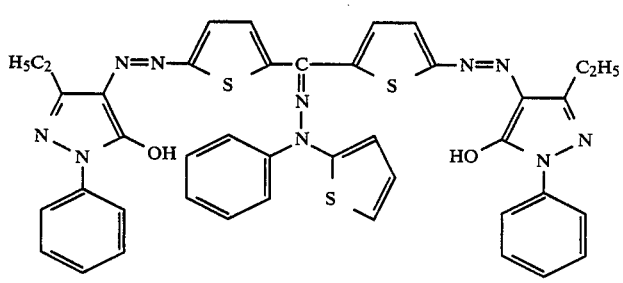

Compound No. IV-74

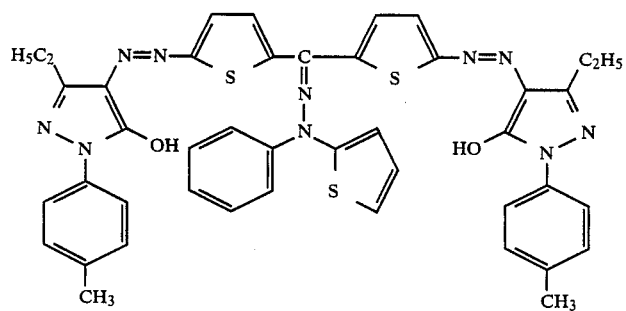

Compound No. IV-75

Examples of the photoconductor, in which chemical compounds included in the compounds represented by the general formula (IV) are used as a charge generating substance, will be explained.

EXAMPLE IV-1

A photoconductor having the structure shown in FIG. 1 and comprising a photosensitive layer having a thickness of 15 μm was produced in substantially the same manner as in Example I-1 except that the disazo compound No. IV-1 mentioned above was used instead of the compound No. I-1.

EXAMPLE IV-2

A solution of 100 parts by weight of p-diethylaminobenzaldehyde-diphenylhydrazone (ABPH) in 700 parts by weight of tetrahydofuran (THF) was mixed with a solution of 100 parts by weight of polycarbonate in 700 parts by weight including the same parts of THF and dichloromethane to prepare a coating liquid. The coating liquid was applied on an aluminum-deposited polyester film substrate by the wire bar technique to form a charge transporting layer having a dry thickness of 15 μm. 50 parts by weight of disazo compound No. IV-1, 50 parts by weight of a polyester resin, and 50 parts by weight of PMMA were kneaded with a mixer for 3 hours together with THF as a solvent to prepare a coating liquid, which was then applied on the charge transporting layer by the wire bar technique to form a charge generating layer having a dry thickness of 0.5 μm. Thus, a photoconductor with a structure corresponding to that shown in FIG. 3 was produced. No covering layer was provided since the present invention is not directly concerned with a covering layer.

EXAMPLE IV-3

A charge transporting layer was produced by forming a photosensitive layer in substantially the same manner as in Example IV-2 except that α-phenyl-4'-N,N-dimethylaminostilbene, which is a styryl compound, was used to replace ABPH as the charge transporting substance. Then a charge generating layer was formed on the charge transporting layer, and thus, a photoconductor was produced.

EXAMPLE IV-4

A charge transporting layer was produced by forming a photosensitive layer in substantially the same manner as in Example IV-2 except that tri(p-toryl)amine, which is a triphenylamine compound, was used to replace ABPH as the charge transporting substance. Then a charge generating layer was formed on the charge transporting layer, thus a photoconductor was produced.

EXAMPLE IV-5

A charge transporting layer was produced by forming a photosensitive layer in substantially the same manner as in Example IV-2 except that 2,5-bis(p-diethylaminophenyl)-1,3,4-oxadiazole, which is an oxadiazole compoud, was used to replace ABPH as the charge transporting substance. Then a charge generating layer was formed on the charge transporting layer, thus a photoconductor was produced.

The electrophotographic characteristics of the five photoconductors thus produced were measured by utilizing an electrostatic recording paper testing apparatus Model SP-428.

The measured values of the surface potentials $V_s$, residual potential $V_r$ and half decay exposure amount $E_{\frac{1}{2}}$ are shown in Table 7. As shown in Table 7, all photocouductors were satisfactory with respect to the surface potential, the residual potential and the half decay exposure amount.

TABLE 7

| Example | $V_s$ (Volts) | $V_r$ (Volts) | $E_{\frac{1}{2}}$ (lux · sec) |
|---|---|---|---|
| IV-1 | 530 | 150 | 5.9 |
| IV-2 | 550 | 175 | 4.8 |
| IV-3 | 495 | 180 | 6.1 |
| IV-4 | 520 | 145 | 5.3 |
| IV-5 | 535 | 125 | 4.6 |

EXAMPLE IV-6

100 parts by weight of each of respective disazo compounds Nos. from IV-2 to IV-75 and 100 parts by weight of polyester were mixed with THF as a solvent wth a mixer for 3 hours to prepare a coating liquid. The respective coating liquids were applied on aluminum substrates to form a photogenerating layer having a dry thickness of about 0.5 μm. Further, the coating liquid described in Example IV-2, which include ABPH as a charge transporting substance, was applied on the respective charge generating layer having a dry thickness of about 15 μm, thus photconductors ans shown in FIG. 2 were produced.

The measured value of the half decay exposure amount $E_{\frac{1}{2}}$ and the residual potential of the above-mentioned examples are shown in Table 8. As shown in Table 8, all photoconductors have good characteristics.

TABLE 8

| Compound No. | $E_{\frac{1}{2}}$ (lux · sec) | $V_r$ (volt) |
|---|---|---|
| IV-2 | 4.9 | −110 |
| IV-3 | 5.6 | −120 |
| IV-4 | 6.8 | −130 |
| IV-5 | 6.3 | −130 |
| IV-6 | 6.4 | −120 |
| IV-7 | 7.9 | −115 |
| IV-8 | 5.9 | −120 |
| IV-9 | 8.2 | −105 |
| IV-10 | 8.1 | −110 |
| IV-11 | 10.1 | −105 |
| IV-12 | 9.9 | −110 |
| IV-13 | 9.7 | −105 |
| IV-14 | 10.5 | −100 |
| IV-15 | 11.1 | −95 |
| IV-16 | 11.1 | −140 |
| IV-17 | 12.1 | −135 |
| IV-18 | 10.5 | −140 |
| IV-19 | 11.3 | −120 |
| IV-20 | 12.8 | −110 |
| IV-21 | 10.7 | −115 |
| IV-22 | 9.6 | −120 |
| IV-23 | 8.4 | −115 |
| IV-24 | 9.3 | −130 |
| IV-25 | 9.1 | −140 |
| IV-26 | 8.7 | −125 |
| IV-27 | 8.6 | −110 |
| IV-28 | 8.6 | −105 |
| IV-29 | 7.9 | −120 |

TABLE 8-continued

| Compound No. | $E_{\frac{1}{2}}$ (lux · sec) | $V_r$ (volt) |
|---|---|---|
| IV-30 | 6.8 | −110 |
| IV-31 | 7.9 | −115 |
| IV-32 | 8.3 | −120 |
| IV-33 | 9.4 | −115 |
| IV-34 | 9.7 | −120 |
| IV-35 | 10.1 | −140 |
| IV-36 | 10.3 | −160 |
| IV-37 | 9.8 | −180 |
| IV-38 | 10.4 | −160 |
| IV-39 | 9.7 | −145 |
| IV-40 | 9.6 | −135 |
| IV-41 | 8.7 | −105 |
| IV-42 | 8.6 | −125 |
| IV-43 | 9.2 | −135 |
| IV-44 | 9.6 | −105 |
| IV-45 | 8.4 | −115 |
| IV-46 | 8.7 | −120 |
| IV-47 | 8.2 | −130 |
| IV-48 | 8.1 | −135 |
| IV-49 | 9.3 | −120 |
| IV-50 | 8.9 | −115 |
| IV-51 | 9.8 | −130 |
| IV-52 | 9.7 | −120 |
| IV-53 | 9.2 | −110 |
| IV-54 | 8.9 | −110 |
| IV-55 | 10.1 | −120 |
| IV-56 | 12.1 | −115 |
| IV-57 | 11.7 | −125 |
| IV-58 | 12.2 | −110 |
| IV-59 | 11.4 | −125 |
| IV-60 | 10.9 | −130 |
| IV-61 | 10.7 | −105 |
| IV-62 | 10.6 | −100 |
| IV-63 | 9.9 | −95 |
| IV-64 | 11.2 | −100 |
| IV-65 | 10.9 | −110 |
| IV-66 | 10.7 | −105 |
| IV-67 | 11.6 | −95 |
| IV-68 | 10.1 | −90 |
| IV-69 | 12.1 | −105 |
| IV-70 | 11.5 | −110 |
| IV-71 | 10.7 | −110 |
| IV-72 | 9.9 | −105 |
| IV-73 | 9.7 | −100 |
| IV-74 | 10.4 | −105 |
| IV-75 | 9.8 | −95 |

The third group of disazo compound to be used in the present invnetion is represented by a general formula (V):

$$C_p-N=N-G-N=N-C_p \quad (V)$$

wherein G stands for one of the structures represneted by the folowing general formulae (VA) to (VC), and wherein $C_p$ stands for a residual group of a coupler.

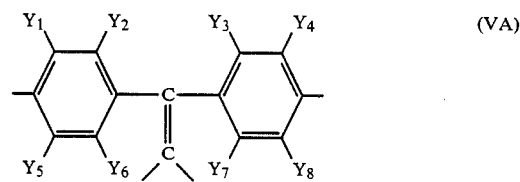

(VA)

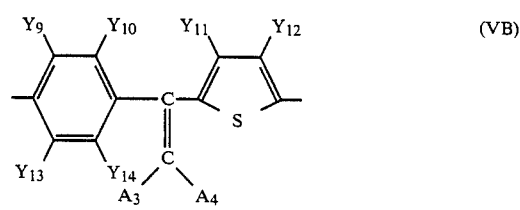

(VB)

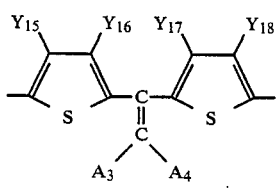

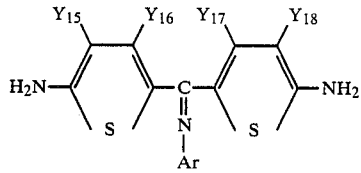

In the formulae (VA) to (VC), $Y_1$ to $Y_{18}$ are the same as that in the formulae (IIIA) to (IIIC) described before, while each of $A_3$ and $A_4$ stands for a hydrogen atom, a cyano group, an aralkyl group which may have a substituent(s), or an aromatic hydrocarbon group or aromatic heterocyclic group both of which may have a substituent(s).

In the disazo compound represented by the general formula (V), $C_p$ preferably has one of structures represented by the general formulae (IIID) to (IIIG).

These diazo compounds represented by the general formula (V) can be synthesized according to the following process, that is, an amino compound represneted by one of following general formulae is diazotized by the usual method and the resultant diazo compound undergoes a coupling reaction with a corresponding coupler in a suitable solvent (for example, N,N-dimethylamide, dimethyl sulfoxide and the like) in the presence of an alkali.

Specific examples of disazo compounds of the general formula (V) prepared in the above-mentioned manner include:

Compound No. V-1

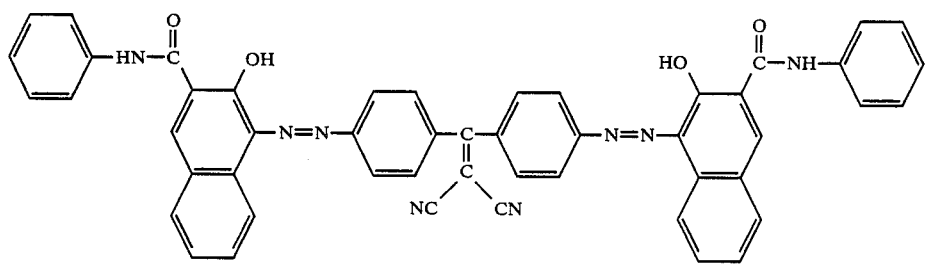

Compound No. V-2

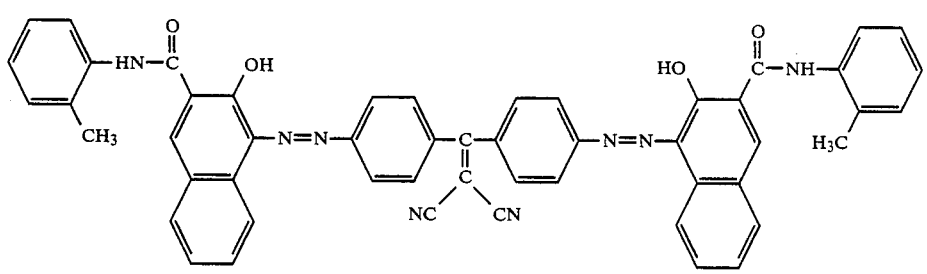

Compound No. V-3

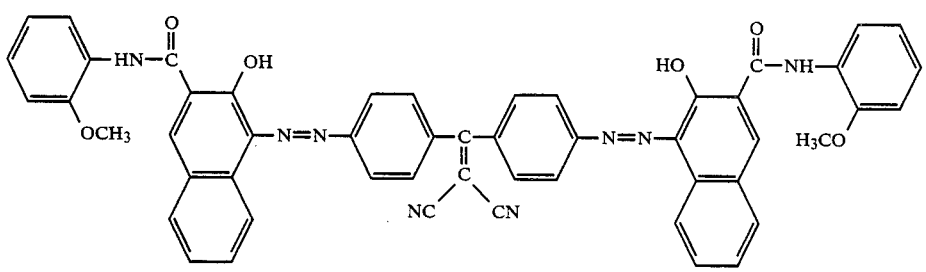

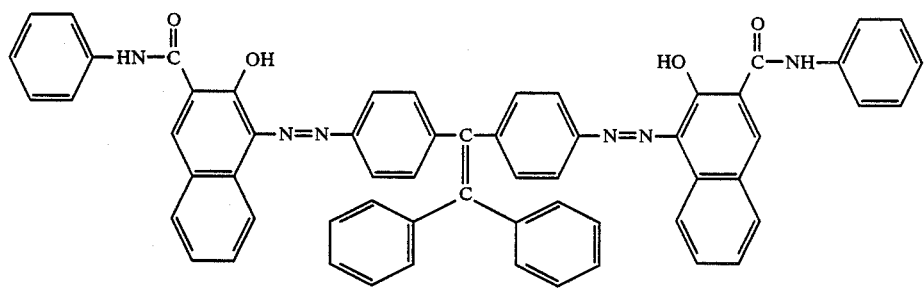
Compound No. V-4
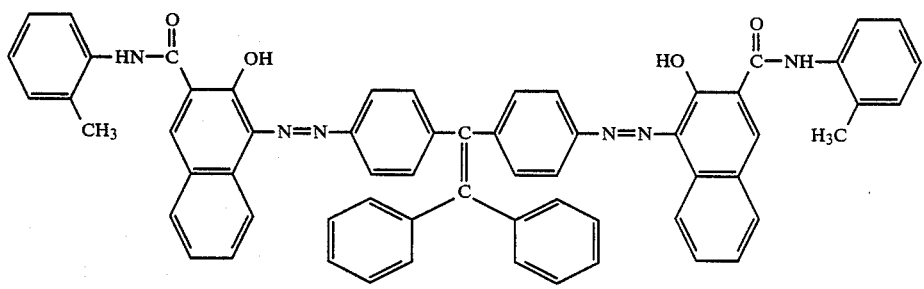
Compound No. V-5
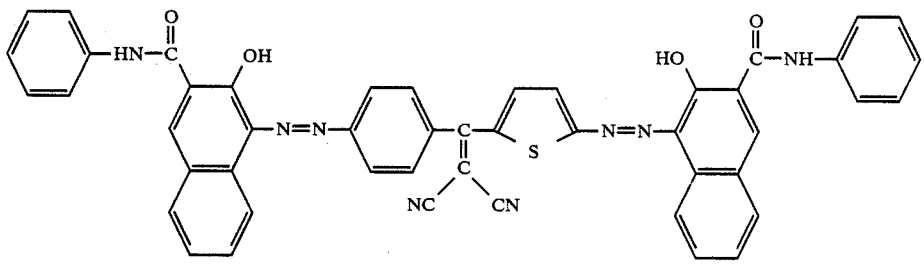
Compound No. V-6
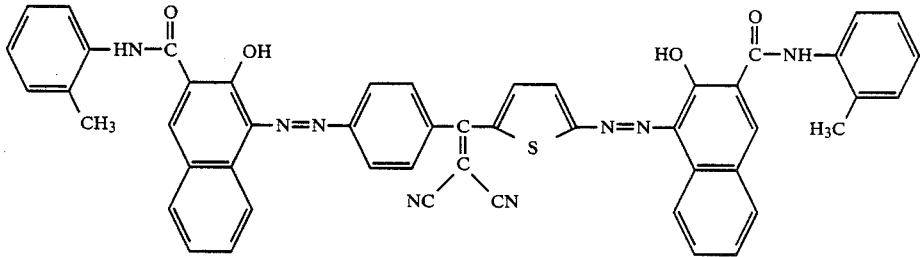
Compound No. V-7
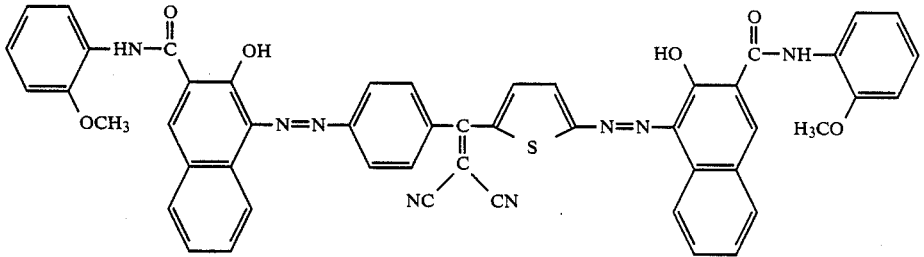
Compound No. V-8

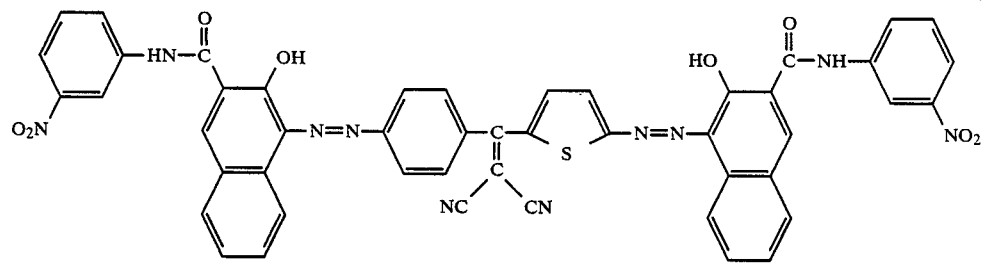
Compound No. V-9
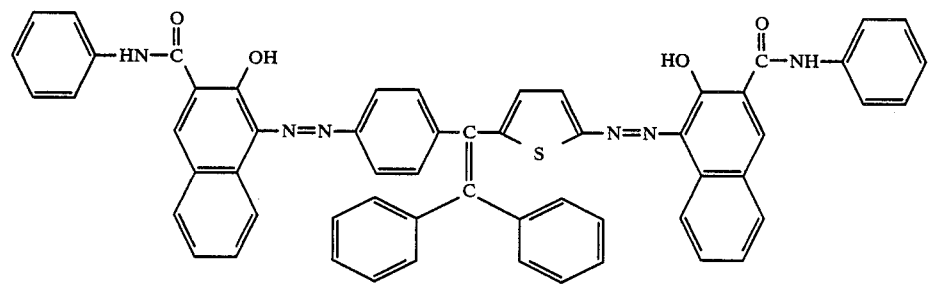
Compound No. V-10
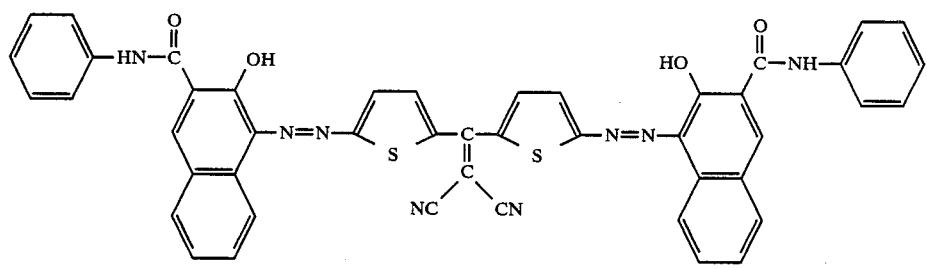
Compound No. V-11
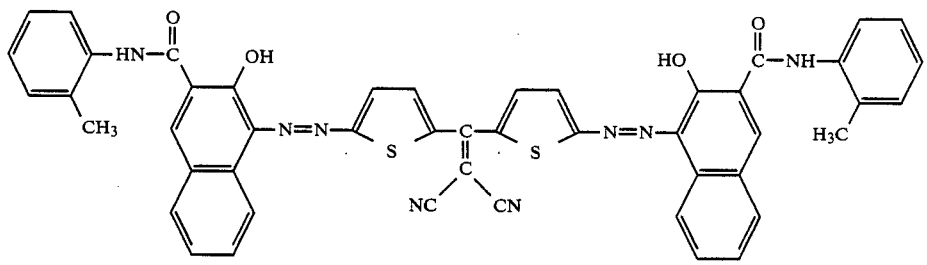
Compound No. V-12
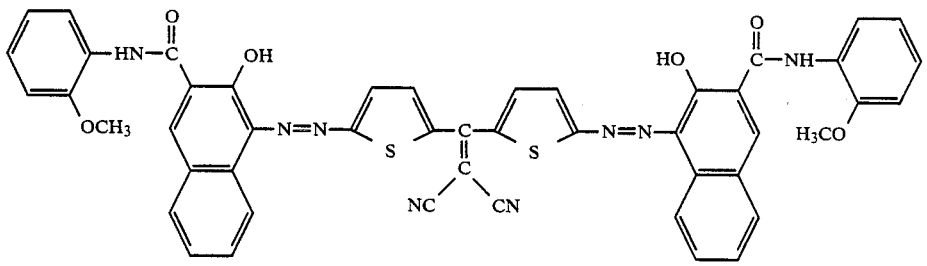
Compound No. V-13

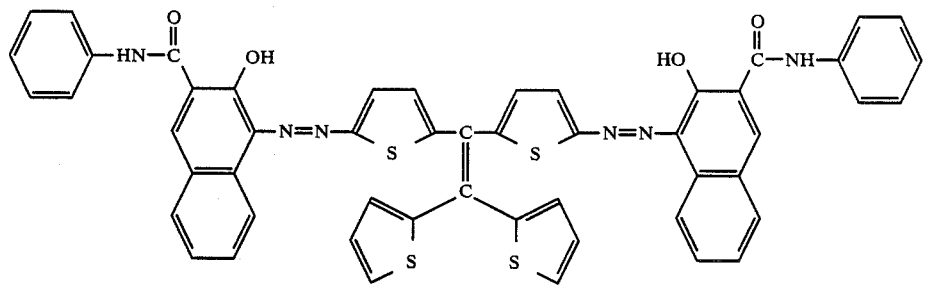
Compound No. V-14
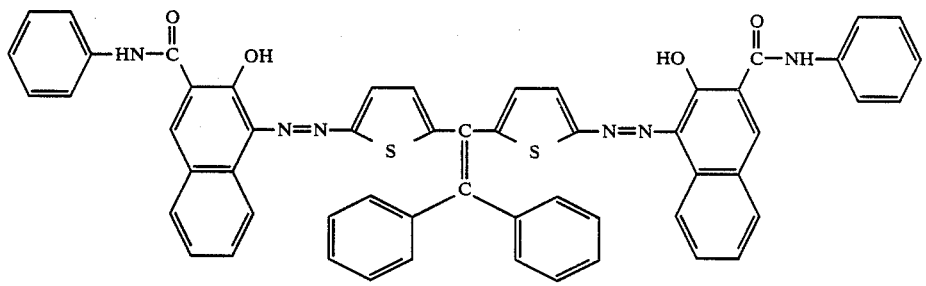
Compound No. V-15
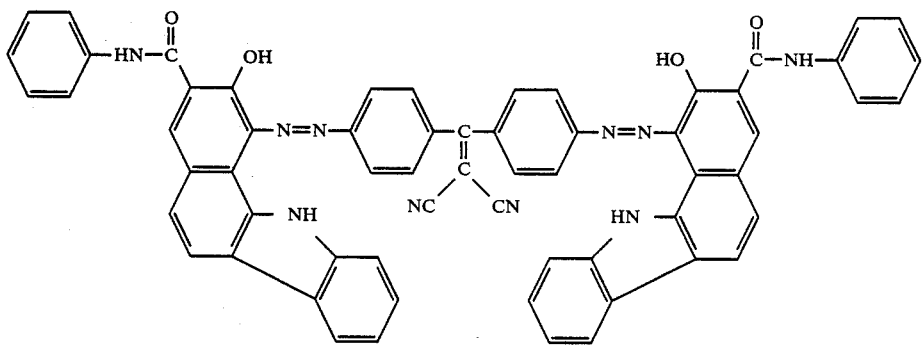
Compound No. V-16
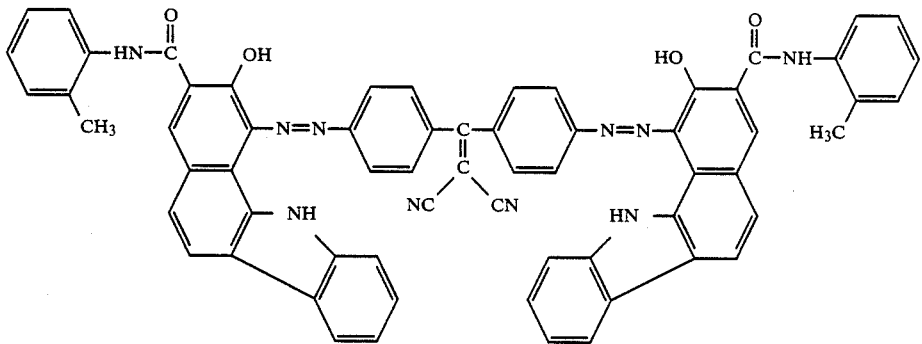
Compound No. V-17

Compound No. V-18
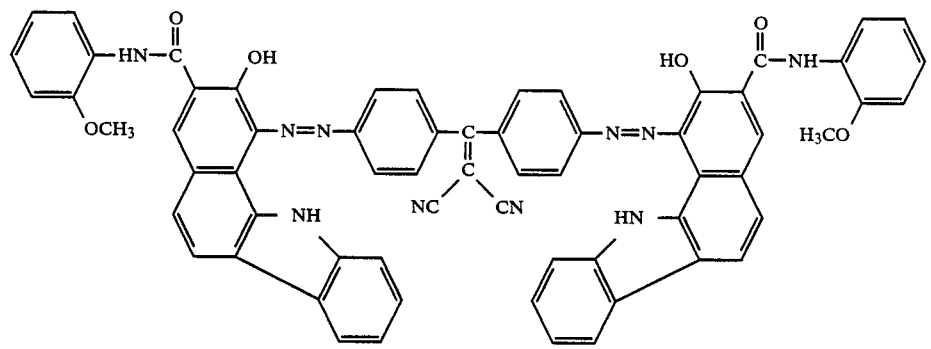
Compound No. V-19
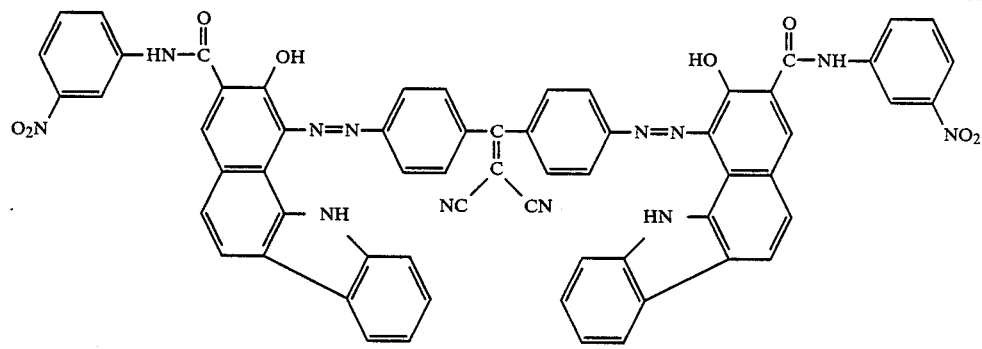
Compound No. V-20
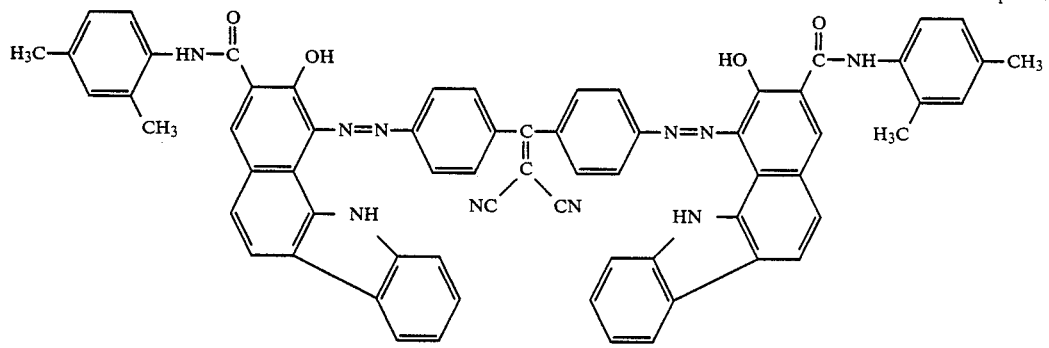
Compound No. V-21
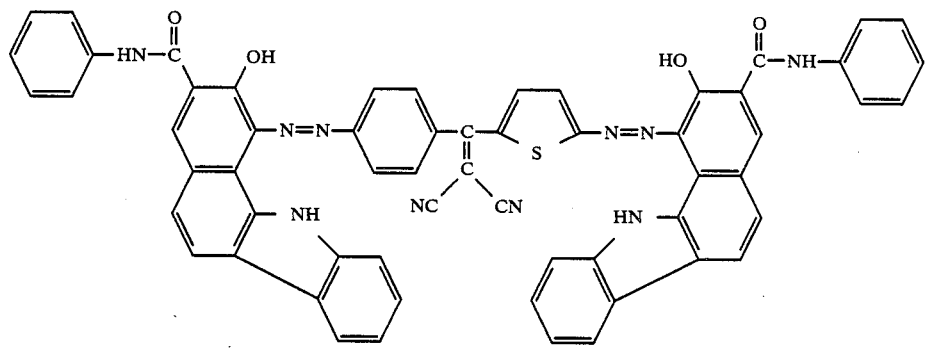

-continued
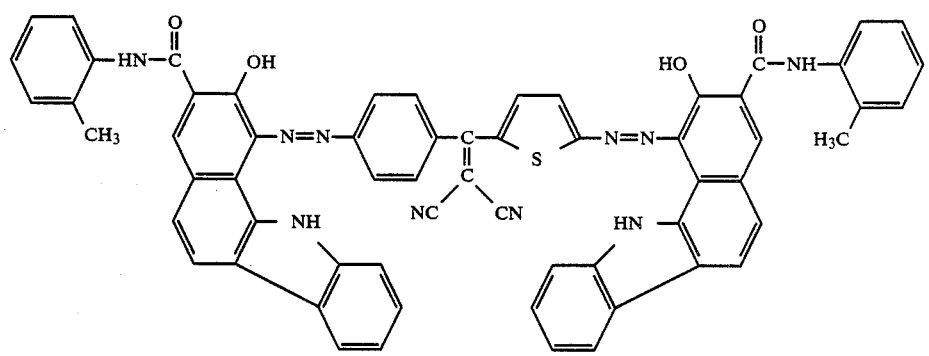
Compound No. V-22
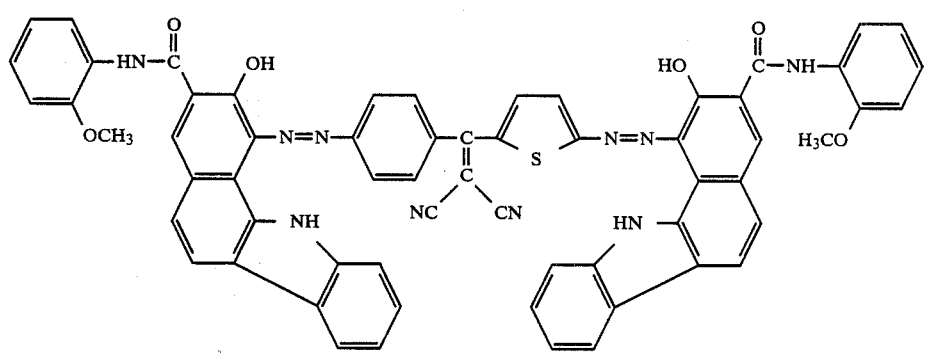
Compound No. V-23
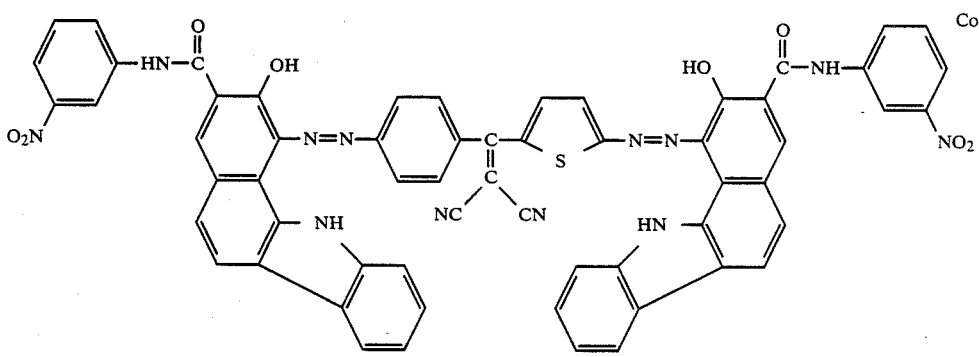
Compound No. V-24
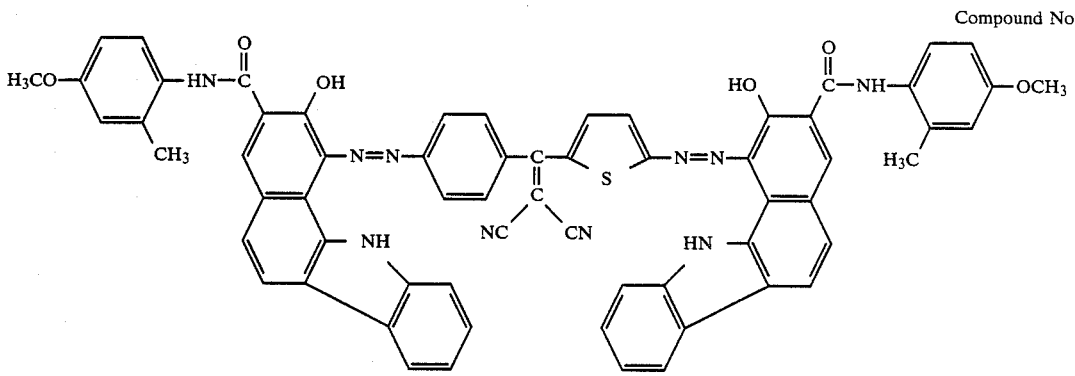
Compound No. V-25

-continued
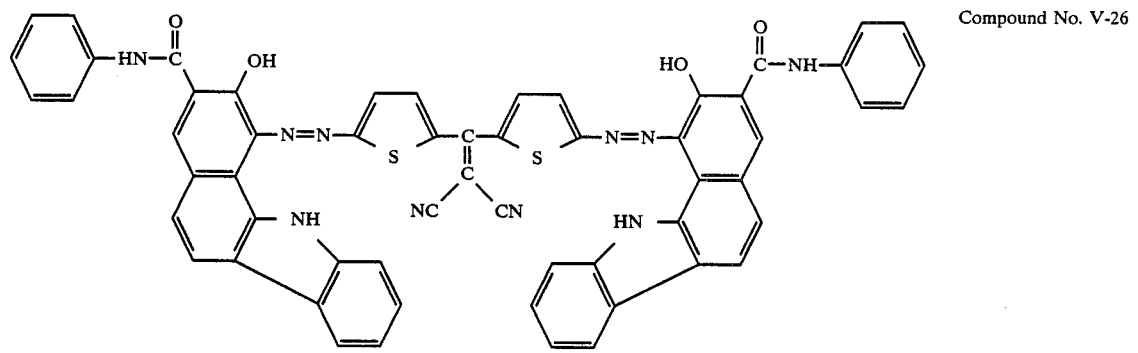
Compound No. V-26
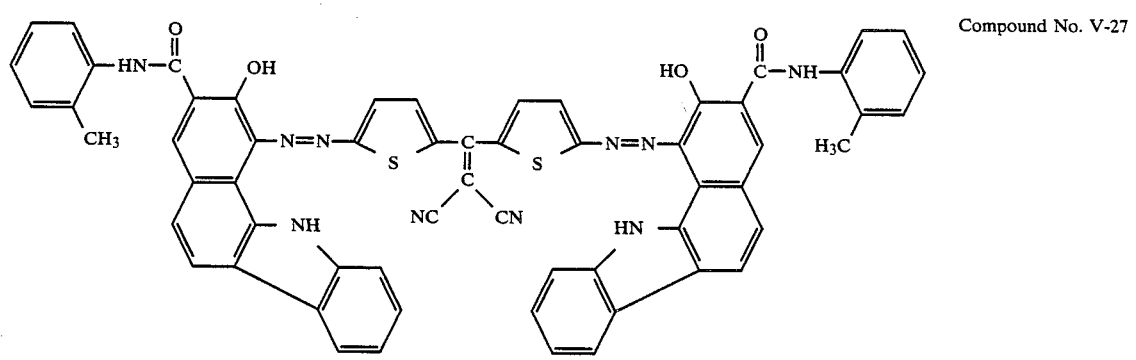
Compound No. V-27
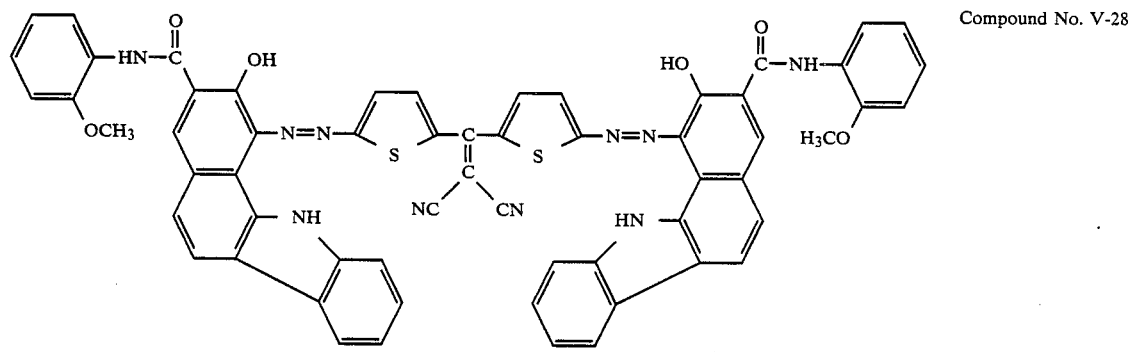
Compound No. V-28
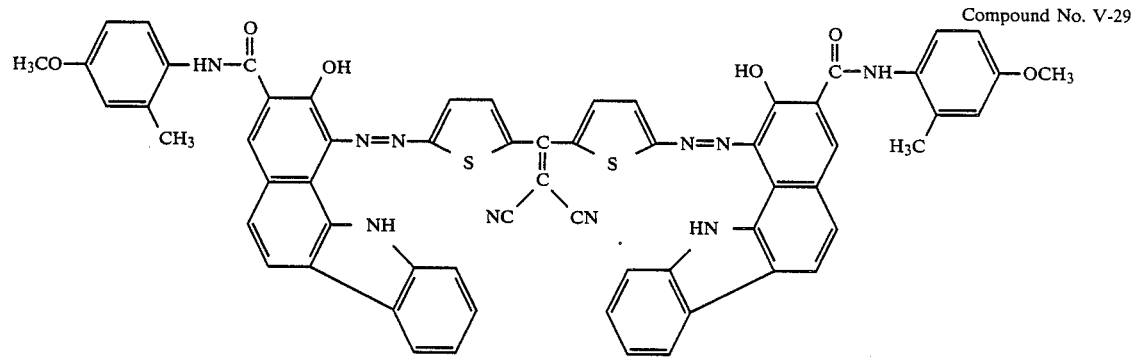
Compound No. V-29

-continued
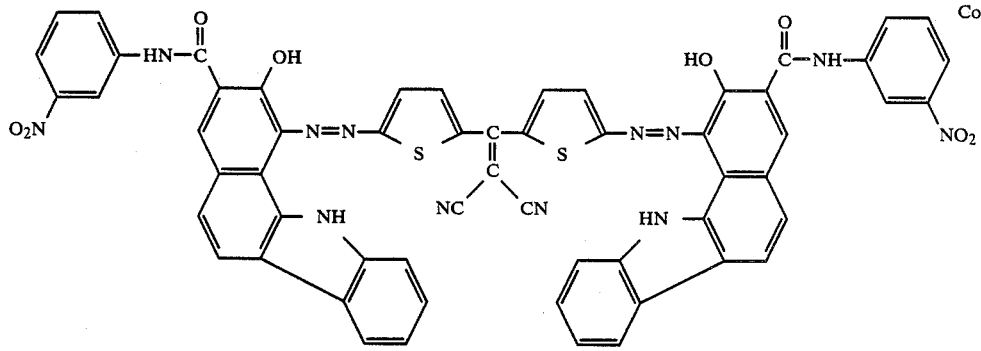
Compound No. V-30
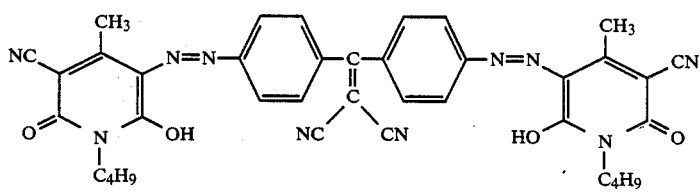
Compound No. V-31
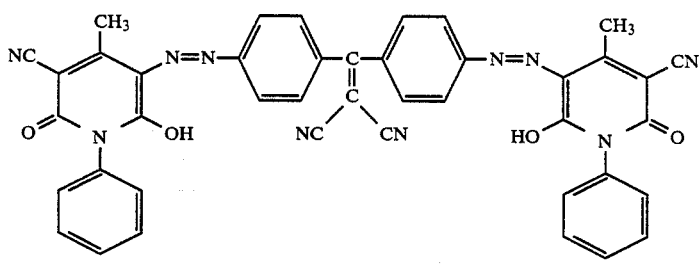
Compound No. V-32
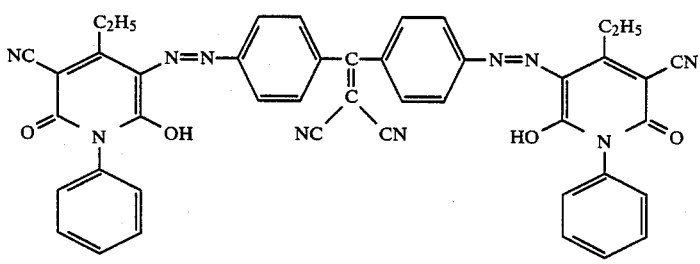
Compound No. V-33
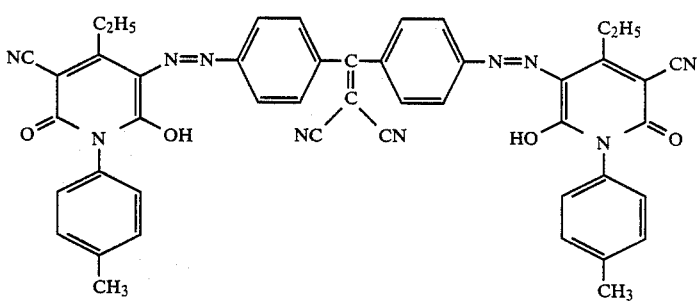
Compound No. V-34
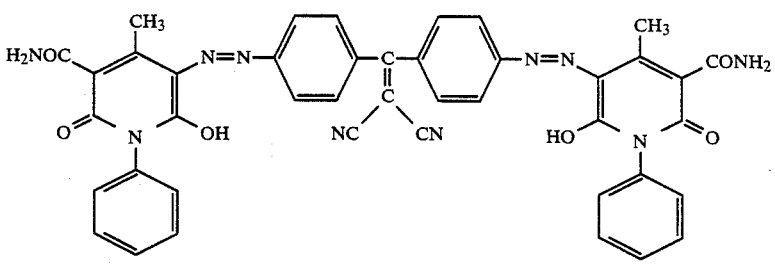
Compound No. V-35

-continued
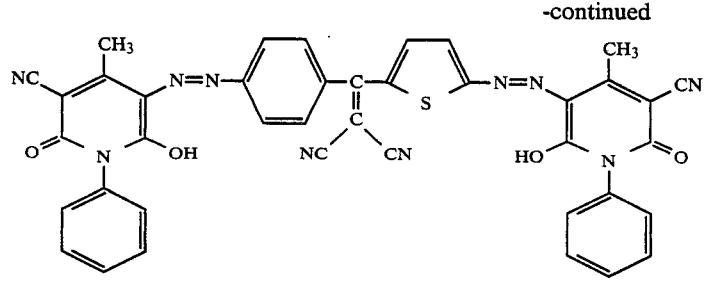
Compound No. V-36
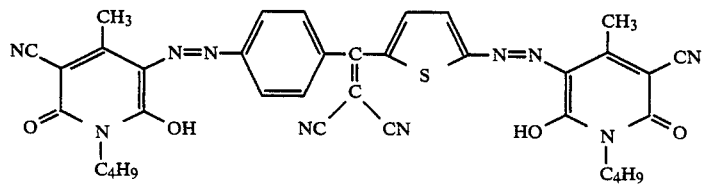
Compound No. V-37
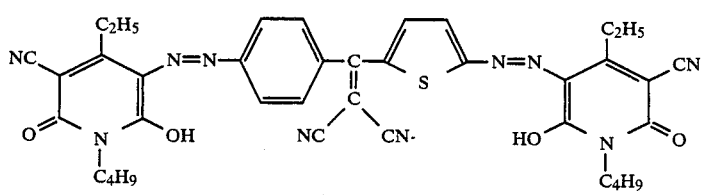
Compound No. V-38
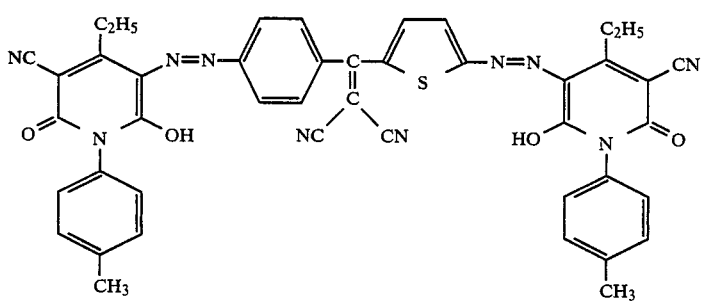
Compound No. V-39
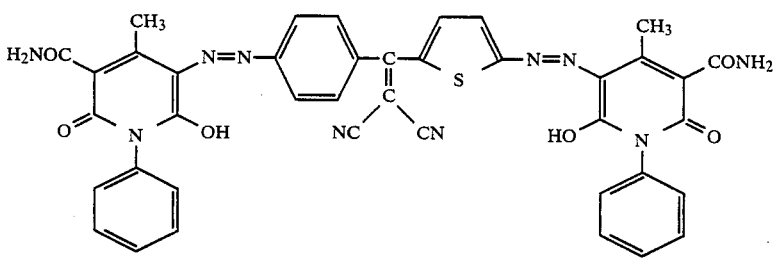
Compound No. V-40
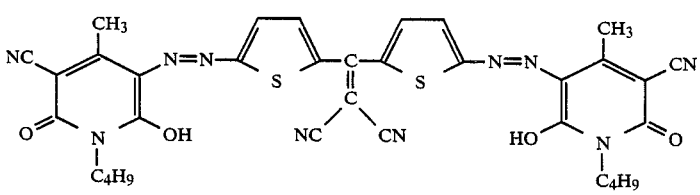
Compound No. V-41
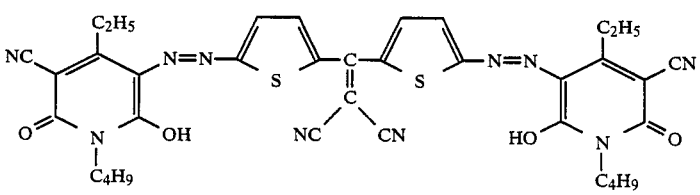
Compound No. V-42

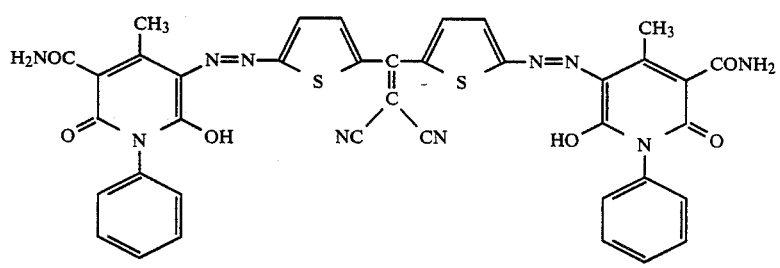
Compound No. V-43
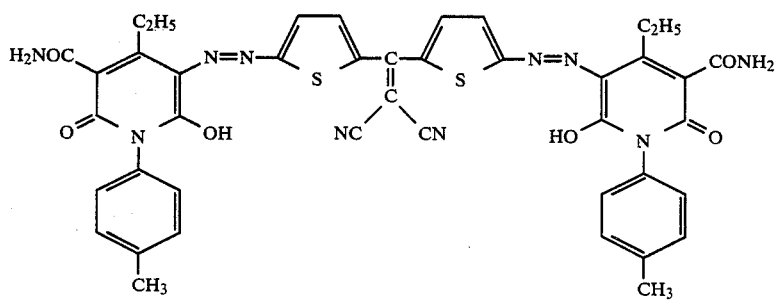
Compound No. V-44
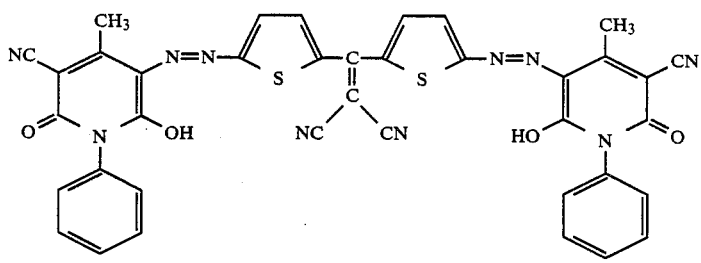
Compound No. V-45
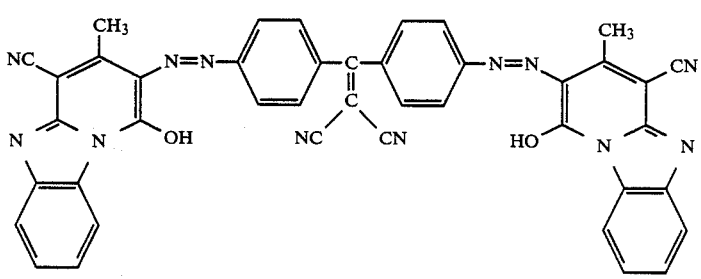
Compound No. V-46
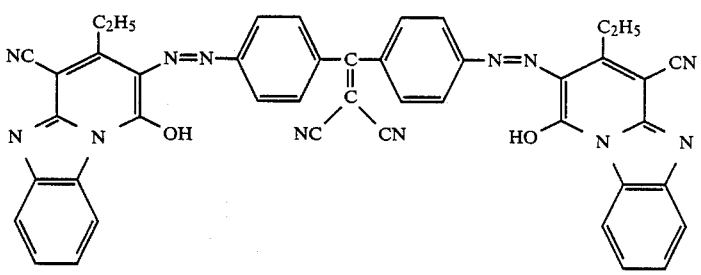
Compound No. V-47
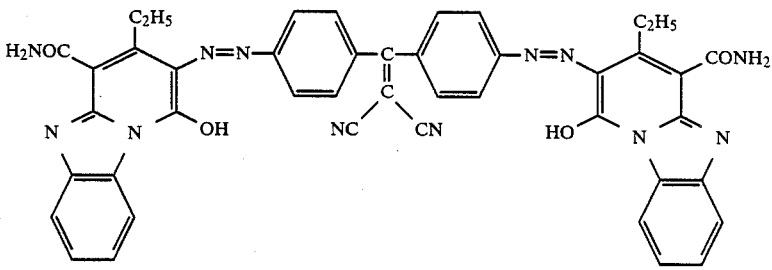
Compound No. V-48

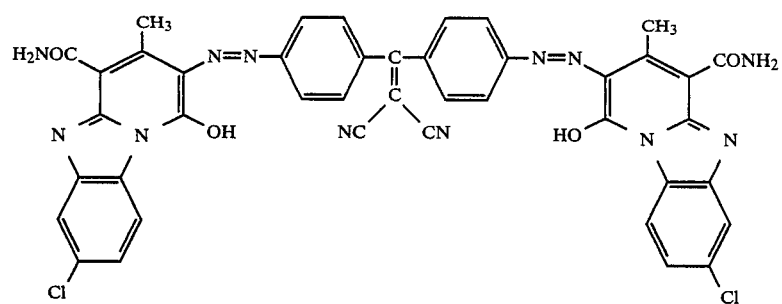
Compound No. V-49
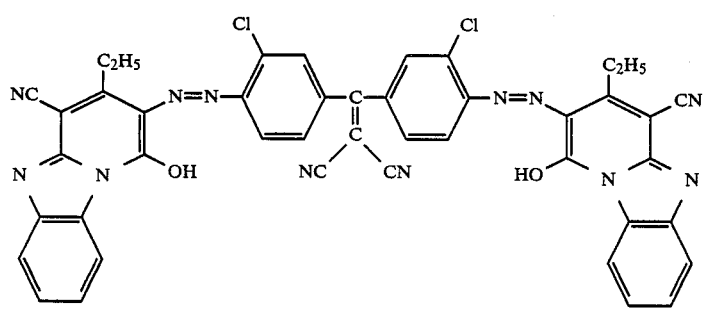
Compound No. V-50
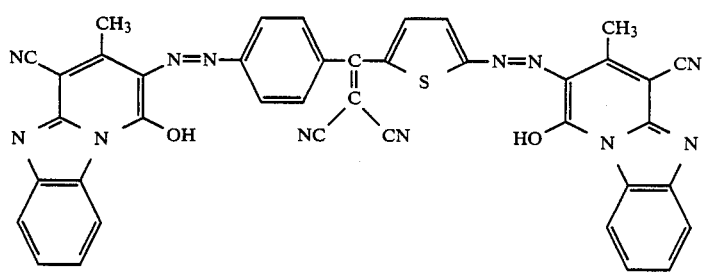
Compound No. V-51
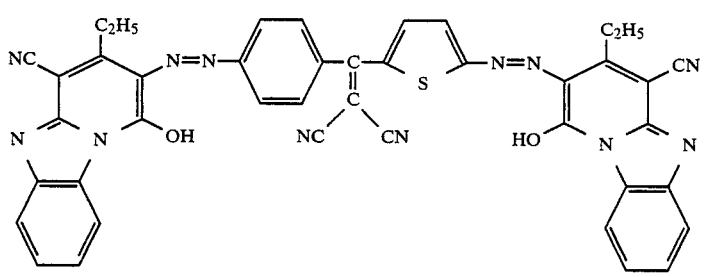
Compound No. V-52
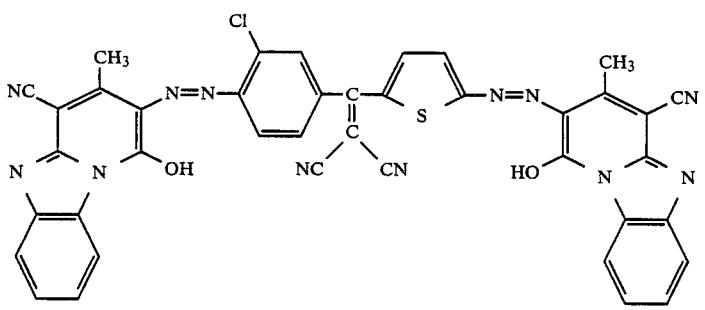
Compound No. V-53

-continued
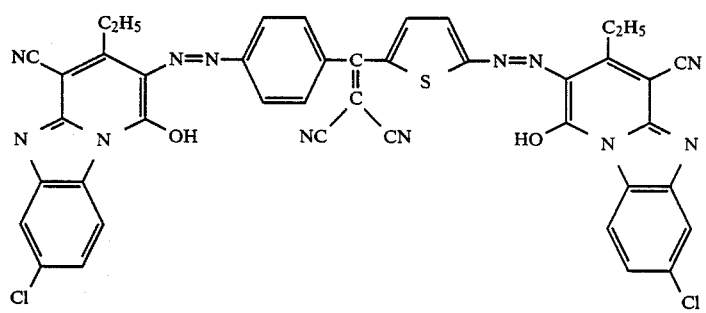
Compound No. V-54
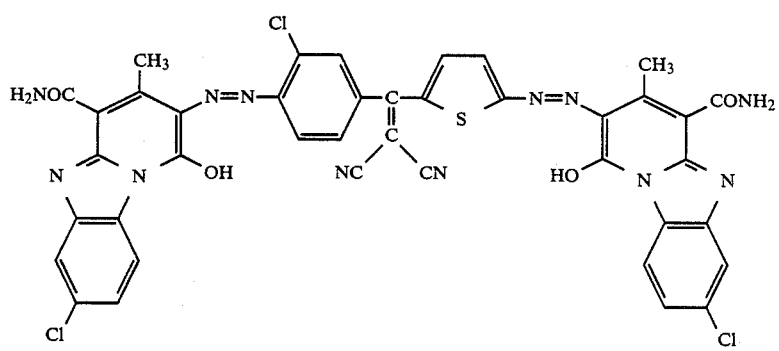
Compound No. V-55
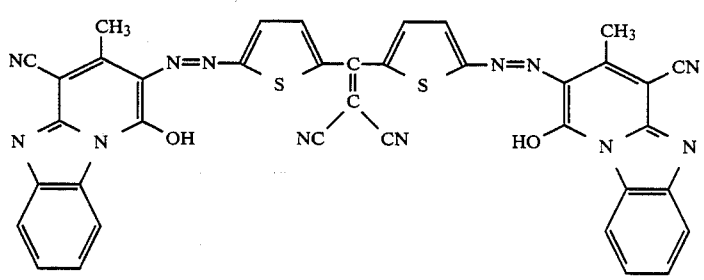
Compound No. V-56
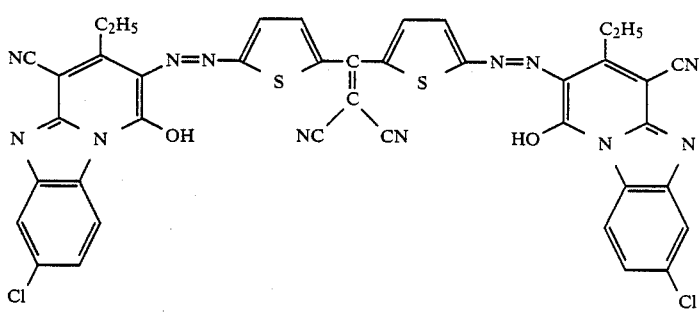
Compound No. V-57
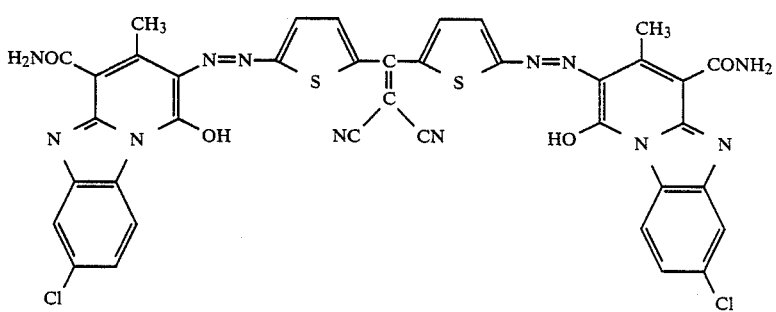
Compound No. V-58

-continued
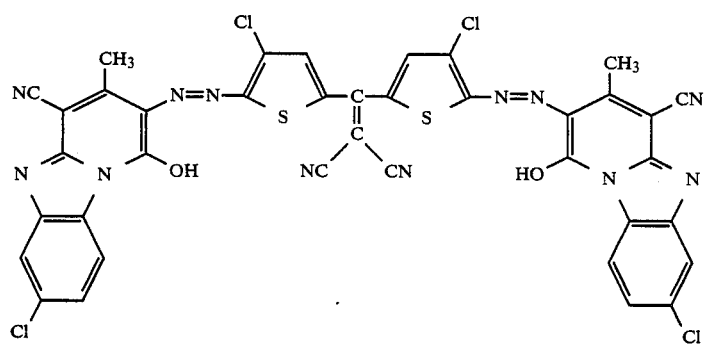
Compound No. V-59
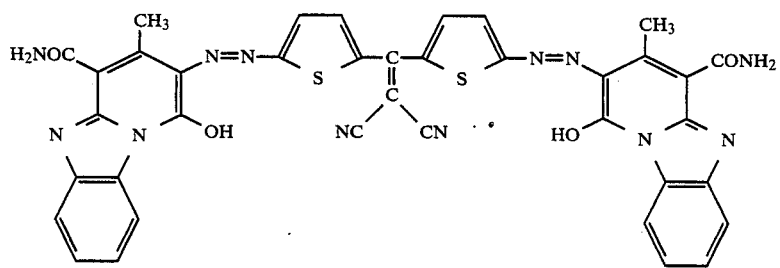
Compound No. V-60
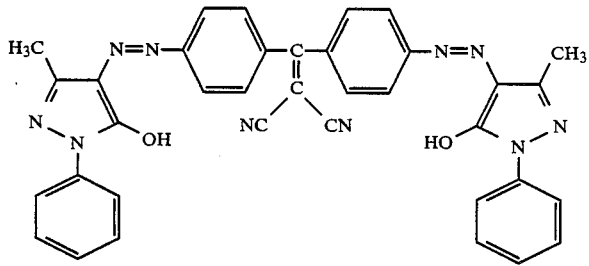
Compound No. V-61
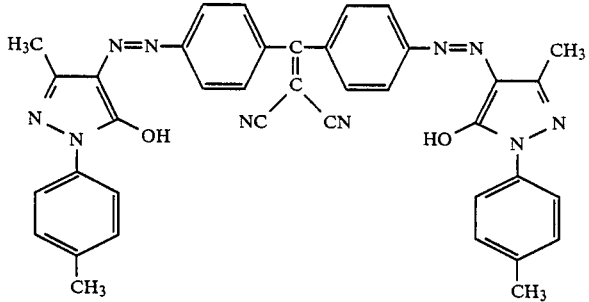
Compound No. V-62
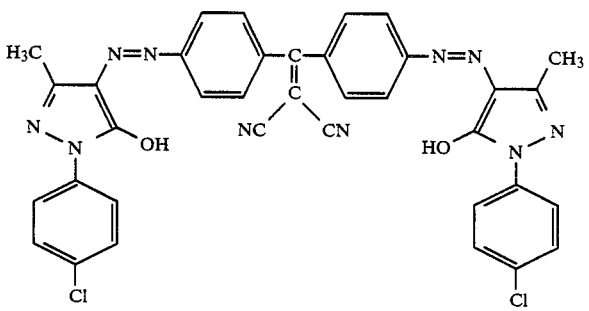
Compound No. V-63

-continued
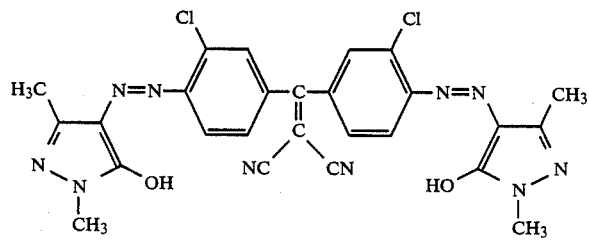
Compound No. V-64
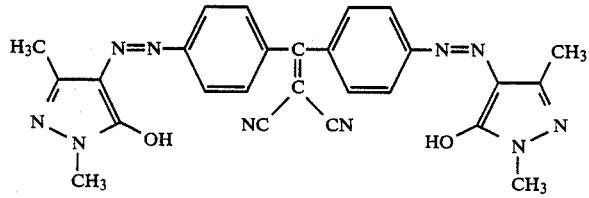
Compound No. V-65
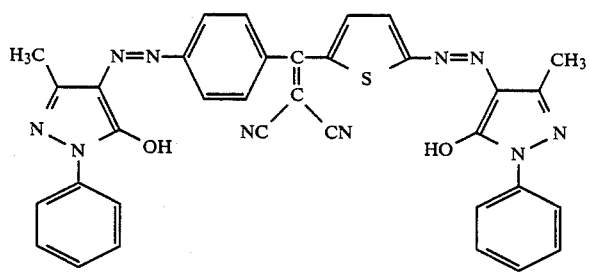
Compound No. V-66
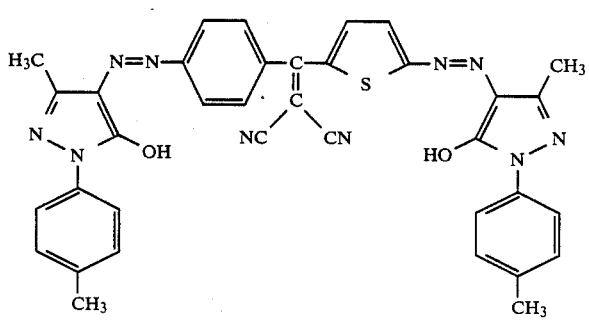
Compound No. V-67
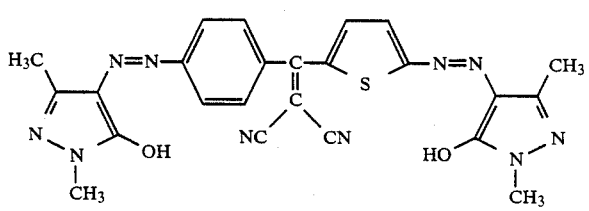
Compound No. V-68
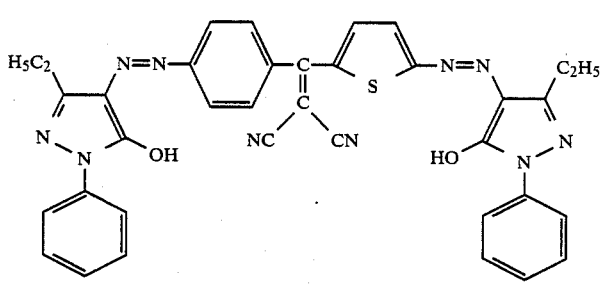
Compound No. V-69

-continued
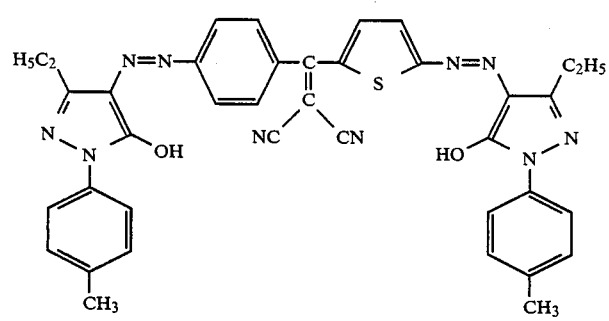
Compound No. V-70
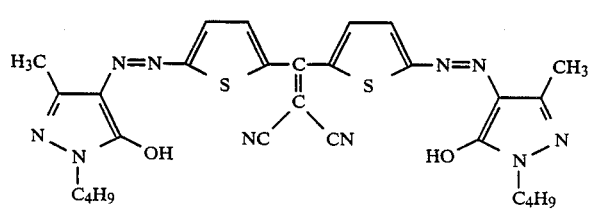
Compound No. V-71
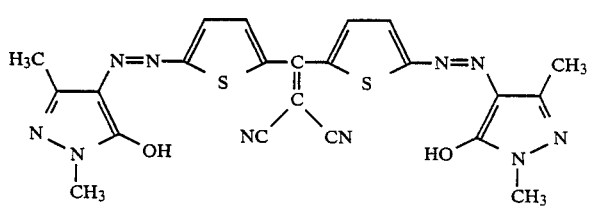
Compound No. V-72
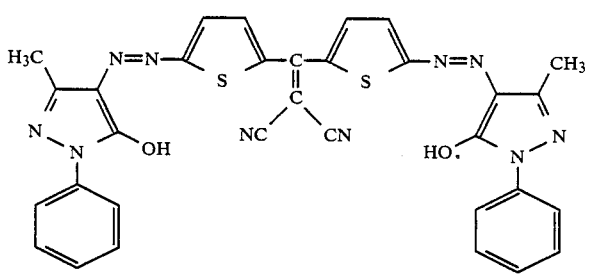
Compound No. V-73
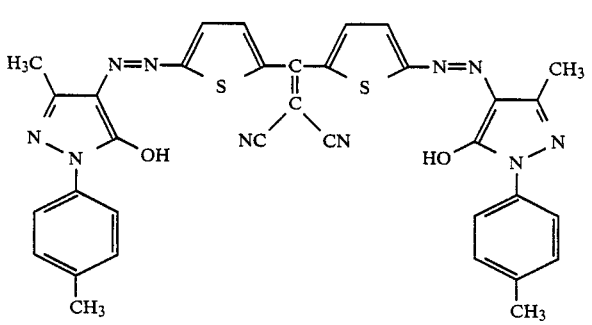
Compound No. V-74

-continued

Compound No. V-75

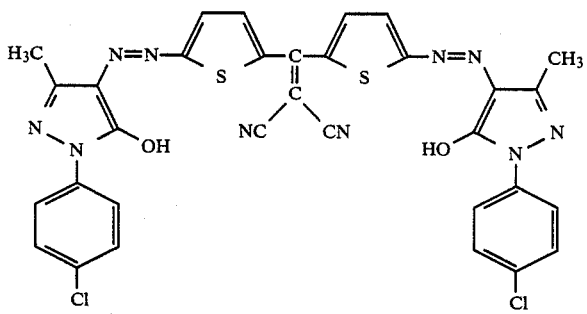

EXAMPLE V-1

A photoconductor having the structure shown in FIG. 1 and comprising a photosensitive layer having a thickness of 15 μm was produced in substantially the same manner as in Example I-1 except that the disazo compound No. V-1 mentioned above was used instead of the compound No. I-1.

EXAMPLE V-2

A solution of 100 parts by weight of p-diethylaminobenzaldehyde-diphenylhydrazone (ABPH) in 700 parts by weight of tetrahydofuran (THF) was mixed with a solution of 100 parts by weight of polycarbonate in 700 parts by weight including the same parts of THF and dichloromethane to prepare a coating liquid. The coating liquid was applied on an aluminum-deposited polyester film substrate by the wire bar technique to form a charge transporting layer having a dry thickness of 15 μm. 50 parts by weight of disazo compound No. V-1, 50 parts by weight of a polyester resin, and 50 parts by weight of PMMA were kneaded with a mixer for 3 hours together with THF as a solvent to prepare a coating liquid, which was then applied on the charge transporting layer by the wire bar technique to form a charge generating layer having a dry thickness of 0.5 μm. Thus, a photoconductor with a structure corresponding to that shown in FIG. 3 was produced. No covering layer was provided since the present invention is not directly concerned with a covering layer.

EXAMPLE V-3

A charge transporting layer was produced by forming a photosensitive layer in substantially the same manner as in Example V-2 except that α-phenyl-4'-N,N-dimethylaminostilbene, which is a styryl compound, was used to replace ABPH as the charge transporting substance. Then a charge generating layer was formed on the charge transporting layer and, thus, a photoconductor was produced.

EXAMPLE V-4

A charge transporting layer was produced by forming a photosensitive layer in substantially the same manner as in Example V-2 except that tri(p-toryl)amine, which is a triphenylamine compoud, was used to replace ABPH as the charge transporting substance. Then a charge generating layer was formed on the charge transporting layer and, thus, a photoconductor was produced.

EXAMPLE V-5

A charge transporting layer was produced by forming a photosensitve layer in substantially the same manner as in Example V-2 except that 2,5-bis(p-diethylaminophenyl)-1,3,4-oxadiazole, which is an oxadiazole compoud, was used to replace ABPH as the charge transporting substance. Then a charge generating layer was formed on the charge transporting layer and, thus, a photoconductor was produced.

The electrophotographic characteristics of the five photoconductors thus produced were measured by utilizing an electrostatic recording paper testing apparatus Model SP-428.

The measured values of the surface potentials $V_s$, residual potential $V_r$ and half decay exposure amount $E_{\frac{1}{2}}$ are shown in Table 9. As shown in Table 9, all of these photocouductors were satisfactory with respect to the surface potential, the residual potential and the half decay exposrue amount.

TABLE 9

| Example | $V_s$ (Volts) | $V_r$ (Volts) | $E_{\frac{1}{2}}$ (lux · sec) |
|---|---|---|---|
| V-1 | 490 | 120 | 5.6 |
| V-2 | 550 | 130 | 7.3 |
| V-3 | 520 | 110 | 6.8 |
| V-4 | 530 | 150 | 7.2 |
| V-5 | 485 | 100 | 8.1 |

EXAMPLE V-6

100 parts by wieght of each of respective disazo compounds Nos. from V-2 to V-75 and 100 parts by weight of polyester were mixed with THF as a solvent with a mixer for 3 hours to prepare a coating liquid. The respective coating liquids were applied on aluminum substrates to form a photogenerating layer having a dry thickness of 0.5 μm. Further, the coating liquid described in Example V-2, which include ABPH as a charge transporting substance, was applied on the respective charge generating layer having a dry thickness of 15 μm, thus photconductors ans shown in FIG. 2 were produced.

The measured value of the half decay exposure amount $E_{\frac{1}{2}}$ and the residual potential of the above-mentioned examples are shown in Table 10. As shown in Table 10, all photoconductors were satisfactory with respect to the half decay exposure amount and the residual potential.

TABLE 10

| Compound No. | $E_{\frac{1}{2}}$ (lux · sec) | $V_r$ (volt) |
|---|---|---|
| V-2 | 6.9 | −100 |
| V-3 | 7.3 | −110 |
| V-4 | 8.1 | −115 |
| V-5 | 5.9 | −100 |
| V-6 | 9.1 | −120 |

TABLE 10-continued

| Compound No. | $E_{\frac{1}{2}}$ (lux · sec) | $V_r$ (volt) |
| --- | --- | --- |
| V-7 | 8.7 | −125 |
| V-8 | 7.9 | −130 |
| V-9 | 7.7 | −120 |
| V-10 | 8.6 | −115 |
| V-11 | 6.8 | −110 |
| V-12 | 6.7 | −110 |
| V-13 | 8.9 | −125 |
| V-14 | 9.1 | −130 |
| V-15 | 7.7 | −120 |
| V-16 | 7.9 | −120 |
| V-17 | 8.2 | −125 |
| V-18 | 8.9 | −130 |
| V-19 | 8.8 | −130 |
| V-20 | 9.2 | −140 |
| V-21 | 9.3 | −145 |
| V-22 | 9.9 | −125 |
| V-23 | 10.1 | −110 |
| V-24 | 11.3 | −125 |
| V-25 | 8.9 | −130 |
| V-26 | 11.1 | −110 |
| V-27 | 12.1 | −110 |
| V-28 | 9.9 | −105 |
| V-29 | 10.3 | −120 |
| V-30 | 12.3 | −130 |
| V-31 | 13.1 | −130 |
| V-32 | 12.5 | −115 |
| V-33 | 11.9 | −115 |
| V-34 | 12.7 | −120 |
| V-35 | 13.4 | 100 |
| V-36 | 11.9 | −100 |
| V-37 | 11.8 | −100 |
| V-38 | 10.5 | −95 |
| V-39 | 9.8 | −90 |
| V-40 | 10.7 | −100 |
| V-41 | 11.9 | −115 |
| V-42 | 10.8 | −105 |
| V-43 | 9.9 | −105 |
| V-44 | 11.4 | −100 |
| V-45 | 10.7 | −110 |
| V-46 | 9.8 | −120 |
| V-47 | 8.7 | −100 |
| V-48 | 10.4 | −90 |
| V-49 | 9.3 | −85 |
| V-50 | 10.7 | −90 |
| V-51 | 11.1 | −95 |
| V-52 | 12.1 | −100 |
| V-53 | 8.9 | −125 |
| V-54 | 10.3 | −120 |
| V-55 | 9.4 | −110 |
| V-56 | 10.1 | −105 |
| V-57 | 9.7 | −100 |
| V-58 | 9.5 | −95 |
| V-59 | 8.9 | −90 |
| V-60 | 9.2 | −90 |
| V-61 | 8.7 | −85 |
| V-62 | 8.3 | −70 |
| V-63 | 7.9 | −120 |
| V-64 | 8.7 | −130 |
| V-65 | 7.8 | −120 |
| V-66 | 7.9 | −120 |
| V-67 | 7.3 | −130 |
| V-68 | 7.2 | −125 |
| V-69 | 7.1 | −100 |
| V-70 | 7.4 | −105 |
| V-71 | 8.9 | −90 |
| V-72 | 8.5 | −110 |
| V-73 | 8.9 | −95 |
| V-74 | 9.4 | −105 |
| V-75 | 9.2 | −95 |

As described above, and in accordance with the present invention, an azo compound or a disazo compound represented by any one of the aforementioned chemical formulae is used in a photosensitive layer formed on an electroconductive substrate, as a charge generating substance, to provide a photoconductor which shows a high sensitive and excellent characteristics in repeated use when adapted to either a positive charge mode or a negative charge mode. If necessary, a covering layer may be provided on the surface of the photoconductor to improve the durability thereof.

The invention has been described in detail with respect to preferred embodiments, and it will now be apparent from the foregoing to those skilled in the art that changes and modifications may be made without departing from the invention in its broader aspects, and it is intended that the invention, therefore, as defined in the appended claims cover all such changes and modifications as fall within the true spirit of the invention.

What is claimed is:

1. A photoconductor for electrophotography, comprising:
   an electroconductive substrate; and
   a photosensitive layer formed on said electroconductive substrate and including at least one azo compound represented by the following general formula (I) as a charge generating substance:

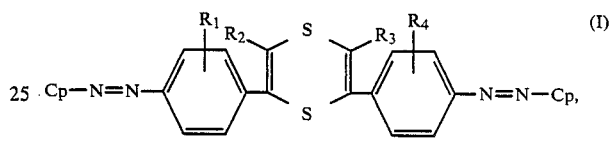

(I)

wherein each of $R_1$, $R_2$, $R_3$ and $R_4$ stands for a hydrogen atom, a halogen atom, a hydroxy group, an alkyl group, an alkoxy group, an allyl group, an aryl group, an aralkyl group, a carboxyl group, or an ester group, and wherein $C_p$ stands for a residual group of a coupler.

2. The photoconductor as claimed in claim 1, wherein said photosensitive layer comprises a layer including a dispersion of a charge generating substance selected from azo compounds represented by the general formulae (I) and a charge transporting substance in a binder resin.

3. The photoconductor as claimed in claim 1, wherein said photosensitive layer comprises a laminate including a charge transporting layer mainly composed of a charge transporting substance and a charge generating layer including a compound selected from azo compounds represented by the general formulae(I).

4. A photoconductor for electrophotography, comprising:
   an electroconductive substrate; and
   a photosensitive layer formed on said electroconductive substrate and including at least one azo compound represented by the following general formula (II) as a charge generating substance:

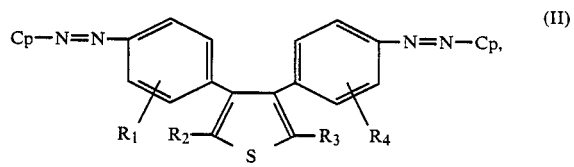

(II)

wherein each of $R_1$, $R_2$, $R_3$ and $R_4$ stands for a hydrogen atom, a halogen atom, a hydroxy group, an alkyl group, an alkoxy group, an allyl group, an aryl group, an aralkyl group, a carboxyl group, or an ester group, and wherein $C_p$ stands for a residual group of a coupler.

5. The photoconductor as claimed in claim 4, wherein said photosensitive layer comprises a layer including a dispersion of a charge generating substance selected from azo compounds represented by the general formulae (II) and a charge transporting substance in a binder resin.

6. The photoconductor as claimed in claim 4, wherein said photosensitive layer comprises a laminate including a charge transporting layer mainly composed of a charge transporting substance and a charge generating layer including a compound selected from azo compounds represented by the general formulae (II).

7. A photoconductor for electrophotography, comprising:
an electroconductive substrate; and
a photosensitive layer formed on said electroconductive substrate and including at lease one disazo compound represented by the following general formula (III) as a charge generating substance:

$$C_P\!-\!N\!=\!N\!-\!D\!-\!N\!=\!N\!-\!C_P \qquad \text{(III),}$$

wherein D stands for one of the structures represented by the following general formulae (IIIA) to (IIIC), and
wherein $C_p$ stands for a residual group of a coupler;

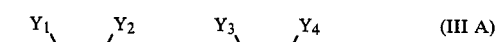
(III A)

(III B)

, and (III C)

wherein each of $Y_1$ to $Y_{18}$ stands for a hydrogen atom, a cyano group, a carbamoyl group, a carboxyl group, an ester group, an acyl group, a halogen atom, a sulfonic group, an alkyl group, a cycloalkyl group, an alkenyl group, an aryl group, or an aromatic heterocyclic group, each of the last five groups of which may have a substituent(s) and
wherein $A_r$ stands for an aromatic hydrocarbon or an aromatic heterocyclic group, each of which may have a substituent(s).

8. The photoconductor as claimed in claim 7, wherein said residual group $C_p$ has one of structures represented by the following general formulae ((IIID) to (IIIG);

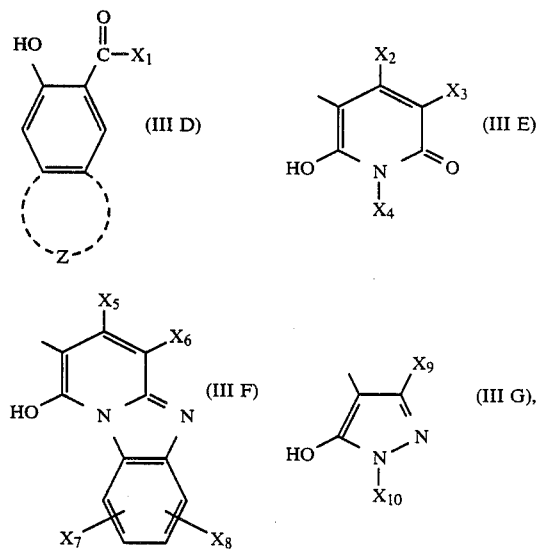

wherein Z stands for a residual group which forms a polycyclic aromatic ring or heterocyclic ring by condensation with a benzene ring,
wherein $X_1$ stands for an $-OR_5$ group or an $-NR_6R_7$ group, each of $R_5$, $R_6$ and $R_7$ standing for a hydrogen atom, an alkyl group, an aryl group, or an aromatic heterocyclic group, each of the last two groups of which may have a substituent(s)
wherein $X_2$ and $X_5$ stand for an alkyl group, an aryl group or an aromatic heterocyclic group, each of which may have a substituent(s),
wherein $X_3$ and $X_6$ stand for a hydrogen atom, a cyano group, a carbomoyl group, a carboxyl group, an ester group, or an acyl group,
wherein $X_4$ stands for a hydrogen atom, an alkyl group, a cycloalky group, an alkenyl group, each of the last three groups of which may have a substituent(s) an aryl group or an aromatic heterocyclic group,
wherein $X_7$ and $X_8$ stand for a hydrogen atom, a halogen atom, a nitro group, an alkyl group, which alkyl group may have a substituent(s) or an alkoxy group, which alkoxy group may have a substituent(s),
wherein $X_9$ stands for an alkyl group, an aryl group, or a carboxyl group, and
wherein $X_{10}$ stands for an aryl group or an aromatic group, each of which may have a substituent(s).

9. The photoconductor as claimed in claim 7, wherein said photosensitive layer comprises a layer including a dispersion of a charge generating substance selected from disazo compounds represented by the general formulae (III) and a charge transporting substance in a binder resin.

10. The photoconductor as claimed in claim 7, wherein said photosensitive layer comprises a laminate including a charge transporting layer mainly composed of a charge transporting substance and a charge generating layer including a compound selected from disazo compounds represented by the general formulae (IV).

11. A photoconductor for electrophotography, comprising:
an electroconductive substrate; and
a photosensitive layer formed on said electroconductive substrate and including at least one disazo compound represented by the following general formulae (IV) as a charge generating substance:

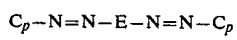  (IV), wherein E stands for one of the structures represented by the following general formulae (IVA) to (IVC), and
wherein $C_p$ stands for a residual group of a coupler;

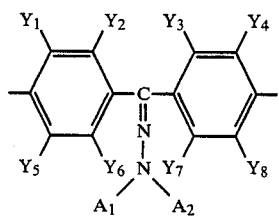  (IV A)

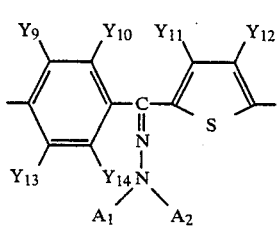  (IV B)

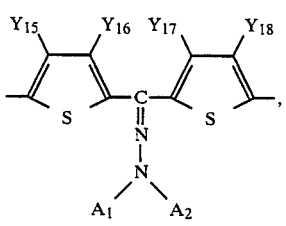  (IV C)

wherein each of $Y_1$ to $Y_{18}$ stands for a hydrogen atom, a cyano group, a carbamoyl group, a carboxyl group, an ester group, an acyl group, a halogen atom, a sulfonic group, an alkyl group, a cycloalkyl group, an alkenyl group, an aryl group, or an aromatic heterocyclic group, each of the last five groups of which may have a substituent(s), and
wherein A1 and A2 stand for an aryl group, an aralkyl group, or an aromatic heterocyclic group, each of which may have a substituent(s).

12. The photoconductor as claimed in claim 11, wherein said residual group $C_p$ has one of the structures represented by the following general formulae (IVD) to (IVG):

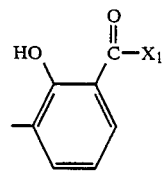  Z(IV D)

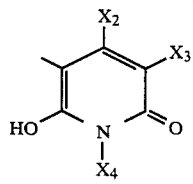  (IV E)

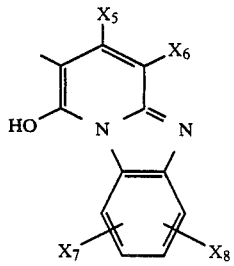  (IV F)

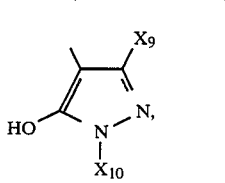  (IV G)

wherein Z stands for a residual group which forms a polycycic aromatic ring or heterocyclic ring by condensation with a benzene ring,
wherein $X_1$ stands for an $-OR_5$ group or an $-NR_6R_7$ group, each of $R_5$, $R_6$ and $R_7$ standing for a hydrogen atom, an alkyl group, an aryl group, or an aromatic heterocyclic group, each of the last two groups of which may have a substituent(s),
wherein $X_2$ and $X_5$ stand for an alkyl group, an aryl group, or an aromatic heterocyclic group, each of which may have a substituent(s),
wherein $X_3$ and $X_6$ stand for a hydrogen atom, a cyano group, a carbamoyl group, a carboxyl group, an ester group or an acyl group,
wherein $X_4$ stands for a hydrogen atom, an alkyl group, a cycloalkyl group, an alkenyl group, each of the last three groups of which may have a substituent(s), an aryl group, or an aromatic heterocyclic group,
wherein $X_7$ and $X_8$ stand for a hydrogen atom, a halogen atom, a nitro group, an alkyl group, which alkyl group may have a substituent(s), or an alkoxy group, which alkoxy group may have a substituent(s),
wherein $X_9$ stands for an alkyl group, an aryl group, or a carboxyl group, and
wherrein $X_{10}$ stands for an aryl group or an aromatic group, each of which may have a substituent(s).

13. The photoconductor as claimed in claim 11, wherein said photosensitive layer comprises a layer including a dispersion of a charge generating substance selected from disazo compounds represented by the general formulae (IV) and a charge transporting substance in a binder resin.

14. The photoconductor as claimed in claim 11, wherein said photosensitive layer comprises a laminate including a charge transporting layer mainly composed of a charge transporting substance and a charge generating layer including a compound selected from disazo compounds represented by the general formulae (IV).

15. A photoconductor for electrophotography, comprising:
an electroconductive substrate; and
a photosensitive layer formed on said electroconductive substrate and including at least one disazo compound represented by the following general formulae (V) as a charge generating substance:

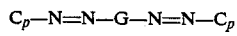

$C_p$—N=N—G—N=N—$C_p$     (V), wherein G stands for one of the structures represented by the following general formulae (VA) to (VC), and
wherein $C_p$ stands for a residual group of a coupler;

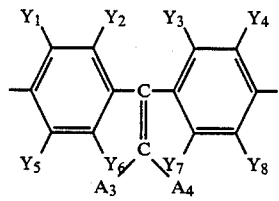
(VA)

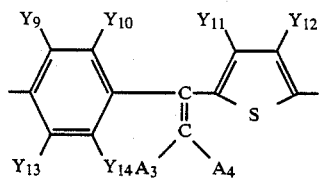
(VB)

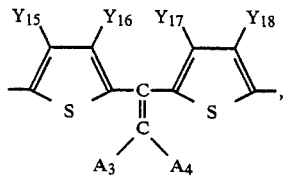
(VC)

wherein each of $Y_1$ to $Y_{18}$ stands for a hydrogen atom, a cyano group, a carbamoyl group, a carboxyl group, an ester group, an acyl group, a halogen atom, a sulfonic group, an alkyl group, a cycloalkyl group, an alkenyl group, an aryl group, or an aromatic heterocyclic group, each of the last five groups of which may have a substituent(s), and
wherein $A_3$ and $A_4$ stand for a hydrogen atom, a cyano group, an aralkyl group, which aralkyl group may have a substituent(s), an aromatic hydrocarbon group, or an aromatic heterocyclic group, each of the last two groups of which may have a substituent(s).

16. The photoconductor as claimed in claim 15, wherein said residual group $C_p$ has one of structures represented by the following general formulae (VD) to (VG):

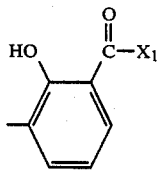
Z(VD)

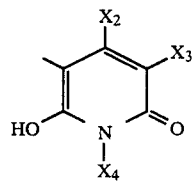
(VE)

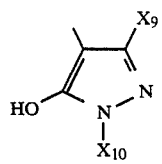
(VF)

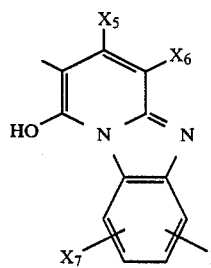
(VG)

wherein Z stands for a residual group which forms a polycyclic aromatic ring or heterocyclic ring by condensation with a benzene ring,
wherein $X_1$ stands for an —$OR_5$ group or an —$NR_6R_7$ group, each of $R_5$, $R_6$ and $R_7$ standing for a hydrogen atom, an alkyl group, an aryl group or an aromatic heterocyclic group, each of the last two groups of which may have a substituent(s),
wherein $X_2$ and $X_5$ stand for an alkyl group, an aryl group or an aromatic heterocyclic group each of which may have a substituent(s),
wherein $X_3$ and $X_6$ stand for a hydrogen atom, a cyano group, a carbamoyl group, a carboxyl group, an ester group, or an acyl group,
wherein $X_4$ stands for a hydrogen atom, an alkyl group, a cycloalkyl group, an alkenyl group, each of the last three groups of which may have a substituent(s), an aryl group, or an aromatic heterocyclic group,
wherein $X_7$ and $X_8$ stand for a hydrogen atom, a halogen atom, a nitro group, an alkyl group, which alkyl group may have a substituent(s), or an alkoxy group, which alkoxy group may have a substituent(s),
wherein $X_9$ stands for an alkyl group, an aryl group, or a carboxyl group, and
wherein $X_{10}$ stands for an aryl group or an aromatic group, each of which may have a substituent(s).

17. The photoconductor as claimed in claim 15, wherein said photosensitive layer comprises a layer including a dispersion of a charge generating substance selected from disazo compounds represented by the general formulae (V) and a charge transporting substance in a binder resin.

18. The photoconductor as claimed in claim 15, wherein said photosensitive layer comprises a laminate including a charge transporting layer mainly composed of a charge transporting substance and a charge generating layer including a compound selected from disazo compounds represented by the general formulae (V).

* * * * *